(12) United States Patent
Eyal et al.

(10) Patent No.: US 9,476,106 B2
(45) Date of Patent: Oct. 25, 2016

(54) METHODS AND SYSTEMS FOR PROCESSING A SUCROSE CROP AND SUGAR MIXTURES

(75) Inventors: Aharon Eyal, Jerusalem (IL); Robert Jansen, Collinsville, IL (US); Asher Vitner, Jerusalem (IL); Revital Mali, Jerusalem (IL)

(73) Assignee: Virdia, Inc., Raceland, LA (US)

( * ) Notice: Subject to any disclaimer, the term of this patent is extended or adjusted under 35 U.S.C. 154(b) by 848 days.

(21) Appl. No.: 13/807,479

(22) PCT Filed: Jun. 28, 2011

(86) PCT No.: PCT/IL2011/000517
§ 371 (c)(1),
(2), (4) Date: Jun. 5, 2013

(87) PCT Pub. No.: WO2012/001688
PCT Pub. Date: Jan. 5, 2012

(65) Prior Publication Data
US 2014/0190470 A1    Jul. 10, 2014

Related U.S. Application Data

(60) Provisional application No. 61/501,276, filed on Jun. 27, 2011.

(30) Foreign Application Priority Data

Jun. 28, 2010   (IL) .......................................... 206678
Feb. 6, 2011    (WO) .................. PCT/IL2011/000130

(51) Int. Cl.
| | |
|---|---|
| C13K 11/00 | (2006.01) |
| C13K 1/02 | (2006.01) |
| C13K 13/00 | (2006.01) |
| C13B 10/02 | (2011.01) |
| C13B 5/04 | (2011.01) |

(52) U.S. Cl.
CPC .................. *C13K 11/00* (2013.01); *C13B 5/04* (2013.01); *C13B 10/02* (2013.01); *C13K 1/02* (2013.01); *C13K 13/00* (2013.01); *C13K 13/002* (2013.01)

(58) Field of Classification Search
CPC ...... C13K 11/00; C13K 1/02; C13K 13/002; C13K 13/00; C13B 10/02; C13B 5/04; C13B 5/05
See application file for complete search history.

(56) References Cited

U.S. PATENT DOCUMENTS

| | | |
|---|---|---|
| 1,344,671 A | 6/1920 | Bergius |
| 1,391,664 A | 9/1921 | Bergius |
| 1,544,149 A | 6/1925 | Hagglund |
| 1,547,893 A | 7/1925 | Bergius |
| 1,688,726 A | 10/1928 | McKee |
| 1,699,177 A | 1/1929 | Bergius |
| 1,853,330 A | 12/1932 | Barstow et al. |
| 1,890,491 A | 12/1932 | Bergius |
| 1,906,467 A | 2/1933 | Heath |
| 1,919,623 A | 7/1933 | Dreyfus |
| 2,146,326 A | 2/1939 | Bergius et al. |
| 2,239,095 A | 4/1941 | Hasche |
| 2,293,724 A | 8/1942 | Faerber |
| 2,305,833 A | 12/1942 | Warth |
| 2,347,945 A | 5/1944 | Frey |
| 2,391,149 A | 12/1945 | Frey |
| 2,440,442 A | 4/1948 | Hillyer et al. |
| 2,474,669 A | 6/1949 | Hereng |
| 2,692,291 A | 10/1954 | Bryan |
| 2,743,219 A | 4/1956 | Riehm |
| 2,752,270 A | 6/1956 | Specht |
| 2,778,751 A | 1/1957 | Riehm |
| 2,917,390 A | 12/1959 | Apel et al. |
| 2,944,923 A | 7/1960 | Riehm |
| 2,945,777 A | 7/1960 | Riehm |
| 2,951,775 A | 9/1960 | Apel |
| 2,989,569 A | 6/1961 | Apel |
| 3,067,065 A | 4/1962 | Kusama |
| 3,132,051 A | 5/1964 | Nobile et al. |
| 3,251,716 A | 5/1966 | Porter |
| 3,311,450 A | 3/1967 | Alon et al. |
| 3,394,056 A | 7/1968 | Nadler et al. |
| 3,497,330 A | 2/1970 | Baniel et al. |
| 3,527,820 A | 9/1970 | Mercier |

(Continued)

FOREIGN PATENT DOCUMENTS

| | | |
|---|---|---|
| CA | 2735396 A1 | 3/2010 |
| DE | 4106373 A1 | 3/1992 |

(Continued)

OTHER PUBLICATIONS

Written Opinion of the Internatinal Searching Authority for PCT/IL2011/000517, dated Nov. 24, 2011.*
ASTM Standards. Standard Test Method for Ash in Biomass. Designation: E1755-01 (Reapproved 2007).
Satin Sweet® 65% High Maltose Corn Syrup. Cargill foods. www.cargillfoods.com Updated Aug. 12, 2014.
Abacherli, et al. Lignin Analytical Cluster, "Towards Standardisation of Methods". Rome, Forum 8, May 10-12, 2007.
Abacherli. Lignin structure and analytical methods. International Lignin Institute, Rue du Grand-Chêne 5, CH-1005 Lausanne, Switzerland Copyright ILI 2008, only for ILI members and only for personal use, Last update Jun. 20, 2008.

(Continued)

*Primary Examiner* — David A Reifsnyder
(74) *Attorney, Agent, or Firm* — Wilson Sonsini Goodrich & Rosati

(57) ABSTRACT

A method comprising: (a) providing a partially processed sucrose crop product containing at least 2% optionally at least 5% of the sucrose content of said crop at harvest on a dry solids basis, cellulose and lignin; (b) hydrolyzing said partially processed crop product with HCl to produce an acid hydrolyzate stream and a lignin stream; and (c) de-acidifying said hydrolyzate stream to produce a de-acidified sugar solution and an HCl recovery stream. Additional, methods, systems and sugar mixtures are also disclosed.

20 Claims, 7 Drawing Sheets

(56) References Cited

U.S. PATENT DOCUMENTS

| | | |
|---|---|---|
| 3,697,497 A | 10/1972 | Falkehag |
| 3,808,192 A | 4/1974 | Dimitri |
| 3,839,318 A | 10/1974 | Mansfield |
| 4,018,637 A | 4/1977 | Kimmel |
| 4,036,939 A | 7/1977 | Duhayon et al. |
| 4,111,928 A | 9/1978 | Holsopple et al. |
| 4,115,530 A | 9/1978 | Coenen et al. |
| 4,174,976 A | 11/1979 | Tsao et al. |
| 4,184,845 A | 1/1980 | Lin |
| 4,206,302 A | 6/1980 | Pollozec |
| 4,230,681 A | 10/1980 | Coenen et al. |
| 4,237,110 A | 12/1980 | Forster et al. |
| 4,255,356 A | 3/1981 | Coenen et al. |
| 4,259,309 A | 3/1981 | Coenen et al. |
| 4,272,502 A | 6/1981 | Ziegenbein et al. |
| 4,278,471 A | 7/1981 | Whittingham |
| 4,291,007 A | 9/1981 | Baniel |
| 4,304,608 A | 12/1981 | Regnault et al. |
| 4,384,897 A | 5/1983 | Brink |
| 4,420,644 A | 12/1983 | Huibers et al. |
| 4,425,136 A | 1/1984 | Pearson et al. |
| 4,470,851 A | 9/1984 | Paszner et al. |
| 4,520,105 A | 5/1985 | Sinner et al. |
| 4,556,432 A | 12/1985 | Erckel et al. |
| 4,579,595 A | 4/1986 | Sachetto et al. |
| 4,608,245 A | 8/1986 | Gaddy et al. |
| 4,615,742 A | 10/1986 | Wright |
| 4,645,658 A | 2/1987 | Gaddy et al. |
| 4,647,704 A | 3/1987 | Engel et al. |
| 4,668,340 A | 5/1987 | Sherman |
| 4,677,198 A | 6/1987 | Linnett et al. |
| 4,713,413 A | 12/1987 | Tegge et al. |
| 4,764,597 A | 8/1988 | Dilling |
| 4,814,015 A | 3/1989 | Quinlan |
| 4,837,315 A | 6/1989 | Kulprathipanja |
| 4,901,635 A | 2/1990 | Williams |
| 4,934,177 A | 6/1990 | Cuthbertson et al. |
| 4,946,946 A | 8/1990 | Fields et al. |
| 4,966,650 A | 10/1990 | De Long et al. |
| 4,990,696 A | 2/1991 | Stauffer |
| 5,114,491 A | 5/1992 | Sarhaddar |
| 5,132,476 A | 7/1992 | Osterburg et al. |
| 5,138,110 A | 8/1992 | Segall et al. |
| 5,174,865 A | 12/1992 | Stultz et al. |
| 5,176,832 A | 1/1993 | Dorta et al. |
| 5,188,673 A | 2/1993 | Clausen et al. |
| 5,196,460 A | 3/1993 | Lora et al. |
| 5,205,473 A | 4/1993 | Coffin, Sr. |
| 5,244,553 A | 9/1993 | Goldstein |
| 5,332,842 A | 7/1994 | Dickakian |
| 5,338,405 A | 8/1994 | Patt et al. |
| 5,357,035 A | 10/1994 | Gruber et al. |
| 5,411,594 A | 5/1995 | Brelsford |
| 5,421,964 A | 6/1995 | Mahler et al. |
| 5,480,490 A | 1/1996 | Toth et al. |
| 5,538,637 A | 7/1996 | Hester et al. |
| 5,571,378 A | 11/1996 | Elofson et al. |
| 5,580,389 A | 12/1996 | Farone et al. |
| 5,597,714 A | 1/1997 | Farone et al. |
| 5,602,286 A | 2/1997 | Muralidhara |
| 5,698,667 A | 12/1997 | Speaks et al. |
| 5,705,369 A | 1/1998 | Torget et al. |
| 5,723,704 A | 3/1998 | Demail et al. |
| 5,726,046 A | 3/1998 | Farone et al. |
| 5,730,877 A | 3/1998 | Heikkila et al. |
| 5,767,330 A | 6/1998 | Metz et al. |
| 5,782,982 A | 7/1998 | Farone et al. |
| 5,807,952 A | 9/1998 | Agblevor |
| 5,820,687 A | 10/1998 | Farone et al. |
| 5,837,831 A | 11/1998 | Gruning et al. |
| 5,847,238 A | 12/1998 | Muralidhara et al. |
| 5,859,270 A | 1/1999 | Kolstad et al. |
| 5,865,948 A | 2/1999 | Lora et al. |
| 5,876,505 A | 3/1999 | Klyosov et al. |
| 5,959,128 A | 9/1999 | Kolstad et al. |
| 5,969,195 A | 10/1999 | Stabel et al. |
| 6,007,636 A | 12/1999 | Lightner |
| 6,086,681 A | 7/2000 | Lindroos et al. |
| 6,172,204 B1 | 1/2001 | Sarkanen et al. |
| 6,207,209 B1 | 3/2001 | Jirjis et al. |
| 6,224,776 B1 | 5/2001 | Heikkila |
| 6,229,046 B1 | 5/2001 | Eyal et al. |
| 6,230,477 B1 | 5/2001 | Caillouet |
| 6,239,274 B1 | 5/2001 | Heikkila et al. |
| 6,258,175 B1 | 7/2001 | Lightner |
| 6,391,204 B1 | 5/2002 | Russo, Jr. |
| 6,409,841 B1 | 6/2002 | Lombard |
| 6,416,621 B1 | 7/2002 | Karstens |
| 6,419,788 B1 | 7/2002 | Wingerson |
| 6,419,828 B1 | 7/2002 | Russo, Jr. |
| 6,452,051 B1 | 9/2002 | Eyal |
| 6,572,775 B2 | 6/2003 | Heikkila et al. |
| 6,610,867 B2 | 8/2003 | Jakel et al. |
| 6,620,292 B2 | 9/2003 | Wingerson |
| 6,692,578 B2 | 2/2004 | Schmidt et al. |
| 6,699,457 B2 | 3/2004 | Cortright et al. |
| 6,719,957 B2 | 4/2004 | Brady, Jr. et al. |
| 6,747,076 B2 | 6/2004 | Schneider et al. |
| 6,752,902 B2 | 6/2004 | Heikkila et al. |
| 6,824,599 B2 | 11/2004 | Swatloski et al. |
| 6,833,149 B2 | 12/2004 | Jirjis et al. |
| 6,852,345 B2 * | 2/2005 | Hill ................... A23G 4/06 426/3 |
| 6,875,349 B2 | 4/2005 | Heikkila et al. |
| 6,896,811 B2 | 5/2005 | Heikkila et al. |
| 6,924,371 B2 | 8/2005 | Karki et al. |
| 6,936,110 B2 | 8/2005 | Van Thorre |
| 6,953,873 B2 | 10/2005 | Cortright et al. |
| 6,964,757 B2 | 11/2005 | Cortright et al. |
| 6,964,758 B2 | 11/2005 | Cortright et al. |
| 7,022,239 B2 | 4/2006 | Heikkila et al. |
| 7,198,925 B2 | 4/2007 | Foody |
| 7,208,570 B2 | 4/2007 | Saviainen |
| 7,229,558 B2 | 6/2007 | Heikkila et al. |
| 7,361,273 B2 | 4/2008 | Heikkila et al. |
| 7,399,323 B2 | 7/2008 | Renninger et al. |
| 7,449,313 B2 | 11/2008 | Rush |
| 7,465,791 B1 | 12/2008 | Hallberg et al. |
| 7,501,025 B2 | 3/2009 | Bakker et al. |
| 7,503,981 B2 | 3/2009 | Wyman et al. |
| 7,514,247 B2 | 4/2009 | Rush |
| 7,524,660 B2 | 4/2009 | Caimi et al. |
| 7,578,927 B2 | 8/2009 | Marker et al. |
| 7,618,612 B2 | 11/2009 | Cortright et al. |
| 7,629,010 B2 | 12/2009 | Passarelli et al. |
| 7,649,086 B2 | 1/2010 | Belanger et al. |
| 7,652,180 B2 | 1/2010 | Osterholt et al. |
| 7,662,617 B2 | 2/2010 | Rush |
| 7,678,358 B2 | 3/2010 | Eckert et al. |
| 7,699,958 B2 | 4/2010 | Griffith et al. |
| 7,713,725 B2 | 5/2010 | England et al. |
| 7,717,364 B2 | 5/2010 | Wingerson |
| 7,718,070 B2 | 5/2010 | Mahnon |
| 7,794,824 B2 | 9/2010 | Eckert et al. |
| 7,901,511 B2 | 3/2011 | Griffin et al. |
| 7,959,811 B2 | 6/2011 | Airaksinen et al. |
| 7,993,709 B2 | 8/2011 | Brunet |
| 8,022,260 B2 | 9/2011 | O'Connor et al. |
| 8,053,566 B2 | 11/2011 | Belanger |
| 8,163,092 B2 | 4/2012 | Baniel et al. |
| 8,404,355 B2 | 3/2013 | Jansen et al. |
| 8,637,660 B2 | 1/2014 | Fanselow et al. |
| 8,637,661 B2 | 1/2014 | Fanselow et al. |
| 8,722,878 B2 | 5/2014 | Raines et al. |
| 8,999,065 B2 | 4/2015 | Kazachkin et al. |
| 9,200,337 B2 | 12/2015 | Colakyan et al. |
| 2003/0013606 A1 | 1/2003 | Hampden-Smith et al. |
| 2003/0156970 A1 | 8/2003 | Oberkofler et al. |
| 2004/0060673 A1 | 4/2004 | Phillips et al. |
| 2004/0074217 A1 | 4/2004 | Reaux |
| 2004/0121446 A1 | 6/2004 | England et al. |
| 2004/0199025 A1 | 10/2004 | Stauffer |
| 2004/0199049 A1 | 10/2004 | Parasher et al. |
| 2004/0231661 A1 | 11/2004 | Griffin et al. |

(56) References Cited

U.S. PATENT DOCUMENTS

| | | |
|---|---|---|
| 2004/0237499 A1 | 12/2004 | Yogev et al. |
| 2005/0034823 A1 | 2/2005 | Brelid et al. |
| 2006/0024801 A1 | 2/2006 | Holtzapple et al. |
| 2007/0020375 A1 | 1/2007 | Jansen et al. |
| 2007/0031953 A1 | 2/2007 | Dunson, Jr. et al. |
| 2007/0142225 A1 | 6/2007 | Baker |
| 2007/0178569 A1 | 8/2007 | Leschine et al. |
| 2007/0219521 A1 | 9/2007 | Hird et al. |
| 2008/0021155 A1 | 1/2008 | Bono et al. |
| 2008/0029233 A1 | 2/2008 | Wingerson et al. |
| 2008/0032344 A1 | 2/2008 | Fallavollita |
| 2008/0041366 A1 | 2/2008 | Wahnon |
| 2008/0050792 A1 | 2/2008 | Zmierczak et al. |
| 2008/0053870 A1 | 3/2008 | Marker et al. |
| 2008/0057555 A1 | 3/2008 | Nguyen |
| 2008/0193992 A1 | 8/2008 | Levine |
| 2008/0202504 A1 | 8/2008 | Hilst |
| 2008/0216391 A1 | 9/2008 | Cortright et al. |
| 2008/0300434 A1 | 12/2008 | Cortright et al. |
| 2008/0300435 A1 | 12/2008 | Cortright et al. |
| 2008/0305210 A1* | 12/2008 | Petersen ............... A23G 1/30 426/61 |
| 2008/0317661 A1 | 12/2008 | Eckert et al. |
| 2008/0317667 A1 | 12/2008 | Violette et al. |
| 2008/0318043 A1 | 12/2008 | Eckert et al. |
| 2009/0053783 A1 | 2/2009 | Gokarn et al. |
| 2009/0056889 A1 | 3/2009 | Ren et al. |
| 2009/0062232 A1 | 3/2009 | Fujikawa et al. |
| 2009/0069550 A1 | 3/2009 | Belanger et al. |
| 2009/0084511 A1 | 4/2009 | Lampinen et al. |
| 2009/0142848 A1 | 6/2009 | Wyman et al. |
| 2009/0176286 A1 | 7/2009 | O'Connor et al. |
| 2009/0218055 A1 | 9/2009 | Uusitalo et al. |
| 2009/0226979 A1 | 9/2009 | Retsina et al. |
| 2009/0234142 A1 | 9/2009 | Mascal |
| 2009/0286295 A1 | 11/2009 | Medoff et al. |
| 2010/0009408 A1 | 1/2010 | England et al. |
| 2010/0012010 A1 | 1/2010 | Gooijer et al. |
| 2010/0024807 A1 | 2/2010 | Burke et al. |
| 2010/0028557 A1 | 2/2010 | Nagano |
| 2010/0043782 A1 | 2/2010 | Kilambi et al. |
| 2010/0048884 A1 | 2/2010 | Kilambi |
| 2010/0048924 A1 | 2/2010 | Kilambi |
| 2010/0069626 A1 | 3/2010 | Kilambi |
| 2010/0086981 A1 | 4/2010 | Latouf et al. |
| 2010/0093995 A1 | 4/2010 | Baniel et al. |
| 2010/0116267 A1 | 5/2010 | Mraz et al. |
| 2010/0144001 A1 | 6/2010 | Horton |
| 2010/0146844 A1 | 6/2010 | Dumenil |
| 2010/0151527 A1 | 6/2010 | Endo et al. |
| 2010/0152509 A1 | 6/2010 | Ekman |
| 2010/0184176 A1 | 7/2010 | Ishida et al. |
| 2010/0189706 A1 | 7/2010 | Chang et al. |
| 2010/0233761 A1 | 9/2010 | Czartoski et al. |
| 2010/0279361 A1 | 11/2010 | South et al. |
| 2010/0279372 A1 | 11/2010 | Cho et al. |
| 2010/0305241 A1 | 12/2010 | Balakshin et al. |
| 2010/0305242 A1 | 12/2010 | Balakshin et al. |
| 2010/0305243 A1 | 12/2010 | Balakshin et al. |
| 2010/0305244 A1 | 12/2010 | Balakshin et al. |
| 2011/0003348 A1 | 1/2011 | Genta et al. |
| 2011/0016545 A1 | 1/2011 | Gray et al. |
| 2011/0028672 A1 | 2/2011 | Dahlman et al. |
| 2011/0028710 A1 | 2/2011 | Baniel et al. |
| 2011/0059316 A1 | 3/2011 | Kilambi et al. |
| 2011/0060132 A1 | 3/2011 | Lewis |
| 2011/0070131 A1 | 3/2011 | Schmidt et al. |
| 2011/0100359 A1 | 5/2011 | North |
| 2011/0105737 A1 | 5/2011 | Benjelloun Mlayah et al. |
| 2011/0124057 A1 | 5/2011 | Genta et al. |
| 2011/0129886 A1 | 6/2011 | Howard et al. |
| 2011/0143412 A1 | 6/2011 | Kim et al. |
| 2011/0146138 A1 | 6/2011 | Berry et al. |
| 2011/0178290 A1 | 7/2011 | Baniel et al. |
| 2011/0262984 A1 | 10/2011 | Nguyen |
| 2011/0268652 A1 | 11/2011 | Machhammer et al. |
| 2011/0271875 A1 | 11/2011 | Ahmed et al. |
| 2011/0275860 A1 | 11/2011 | Beldring et al. |
| 2011/0281298 A1 | 11/2011 | Rawls et al. |
| 2011/0300617 A1 | 12/2011 | Genta et al. |
| 2011/0318796 A1 | 12/2011 | Walther |
| 2012/0006320 A1 | 1/2012 | Nguyen |
| 2012/0023810 A1 | 2/2012 | Fjare et al. |
| 2012/0055466 A1 | 3/2012 | Cotti et al. |
| 2012/0058526 A1 | 3/2012 | Jansen et al. |
| 2012/0104313 A1 | 5/2012 | Garbero et al. |
| 2012/0134912 A1 | 5/2012 | Baniel et al. |
| 2012/0156517 A1 | 6/2012 | Vuori et al. |
| 2012/0167874 A1 | 7/2012 | Jansen et al. |
| 2012/0184026 A1 | 7/2012 | Eyal |
| 2012/0227733 A1 | 9/2012 | Jansen et al. |
| 2012/0264873 A1 | 10/2012 | Eyal et al. |
| 2012/0279497 A1 | 11/2012 | Jansen et al. |
| 2012/0304529 A1 | 12/2012 | O'Connor et al. |
| 2012/0323053 A1 | 12/2012 | Qiao et al. |
| 2013/0012610 A1 | 1/2013 | Belanger et al. |
| 2013/0028832 A1 | 1/2013 | Eyal et al. |
| 2013/0028833 A1 | 1/2013 | Eyal et al. |
| 2013/0047979 A1 | 2/2013 | Eyal et al. |
| 2013/0115653 A1 | 5/2013 | Peterson et al. |
| 2013/0167836 A1 | 7/2013 | Floyd et al. |
| 2013/0167837 A1 | 7/2013 | Floyd et al. |
| 2013/0183227 A1 | 7/2013 | Wohlmann et al. |
| 2013/0216693 A1 | 8/2013 | Harrison et al. |
| 2014/0011248 A1 | 1/2014 | Medoff et al. |
| 2014/0014092 A1 | 1/2014 | Kazachkin et al. |
| 2014/0038034 A1 | 2/2014 | Rios et al. |
| 2014/0220651 A1 | 8/2014 | Raines et al. |
| 2014/0227161 A1 | 8/2014 | Manesh et al. |
| 2014/0271443 A1 | 9/2014 | Baker et al. |
| 2014/0275501 A1 | 9/2014 | Capanema et al. |
| 2014/0309416 A1 | 10/2014 | Teixeira et al. |
| 2014/0316162 A1 | 10/2014 | Gao et al. |
| 2015/0299738 A1 | 10/2015 | Wang et al. |

FOREIGN PATENT DOCUMENTS

| | | |
|---|---|---|
| DE | 19721301 C1 | 10/1998 |
| DE | 102008064325 A1 | 7/2010 |
| DE | 102010033925 A1 | 8/2011 |
| EP | 0018621 A1 | 11/1980 |
| EP | 0317036 A1 | 5/1989 |
| EP | 0224721 B1 | 6/1991 |
| EP | 0493842 A2 | 7/1992 |
| EP | 0247436 B1 | 8/1992 |
| EP | 0504622 A1 | 9/1992 |
| EP | 0560546 A1 | 9/1993 |
| EP | 0446556 B1 | 8/1995 |
| EP | 0878455 A1 | 11/1998 |
| EP | 0690931 B1 | 10/2001 |
| EP | 1272433 B1 | 1/2004 |
| EP | 1878480 A1 | 1/2008 |
| EP | 1918031 A1 | 7/2008 |
| EP | 1458805 B1 | 8/2011 |
| EP | 1733282 B1 | 1/2012 |
| EP | 2325246 B1 | 11/2013 |
| GB | 1562682 A | 3/1980 |
| GB | 2034291 A | 6/1980 |
| WO | WO 82/01723 A1 | 5/1982 |
| WO | WO 92/18557 A1 | 10/1992 |
| WO | WO 93/05186 A1 | 3/1993 |
| WO | WO 93/13265 A1 | 7/1993 |
| WO | WO 95/02726 A1 | 1/1995 |
| WO | WO 96/09350 A1 | 3/1996 |
| WO | WO 96/41052 A1 | 12/1996 |
| WO | WO 97/13732 A2 | 4/1997 |
| WO | WO 97/13732 A3 | 5/1997 |
| WO | WO 01/25143 A1 | 4/2001 |
| WO | WO 01/32715 A1 | 5/2001 |
| WO | WO 02/02826 A1 | 1/2002 |
| WO | WO 03/078540 A2 | 9/2003 |
| WO | WO 03/078540 A3 | 1/2004 |
| WO | WO 2004/050983 A1 | 6/2004 |
| WO | WO 2004/079017 A2 | 9/2004 |

(56) References Cited

FOREIGN PATENT DOCUMENTS

| | | |
|---|---|---|
| WO | WO 2004/079017 A3 | 8/2005 |
| WO | WO 2006/006164 A2 | 1/2006 |
| WO | WO 2006/034581 A1 | 4/2006 |
| WO | WO 2006/038863 A1 | 4/2006 |
| WO | WO 2006/056838 A1 | 6/2006 |
| WO | WO 2006/086861 A2 | 8/2006 |
| WO | WO 2006/086861 A3 | 10/2006 |
| WO | WO 2006/119357 A2 | 11/2006 |
| WO | WO 2006/119357 A3 | 1/2007 |
| WO | WO 2007/019505 A2 | 2/2007 |
| WO | WO 2007/019505 A3 | 6/2007 |
| WO | WO 2007/075476 A2 | 7/2007 |
| WO | WO 2007/112314 A2 | 10/2007 |
| WO | WO 2007/112314 A3 | 11/2007 |
| WO | WO 2007/124400 A2 | 11/2007 |
| WO | WO 2008/019468 A1 | 2/2008 |
| WO | WO 2007/075476 A3 | 3/2008 |
| WO | WO 2008/027699 A2 | 3/2008 |
| WO | WO 2008/144903 A1 | 4/2008 |
| WO | WO 2008/069830 A2 | 6/2008 |
| WO | WO 2008/027699 A3 | 7/2008 |
| WO | WO 2007/124400 A3 | 8/2008 |
| WO | WO 2008/109877 A1 | 9/2008 |
| WO | WO 2008/111045 A1 | 9/2008 |
| WO | WO 2008/123419 A1 | 10/2008 |
| WO | WO 2008/131229 A1 | 10/2008 |
| WO | WO 2008/069830 A3 | 11/2008 |
| WO | WO 2008/137639 A1 | 11/2008 |
| WO | WO 2008/140617 A2 | 11/2008 |
| WO | WO 2009/002785 A1 | 12/2008 |
| WO | WO 2008/140617 A3 | 1/2009 |
| WO | WO 2009/003292 A1 | 1/2009 |
| WO | WO 2009/015663 A2 | 2/2009 |
| WO | WO 2009/020459 A2 | 2/2009 |
| WO | WO 2009/021733 A2 | 2/2009 |
| WO | WO 2009/028969 A1 | 3/2009 |
| WO | WO 2009/030713 A1 | 3/2009 |
| WO | WO 2009/031164 A1 | 3/2009 |
| WO | WO 2009/036674 A1 | 3/2009 |
| WO | WO 2009/020459 A3 | 4/2009 |
| WO | WO 2006/006164 A3 | 5/2009 |
| WO | WO 2009/068711 A1 | 6/2009 |
| WO | WO 2009/125400 A2 | 10/2009 |
| WO | WO 2009/135480 A1 | 11/2009 |
| WO | WO 2009/142837 A2 | 11/2009 |
| WO | WO 2009/015663 A3 | 12/2009 |
| WO | WO 2009/125400 A3 | 1/2010 |
| WO | WO 2010/006840 A2 | 1/2010 |
| WO | WO 2010/009343 A2 | 1/2010 |
| WO | WO 2010/037109 A2 | 1/2010 |
| WO | WO 2010/015404 A1 | 2/2010 |
| WO | WO 2010/020977 A2 | 2/2010 |
| WO | WO 2009/142837 A3 | 3/2010 |
| WO | WO 2010/026244 A1 | 3/2010 |
| WO | WO 2010/026572 A1 | 3/2010 |
| WO | WO 2010/009343 A3 | 4/2010 |
| WO | WO 2010/034055 A1 | 4/2010 |
| WO | WO 2010/038021 A2 | 4/2010 |
| WO | WO 2010/043424 A1 | 4/2010 |
| WO | WO 2010/045576 A2 | 4/2010 |
| WO | WO 2010/046619 A1 | 4/2010 |
| WO | WO 2010/006840 A3 | 5/2010 |
| WO | WO 2010/037109 A3 | 5/2010 |
| WO | WO 2010/060183 A1 | 6/2010 |
| WO | WO 2010/064229 A2 | 6/2010 |
| WO | WO 2010/045576 A3 | 7/2010 |
| WO | WO 2010/064229 A3 | 7/2010 |
| WO | WO 2010/081231 A1 | 7/2010 |
| WO | WO 2010/038021 A3 | 8/2010 |
| WO | WO 2010/020977 A3 | 10/2010 |
| WO | WO 2010/113129 A2 | 10/2010 |
| WO | WO 2010/113129 A3 | 10/2010 |
| WO | WO 2010/113130 A2 | 10/2010 |
| WO | WO 2010/122554 A1 | 10/2010 |
| WO | WO 2010/128272 A1 | 11/2010 |
| WO | WO 2010/135804 A1 | 12/2010 |
| WO | WO 2010/135805 A1 | 12/2010 |
| WO | WO 2010/135806 A1 | 12/2010 |
| WO | WO 2010/135807 A1 | 12/2010 |
| WO | WO 2010/135832 A1 | 12/2010 |
| WO | WO 2010/135833 A1 | 12/2010 |
| WO | WO 2010/146331 A2 | 12/2010 |
| WO | WO 2010/113130 A3 | 1/2011 |
| WO | WO 2011/002660 A1 | 1/2011 |
| WO | WO 2011/007043 A1 | 1/2011 |
| WO | WO 2011/007369 A1 | 1/2011 |
| WO | WO 2011/017587 A1 | 2/2011 |
| WO | WO 2011/028554 A1 | 3/2011 |
| WO | WO 2011/039751 A2 | 4/2011 |
| WO | WO 2011/066487 A1 | 6/2011 |
| WO | WO 2011/070602 A1 | 6/2011 |
| WO | WO 2011/080131 A2 | 7/2011 |
| WO | WO 2011/089589 A1 | 7/2011 |
| WO | WO 2011/091044 A1 | 7/2011 |
| WO | WO 2011/097719 A1 | 8/2011 |
| WO | WO 2011/080131 A3 | 9/2011 |
| WO | WO 2011/111189 A1 | 9/2011 |
| WO | WO 2011/111190 A1 | 9/2011 |
| WO | WO 2010/146331 A3 | 10/2011 |
| WO | WO 2011/039751 A3 | 10/2011 |
| WO | WO 2011/140222 A1 | 11/2011 |
| WO | WO 2011/151823 A1 | 12/2011 |
| WO | WO 2011/163084 A1 | 12/2011 |
| WO | WO 2012/013177 A2 | 2/2012 |
| WO | WO 2012/015575 A1 | 2/2012 |
| WO | WO 2012/013177 A3 | 3/2012 |
| WO | WO 2012/031270 A1 | 3/2012 |
| WO | WO 2012/060767 A1 | 5/2012 |
| WO | WO 2013/038399 A1 | 3/2013 |
| WO | WO 2013/040702 A1 | 3/2013 |
| WO | WO 2013/083876 A2 | 6/2013 |
| WO | WO 2013/192572 A1 | 12/2013 |
| WO | WO 2014/044753 A1 | 3/2014 |
| WO | WO 2014/076612 A1 | 5/2014 |
| WO | WO 2014/138553 A1 | 9/2014 |
| WO | WO 2014/169079 A2 | 10/2014 |

OTHER PUBLICATIONS

Abacherli. New lignins from agricultural plants. The international Lignin Institute, 5th international Forum Sep. 7, 2000, Bordeaux (France).

Abaecherli et al. Evaluation of methods for composition, functional groups and molecular mass on Lignin fractionated by Ultrafiltration. Poster session, 2009; Science & Technology of Biomass: Advances and Challenges.

Acevedo, et al. Surface Activity of Lignin Fractions isolated by Organic Solvents. 2005.

Acevedo, et al. Surface Activity of Lignin Fractions isolated by Organic Solvents. Powerpoint. 2005.

Achyuthan, et al. Supramolecular Self-Assembled Chaos: Polyphenolic Lignin's Barrier to Cost-Effective Lignocellulosic Biofuels. Molecules. 2010; 15:8641-8688. doi:10.3390/molecules15118641.

Addi, et al. Flax lignin and lignans:Biosynthesis, Metabolism and Directed Modifications through a Genetic Engineering Approach. 2003.

Afanasiev, et al. Forecast of lignosulfonates properties as surfactant. 2005.

Afanasiev, et al. Stabilization effect of microparticles of sulfate lignin on water-oil emulsion. Powerpoint. 2005.

Agarwal, et al. FT raman spectroscopic study of softwood lignin ISWPC. 1997.

Agarwal, et al. Near-IR surface-enhanced Raman spectrum of lignin. J. Raman Spectrosc. 2009; 40:1527-1534.

Agarwal, et al. Raman spectra of lignin model compounds. incorporating the 13th ISWFPC (International Symposium on Wood, Fibre, and Pulping Chemistry), held in Auckland, New Zealand (May 16-19, 2005).Appita 2005, pp. 1-8.

Ahmed, et al. A simplified method for accurate determination of cell wall uronide content. Journal of Food Biochemistry.1977; 1:361-365.

(56) References Cited

OTHER PUBLICATIONS

Albersheim. Metabolism of the Pectic Substances. For the degree of Doctor of Philosophy, California Institute of Technology Pasadena, California, 1959.

Alizadeh, et al. Pretreatment of Switchgrass by Ammonia Fiber Explosion (AFEX). Applied Biochemistry and Biotechnology. 2005; 5(121-124):1133-1142.

Allsopp, et al. 130. The constitution of the cambium, the new wood and the mature sapwood of the common ash, the common elm and the scotch pine. May 10, 1940; 1078-1084.

Anderson. The isolation of pectic substances from wood. 1935; 531-539.

Argyropoulos. Oxidaton of Lignin in supercritical carbon dioxide. 2005.

Asikkala, et. al. Accurate and reproducible determination of lignin molar mass by acetobromination. Journal of agricultural and food chemistry. 2012; 60:3968-3973.

Atalla, et al. Analysis of Lignin and Cellulose in Biological Energy Sources by Raman Microscopy. 2011.

Atchison, et al. Innovative Methods for Corn Stover Collecting, Handling, Storing and Transporting, Mar. 2003. National Renewable Energy Laboratory. Apr. 2004.

Baker et al. Utilization of Sustainable Resources for Production of Carbon Fiber Materials for Structural and Energy Efficiency Applications. A Pesentation by Oak Ridge. 2010.

Baker. Utilization of Sustainable Resources for Materials for Production of Carbon Fiber Structural and Energy Efficiency Applications. Oak Ridge National Laboratory, Tennessee, USA. Nordic Wood Biorefinery Conference, Stockholm, Sweden, Mar. 22-24, 2011.

Barneto, et al. Thermogravimetric characterization of eucaliptus wood. Artigo Tecnico 2011, 72(7), 53-56.

Barta, et al. Catalytic disassembly of an organosolv lignin via hydrogen transfer from supercritical methanol.

Basak, et al. Thermal Properties of Jute Constituents and Flame Retardant Jute Fabrics. Textile Res. J. 1993, 63(11), 658-666.

Baumberger, et al. An overview of the analytical tools in the quali/quantitative analysis of functional groups and inter unit bondings in lignin.II. Interunit bondings characterization. COST E41—Roma—Jun. 7-8, 2007.

Baumberger, et al. Analytical methods for lignin characterisation, used by users (end-users and R&D companies). Compilation of all the protocols received by Oct. 31, 2003.

Ben et al. Thermal conversion of biomass and biomass components to biofuels and bio-chemicals. PhD thesis; Georgia Institue of Technology. 2012.

Ben, et al. Catalytic Pyrolysis of Lignin for Bio-oils. Presentation; Georgia Tech. 2011 TAPPI International Bioenergy & Bioproducts Conference, Atlanta. 2011.

Ben, et al. Influence of Si/Al Ratio of ZSM-5 Zeolite on the Properties of Lignin Pyrolysis Products. Substainable Chemistry and Engineering. 2013;1(3): 316-324.

Berthold, et al. Association of water to polar groups; estimations by an adsorption model for ligno-cellulosic materials. Colloids Surfaces A:Physicochem. Eng. Aspects. 1996; 112:117-129.

Bizzari, et al. CEH Marketing Research Report, Lignosulfonates. 671.5000 A. Jan. 2009.

Boeriu. Characterisation of structure-dependent functional properties. 2003.

Bonini et al. Graft Copolymers of Lignin from Straw with 1-Ethenylbenzene : Synthesis and Characterization. Journal of Applied Polymer Science. 2001; 79; 72-79.

Bonini, et al. Degradation and recovery of fine chemicals through singlet oxygen treatment of lignin 2003.

Bonini, et al. New Materials from Lignin. 2005.

Bonini, et al. Qualitative 13C NMR spectra of lignin. Analytical methods for lignin characterisation. International Lignin Institute Version: 1.2, Last date of review: Aug. 2008.

Bonini. Low cost steam exploded lignin from straw: degradation and use. The international Lignin Institute, 5th international Forum Sep. 7, 2000, Bordeaux (France).

Bourbonnais, et al. Lignin Oxidation by Laccase Isozymes from Trametes versicolor and Role of the Mediator 2,29-Azinobis(3-Ethylbenzthiazoline-6-Sulfonate) in Kraft Lignin Depolymerization. Applied and environmental microbiology. May 1995; 61(5):1876-1880.

Braun, et al. Lignin-based carbon fibers: Oxidative thermostabilization of kraft lignin. Carbon.2005; 43:385-394.

Brito, et al. Chemical composition changes in eucalyptus and pinus woods submitted to heat treatment. Bioresource Technology. 2008; 99:8545-8548.

Brodin, et al. Characteristics of lignin blends intended for carbon fibre production. 2008.

Brownell, et al. Steam-Explosion Pretreatment of Wood: Effect of Chip Size, Acid, Moisture Content and Pressure Drop. Biotechnology and Bioengineering. 1986; XXVIII:792-801.

Busche. The Klason lignin determination as applied to aspenwood with special: reference to acid-soluble lignin. The Institute of Paper Chemistry, Appleton, Wisconsin,Doctor's Dissertation, A thesis submitted Jun. 1960.

Bykov. Characterization of Natural and Technical Lignins using FTIR Spectroscopy. Master's Thesis, Division of Chemical Technology Department of Chemical Engineering and Geosciences, Lulea University of Technology. Feb. 2008.

Campa et al. Capillary Electrophoresis of Neutral Carbohydrates. Methods in molecular biology.2008; 384:247-305.

Campa et al. Capillary electrophoresis of sugar acids. Methods in molecular biology. 2008; 384: 307-355.

Campbell et al. The bleaching action of alkaline hydrogen peroxide on wood. The Biochemical journal. 1938; 32(4): 702-707.

Campbell. The Degradation of wood by simultaneous action of ethyl alcohol and hydrochloric acid. 1929; 1225-1232.

Canetti, et al. Thermal degradation behaviour of isotactic polypropylene with lignin. Polym. Degr. And stability 2006, 91, 494-498.

Capraru, et al. Contribution to the modification and characterization of different types of lignins. Cellulose Chem. Technol. 2009; 43(9-10):409-418.

Carrott, et al. Lignin—from natural adsorbent to activated carbon: A review. Bioresource Technology 2007; 98:2301-2312.

Carvelheiro, et al. Hemicellulose biorefineries: a review on biomass pretreatments. J Sci Ind Res. 2008; 67:849-864.

Cateto, et al. Lignin-based polyurethane materials. Proceedings of the 10th International Chemical and Biological Engineering Conference—CHEMPOR 2008 Braga, Portugal, Sep. 4-6, 2008 E.C. Ferreira and M. Mota (Eds.).

Cateto, et al. Monitoring of lignin-based polyurethane synthesis by FTIR-ATR. Barcelona, Apr. 27-28, 2005.

Cateto, et al. Monitoring of lignin-based polyurethane synthesis by FTIR-ATR. Barcelona, Apr. 27-28, 2005. Powerpoint.

Cateto, et al. Oxypropylation of Lignins and Characterization of the Ensuing Polyols. 2007.

Cateto, et al. Oxypropylation of Lignins and Characterization of the Ensuing Polyols. Laboratory of Separation and Reaction Engineering, Bragança Polytechnic Institute, School of Engineering—University of Porto, Ecole Française de Papeterie et des Industries Graphiques, Institut National Polytechnique de Grenoble. 2007. Powerpoint.

Cateto, et al. Rigid Polyurethane foams from lignin-based polyols. Laboratory of Separation and Reaction Engineering. 2008.

Cateto, et al. Rigid Polyurethane foams from lignin-based polyols. Laboratory of Separation and Reaction Engineering. 2008. Poster.

Cazacu, et al. Lignin—component of complex materials. 2005; 64-71.

Cazacu, et al. Lignin characterization for its use in complex polymeric systems. Polymer Nanomaterials for Food Packaging, Characterization Needs, Safety and Environmental Issues, Sep. 1-2, 2010, London.

Cetin, et al. Studies on Lignin-Based Adhesives for Particleboard Panels. Turk J Agric For. 2003; 27:183-189.

Chakar, et al. Review of current and future softwood kraft lignin process chemistry. Industrial crops and products. 2004; 20:131-141.

(56) References Cited

OTHER PUBLICATIONS

Chalov. Sorption of Hydrogen Chloride by moist lignocellulose. SB. TR. VNII Gidroliza Rastitel'n. Mater. 1975; 25:41-49.

Chambost, et al. Guided tour: Implementing the forest biorefinery (FBR) at existing pulp and paper mills. Pulp & Paper Canada. 2008; 109(7):1-9.

Chang, et al. Modification of wood with isopropyl glycidyl ether and its effects on decay resistance and light stability. Bioresource Technology. 2006; 97:1265-1271.

Chaow-U-Thai et al. Removal of ash from sugarcane leaves and tops. International Journal of Biosciences.2012; 2(5): 12-17.

Chen, et al. Application of Molecular Fragments Variable Connectivity Index to Predicting Boiling Points of Alcohols. J. Iran. Chem. Soc. Dec. 2010; 7(4):1012-1020.

Cheng et al. A novel method to prepare L-arabinose from xylose mother liquor by yeast-mediated biopurification. Microbial cell factories.2011; 10 (43): 1-11.

Christiernin. Composition of Lignin in Outer Cell-Wall Layers. Doctoral Thesis, Royal Institute of Technology. 2006.

Ciolacu, et al. New aspects concerning formulation of furan and lignin-based bio-adhesive. 2008.

Coetzee, et al. Determination of pectin content of eucalyptus wood. Holzforschung. 2011; 65:327-331.

Compere et al. Low Cost Carbon Fiber From Renewable Resources. A reporet by Oak Ridge National Laboratory. Oct. 9, 2009.

Compere, et al. Evaluation of Lignin from Alkaline-Pulped Hardwood Black Liquor. Oak Ridge National Laboratory, US Department of Energy, under contract DE-AC05-000R22725, ORNL1TM-2005/88. May 2005.

Compere, et al. Improving the fundamental properties of lignin-based carbon fiber for transportation application. Oak Ridge National Lab. 2009.

Compere, et al. Low cost carbon fiber from renewable resources. Carbon. 1998; 36(7-8):1119-1124.

Conner, et al. Kinetic modeling of hardwood prehydrolysis. Part II. Xylan removal by dilute hydrochloric acid prehydrolysis. Wood and Fiber Science. 1985; 17(4):540-548.

Constantinescu, et al. Composites based on natural and recycled synthetic polymers. 2005.

Constantinescu, et al. Lignin hydrophobization by different esterification reactions. ILI—Forum 8 , May 10-12, 2007.

Constantinescu, et al. Lignin hydrophobization by different esterification reactions. Powerpoint. ILI—Forum 8 , May 10-12, 2007.

Constantinescu, et al. Study of the surface properties of some polyolefin/lignocellulosic composites treated by plasma. Cellulose Chem. Technol. 2007; 41(7-8):463-472.

Dave, et al. Molecular organization of lignin during carbonization. Polymer. 1993; 34(15):3144-3154.

David, et al. 31P-NMR analysis of bio-oils obtained from the pyrolysis of biomass. Biofuels. 2010; 1(6):839-845.

David, et al. Cross-Polarization/Magic Angle Spinning (CP/MAS) 13C Nuclear Magnetic Resonance (NMR) Analysis of Chars from Alkaline-Treated Pyrolyzed Softwood. Energy & Fuels. 2009; 23:498-501.

De Jong, et al. Lignin as additive in paper production. Agrotechnology & Food Innovations, Wageningenur. Fibre and Paper Technology. Feb. 2005.

De Jong, et al. The simultaneous colouring and U.V. stabilisation of materials using dyed lignin. The international Lignin Institute, 5th international Forum Sep. 7, 2000, Bordeaux (France).

De Wild, et al. Pyrolysis of Wheat Straw—Derived Organosolv Lignin. Ch. 5, pp. 101-122. 2011.

De Wild. Lignin Valorisation for Chemicals and Fuels by Catalytic Pyrolysis. International Biomass Valorisation Congress, Amsterdam—The Netherlands, Sep. 13-15, 2010.

Dimmel. Fundamentals of selectivity in pulping and bleaching: Delignification reactions. Members of the Institute of Paper Chemistry. The Institute of Paper Chemistry. 1986; Project 3475.

Dimov, et al. Influence of the amount and concentration of hydrochloric acid on the composition of wheat straw during pre-hydrolysis. Chem. Technol. Inst., Sofia, Bulg. Papier (Paris) (1960), 14 673-6. CODEN: PPERA3 ISSN: 0370-1174. Abstract only.

Diouf, et al. Radical Scavenging Capacity of Lignin Derivatives and Its Oxidative Stabilization Effect on Polyethylene. 2008.

Doorn, et al. CID-Based ICP-AES Instrumantation for Cntinuous On-Line Analysis of Aqueous Industrial Waste Streams. Conference report. 1997; Vancouver (Canada).

Draucker. Novel solvent systems for the development of sustainable technologies. Georgia Institute of Technology. Aug. 2007.

Drougge, et al. Application of Kraft lignin as metal binder. 2008.

Eberle et al. Carbon Fiber From Lignin. Presentation by Oak Ridge National Laboratory; Carbon Fiber Composites Consortium. 2012.

Eckert, et al. Tunable solvents for fine chemicals from the biorefinery. Green Chem. 2007; 9: 545-548.

Economy, et al. Activated carbon fibers—past, present, and future. 1996; 321-358.

Eggeman, et al. Process and economic analysis of pretreatment technologies. Bio. Tech. 2005; 96:2019-2025.

El-Hage et al. Effects of process severity on the chemical structure of Miscanthus ethanol organosolv lignin. Polymer Degradation and Stability. 2010: 1-7.

Elliott, et al. Pretreatment technologies for advancing anaerobic digestion of pulp and paper biotreatment residues. Water Research. 2007; 41:4273-4286.

Esteves, et al. Chemistry and ecotoxicity of heat-treated pine wood extractives. Wood Sci Technol. Jul. 11, 2010. DOI 10.1007/s00226-010-0356-0.

Farrell, et al. Solving Pitch Problems in Pulp and Paper Processes by the Use of Enzymes or Fungi. Advances in Biochemical Engineering/Biochemical Engineering/1997/pp. 198-212.

Faustino, et al. Antioxidant activity of lignin phenolic compounds extracted from kraft and sulphite black liquors. Molecules. 2010; 15(12): 9308-9322.

Feldman, et al. Lignin in blends with synthetic polymers. 2007.

Feldman, et al. Lignin in blends with synthetic polymers. Powerpoint. 2007.

Fenner, et al. Examination of the Thermal Decomposition of Kraft Pine Lignin by Fourier Transform Infrared Evolved Gas Analysis. J. Agric. Food Chem. 1981; 29:846-849.

Ferraz, et al. Estimating the chemical composition of biodegraded pine and eucalyptus wood by DRIFT spectroscopy and multivariate analysis. Bioresource Technology. 2000; 74:201-212.

Fierro, et al. Methodical study of the chemical activation of Kraft lignin with KOH and NaOH. Microporous and Mesoporous Materials. 2007; 101:419-431.

Fox. Chemical and thermal charaterization of three industrial lignins and their corresponding lignin esters. A Thesis for the degree of Master of Science with a Major in Forest Products in the College of Graduate Studies University of Idaho, May 2006.

Froass, et al. Nuclear Magnetic Resonance Studies. 4. Analysis of Residual Lignin after Kraft Pulping. Ind. Eng. Chem. Res. 1998; 37:3388-3394.

Funaoka, et al. Design and functions of structure controllable lignin-based polymers. 2005.

Funaoka, et al. Design and functions of structure controllable lignin-based polymers. Powerpoint. 2005.

Gabilondo, et al. Lignin low molar mass fractions involvement in the synthesis of PF matrices. 2007.

Gamez et al. Study of the hydrolysis of sugar cane bagasse using phosphoric acid. Journal of Food Engineering.2006; 74: 78-88.

Gaspar, et al. Oxidaton of Lignin in supercritical carbon dioxide. III meeting, Barcelona, Apr. 27-28, 2005.

Georgieva, et al. Enzymatic hydrolysis and ethanol fermentation of high dry matter wet-exploded wheat straw at low enzyme loading. Applied biochemistry and biotechnology. 2008;148:35-44.

Glasser. Lignin retrospect and prospect. 2010.

Glazkova, et al. Effect of temperature on the extraction of prehydrolysis products from lignocellulose chips. Gidroliznaya i Lesokhimicheskaya Promyshlennost (1974), (6), 12-13. CODEN: GLKPA2 ISSN: 0016-9706. Abstract only.

(56) References Cited

OTHER PUBLICATIONS

Goncalves, et al. Hydroxymethylation and oxidation of Organosolv lignins and utilization of the products. Bioresource Technology. 2001; 79:103-111.
Gonzalez-Serrano, et al. Development of Porosity upon Chemical Activation of Kraft Lignin with ZnC12. Ind. Eng. Chem. Res. 1997; 36:4832-4838.
Gonzalez-Serrano, et al. Removal of water pollutants with activated carbons prepared from H3PO4 activation of lignin from kraft black liquors. Water Research. 2004; 38:3043-3050.
Gosselik et al. Lignin as a renewable aromatic resource for the chemical industry. PhD Thesis; Wageningen University, Wageningen, NL; 2011.
Gosselink, et al. Analysis of isolated lignin samples using organic and alkaline SEC and MALDI-TOF-MS. Agrotechnology & Food Sciences Group. 2006.
Gosselink, et al. Analytical protocols for characterisation of sulphur-free lignin. Industrial Crops and Products. 2004; 19:271-281.
Gosselink, et al. Characterisation and application of NovaFiber lignin Industrial Crops and Products. 2004; 20:191-203.
Gosselink, et al. Co-ordination network for lignin standardisation, production and applications adapted to market requirements (EUROLIGNIN). Industrial Crops and Products 2004; 20:121-129.
Gosselink, et al. Development of lignin based products. Canada Biomass Business Day, Amstelveen (NL), Oct. 22, 2008.
Gosselink, et al. FT-IR characterisation of lignins with help of PCA. Cost E41 Spectrometric techniques used for the analysis of Carbohydrates, Lignin and Extractives Barcelona, Apr. 25 26, 2005.
Gosselink, et al. Lignin depolymerization under supercritical process conditions. Agrotechnology & Food Sciences Group. 2008.
Gosselink, et al. Selective oxidation of lignin by periodate. ILI 8th Forum Nov. 5, 2007 May 10-12, 2007.
Gosselink, et al. Selective oxidation of lignin by periodate. Powerpoint. ILI 8th Forum Nov. 5, 2007 May 10-12, 2007.
Gosselink, et al. Valorization of biorefinery lignins. ILI Lignin workshop, Zürich/Dübendorf (CH), Oct. 28 2008.
Gosselink, et al. Valorization of lignin resulting from biorefineries. Jun. 4, 2008, RRB4 Rotterdam.
Gosselnik et al. Development of ligninêbased products. Presentation by Agrotechnology & Food Science Group; Canada Biomass Business Day; 2008.
Grant, et al. Tall oil production and processing. Grant and Hockh's Chemical Dictionary 5th ed. 1987.
Gretland, et al. Characterisation of lignosulphonates and sulphonated kraft lignin by hydrophobic interaction chromatography. 2005.
Grigoriev, et al. Polyoxometalate Oxidation of Phenolic Lignin Models. In: ACS Symposium Series 785. Oxidative delignification chemistry. Fundamentals and catalysis. Washington, DC: American Chemical Society. 2001; Chapter 18: 297-312.
Guerra, et al. On the Propensity of Lignins to Associate. Organic Chemistry of Wood Components Laboratory Department of Forest Biomaterials Science & Engineering North carolina State Raleigh, North Carolina USA. 2007.
Gutierrez, et al. Analysis of Lipophilic extractives from wood and pitch deposits by solid-phase extraction and gas chromatography. J. of Chromatography A. 1998; 823:449-455.
Gutierrez, et al. Enzymatic Removal of Free and Conjugated Sterols Forming Pitch Deposits in Environmentally Sound Bleaching of Eucalypt Paper Pulp. Environ. Sci. Technol. 2006; 40:3416-3422.
Gutierrez, et al. Fungal Degradation of Lipophilic Extractives in Eucalyptus globulus Wood. Applied and environmental microbiology. Apr. 1999; 65(4):1367-1371.
Gutierrez, et al. Microbial and enzymatic control of pitch in the pulp and paper industry. Appl Microbiol Biotechnol. 2009; 82:1005-1018.
Gutierrez, et al. The biotechnological control of pitch in paper pulp manufacturing. TRENDS in Biotechnology. 2001; 19(9):340-348.
Haensel, et al. Pyrolysis of wood-based polymer compounds. J. Anal. Appl. Pyrolysis. 2010; 87:124-128.

Hage, et al. Effects of process severity on the chemical structure of Miscanthus ethanol organosolv lignin. Polymer Degradation and Stability. 2010; 95:997-1003.
Hagglund. Hydrochloric acid lignin (preliminary communication). Berichte der Deutschen Chemischen Gesellschaft [Abteilung] B: Abhandlungen (1923), 56B 1866-8. CODEN: BDCBAD ISSN: 0365-9488. Abstract only.
Hagglund. Wood Saccharification. A Modified Rheinau Process. 2011.
Hallac, et al. Biomass Characterization and Organosolv Pretreatment of Buddleja davidii. School of Chemistry and Biochemistry, Institute of Paper Science and Technology, Georgia Institute of Technology, Atlanta, GA. 2009.
Hallac, et al. Chemical Transformations of Buddleja davidii Lignin during Ethanol Organosolv Pretreatment. Energy Fuels. 2010; 24:2723-2732.
Hallac. Fundamental understanding of the biochemical conversion of buddleja davidii to fermentable sugars. Georgia Institute of Technology. May 2011.
Hallac. Lignin, a crash course. Dec. 23, 2009. Powerpoint.
Harris. Progress in the Chemistry of Lignin 1943-1954, Report No. 2020. USDA. Mar. 1955.
Hasegawa, et al. New Pretreatment Methods Combining a Hot Water Treatment and Water/Acetone Extraction for Thermo-Chemical Conversion of Biomass. Energy & Fuels. 2004; 18:755-760.
Hatcher. Chemical structural studies of natural lignin by dipolar dephasing solid-state $^{13}C$ nuclear magnetic resonance. Org. Geochem. 1987; 11(1):31-39.
Hayashi, et al. Preparation of activated carbon from lignin by chemical activation. Carbon. 2000; 38:1873-1878.
Hedlund et al. High Pressure and Temperature Conversion of Lignin and Black Liquor to Liquid Fuels. Master Thesis; Chalmers University of Technology; Sweden; 2010.
Hellenbrand et al. Integration of Wet Oxidation and Nanofiltration for Treatment of Recalcitrant Organics in Wastewater. Kinetic, Catalysts and Reaction Engineering; 1997; 36; 5054-5062.
Hendriks, et al. Pretreatments to enhance the digestibility of lignocellulosic biomass. Bioresource Technology. 2009; 100:10-18.
Hergert. Infrared Spectra of Lignin and Related Compounds.11 Conifer Lignin and model compounds—Hergert in J. Org. Chem. 1960; 25:405-413.
Hernadez, et al. Role of lignin structure in foams formations and their stability. 2007.
Hettenhaus et al. Cellulase Assessment Report and Recommendations for Future Work. Ethanol Production from Biomass Hydrolysis; NREL report; 1997.
Holladay, et al. Top Value-Added Chemicals from Biomass vol. II—Results of Screening for Potential Candidates from Biorefinery Lignin. Pacific Northwest National Laboratory, Prepared for the U.S. Department of Energy. Oct. 2007.
Holm, et al. Ionic Liquids in the Pretreatment of Lignocellulosic Biomass. chapter 24, 545-560. 2011.
Holtman, et al. An NMR Comparison of the Whole Lignin from Milled Wood, MWL, and REL Dissolved by the DMSO/NMI Procedure. Journal of Wood Chemistry and Technology. 2007; 27:179-200.
Holtman, et al. Quantitative 13C NMR Characterization of MWL isolated by milling techniques. J Wood Chem Technol. 2006; 26:21-34.
Huang, et al. A review of separation technologies in current and future biorefineries. Separation and Purification Technology. 2008; 62:1-21.
Hyttinen, et al. Comparison of VOC emissions between air-dried and heat-treated Norway spruce (*Picea abies*), Scots pine (*Pinus sylvesteris*) and European aspen (*Populus tremula*) wood. Atmospheric Environment. 2010; 44:5028-5033.
Ibarra, et al. Isolation of high-purity residual lignins from eucalypt paper pulps by cellulase and proteinase treatments followed by solvent extraction. Enzyme and Microbial Technology. 2004; 35:173-181.
IBBC. Sequential Lignin Recovery & Purification (SLRP). Poster Session at the IBBC/BioPro Expo Mar. 14-16, 2011.

(56) References Cited

OTHER PUBLICATIONS

Intechfibres. Microscopic Analysis of pulps, papers and boards: For a Fundamental Knowledge of Fibre Structure. IntechFibers, research in fibers Nov. 2007.
Iqbal et al. Effect of heat treatment on thermal properties of pitch-based carbon fiber and pan-based carbon fiber carbon-carbon composites. Mechanical Properties and Performance of Engineering Ceramics and Composites VI. 2011:245-254.
Jacobsen et al. Xylose Monomer and Oligomer Yields for Uncatalyzed Hydrolysis of Sugarcane Bagasse Hemicellulose at Varying Solids Concentration. Industrial & Engineering Chemistry Research; 2002; 41; 1454-1461.
Jiang, et al. Perdeuterated pyridinium molten salt (ionic liquid) for direct dissolution and NMR analysis of plant cell walls. Green Chem. 2009; 11:1762-1766.
Jie-Wang et al. Hydrogenation of Alkali Lignin Catalyzed by Pd/C. APCBEE Procedia; 2012; 3; 53-59.
Johnson, et al. Stability Patterns of Methoxy Phenols under Alkaline Hydrolysis Conditions. 2011.
Johnson, et al. Use of lignin in the biorefinery. 7th International Forum of the International Lignin Institute, Barcelona, Spain, Apr. 27-28, 2005.
Johnson, et al. Use of lignin in the biorefinery. 7th International Forum of the International Lignin Institute, Barcelona, Spain, Apr. 27-28, 2005. Powerpoint.
Kadla, et al. Lignin-based carbon fibers for composite fiber applications. Carbon. 2002; 40:2913-2920.
Kauper. Sulfur-free lignin from alkaline pulping as emulsifiers. The international Lignin Institute, 5th international Forum Sep. 7, 2000, Bordeaux (France).
Keller, et al. Microbial Pretreatment of Biomass, Potential for Reducing Severity. Applied Biochemistry and Biotechnology. 2003; 105-108:27-41.
Khezami, et al. Production and characterisation of activated carbon from wood components in powder: Cellulose, lignin, xylan. Powder Technology. 2005; 157:48-56.
Khunsupat, et al. Molecular Weight Distribution of Lignin. Presentation; Georgia Institute of Technology. 2014.
Kim, et al. Pretreatment and fractionation of corn stover by ammonia recycle percolation process. Bioresource Technology. 2005; 96:2007-2013.
Kim, et al. Pretreatment of Corn Stover by Low-Liquid Ammonia Recycle Percolation Process. Applied Biochemistry and Biotechnology. 2006; 133:41-57.
Kim, et al. Supercritical CO2 pretreatment of lignocellulose enhances enzymatic cellulose hydrolysis. Bioresource Technology. 2001; 77:139-144.
Kintner III, et al. Carbohydrate Interference and Its Correction in Pectin Analysis Using the m-Hydroxydiphenyl Method. Journal of Food Science. 1982; 47:756-759.
Klein, et al. Modelling of lignin thermolysis. MIT. 1981; 77-88.
Kocheva et al. Structure and Antioxidant Characteristics of Wheat and Oat Lignins. Russian Journal of Applied Chemistry; 2005; 78(8); 1343-1350.
Kokol. Enzymatic functionalisation of fibre forming polymers using lignin substrates. Institute of Engineering Materials and Design, University of Maribor, Smetanova ul. 17, SI-2000 Maribor, Slovenia. 2008.
Kokol. Maribor Enzymatic functionalisationof fibre-forming polymers using lignin substrates. COST 50E / ILI workshop, Oct. 27-29, 2008, Dübendorf, Switzerland.
Koplan, et al. Certain Activated Carbon From China. U.S. International Trade Commission, Investigation No. 731-TA-1103 (Preliminary), Publication 3852, May 2006.
Kosa et al. Multistep and Direct Conversion of Lignin to Biofuels. PhD Thesis. Georgia Institue of Technology; 2012.
Koski. Applicability of crude tall oil for wood protection. Acta Univ. Oul. C 293, 2008, Oulun Yliopisto, Oulu 2008.
Koullas, et al. Analytical methods for lignin characterization—differential scanning calorimetry. Cellulose Chem. Technol. 2006; 40(9-10):719-725.
Kovalev, et al. Reaction of sprucewood pulp with hydrogen chloride dissolved in dichloroethane. Sbornik Trudov Ukrainskogo Nauchno-Issledovatel'skogo Instituta Tsellyulozno-Bumazhnoi Promyshlennosti (1966), No. 9 51-69. CODEN: SUTBAU ISSN: 0453-8560. Abstract only.
Kozlowski, et al. The role of high dispersion lignin in creation of UV protection in textiles. 8 Forum ILI, Rome, 2007.
Kozlowski, et al. The role of high dispersion lignin in creation of UV protection in textiles. 8 Forum ILI, Rome. Powerpoint. 2007.
Krall, et al. Pectin Hydrolysis: Effect of Temperature, Degree of Methylation, pH, and Calcium on Hydrolysis Rates. J. Agric. Food Chem. 1998; 46:1311-1315.
Kubo, et al. Lignin-based Carbon Fibers: Effect of Synthetic Polymer Blending on Fiber Properties. Journal of Polymers and the Environment. Apr. 2005; 13(2):97-105.
Kubo, et al. Poly(Ethylene Oxide)/Organosolv Lignin Blends: Relationship between Thermal Properties, Chemical Structure, and Blend Behavior. Macromolecules. 2004; 37:6904-6911.
Kubo, et al. Preparation of carbon fibers from softwood lignin by atmospheric acetic acid pulping. Carbon. 1998; 36(7-8):1119-1124.
Kubo, et al. Surface Porosity of Lignin/PP Blend Carbon Fibers. Journal of Wood Chemistry and Technology. 2007; 27: 257-271.
Kubo, et al. Thermal Decomposition Study of Isolated Lignin Using Temperature Modulated TGA. Journal of Wood Chemistry and Technology. 2008; 28(2):106-121.
Kumar, et al. Methods for Pretreatment of Lignocellulosic Biomass for Efficient Hydrolysis and Biofuel Production. Ind. Eng. Chem. Res. 2009; 48:3713-3729.
Kunamneni, et al. Fungal laccase—a versatile enzyme for biotechnological applications. Communicating Current Research and Educational Topics and Trends in Applied Microbiology. 2007; 233-245.
Labidi, et al. Isocyanate modified lignins for formulations of novolac resins. ILI's 7th Forum and Eurolignin meeting, Barcelona 2005. Powerpoint.
Laine. Structures of hemicelluloses and pectins in wood and pulp. degree of Doctor of Science, Helsinki University of Technology, Department of Chemical Technology, Laboratory of Organic Chemistry, Espoo, Finland, 2005.
Lake. A radically-new *liquid*-lignin recovery and purification process. TechLake & Associates LLC. Feb. 25, 2010.
Lake. Potential Commercial uses for lignin. Southeastern Bioenergy Confrence, Tifton GA, Aug. 4, 2010.
Lam. Steam explosion of biomass to produce durable wood pellets. The University of British Columbia (Vancouver). May 2011.
Lange, et al. On the implications of calibration techniques and detector systems on GPC-based analyses of lignin. Cost action FP 0901 (presentation), 2013.
Lee, et al. Ionic Liquid-Mediated Selective Extraction of Lignin From Wood Leading to Enhanced Enzymatic Cellulose Hydrolysis. Biotechnology and Bioengineering. Apr. 1, 2009; 102(5):1368-1376.
Lee, et al. Novolak PF resins prepared from phenol liquefied Cryptomeria japonica and used in manufacturing moldings. Bioresource Technology. 2008; 99:7247-7254.
Lepifre, et al. Enzymatic lignin modification for resin applications. 6th international confrence textile and polymer biotechnology, Ghent, Sep. 2009.
Leschinsky, et al. Detailed Mass Balance of the Autohydrolysis of Eucalyptus Globulus at 170C. BioResources. 2009; 4(2): 687-703.
Li, et al. Ethanol Organosolv Lignin-based Rigid Polyurethane Foam Reinforced with Cellulose Nanowhiskers. Institute of Paper Science and Technology. 2011.
Li, et al. Kraft Lignin-based Rigid Polyurethane Foam. Institute of Paper Science and Technology. 2011.
Li, et al. Lignin depolymerization/repolymerization and its critical role for delignification of aspen wood by steam explosion. Bioresource Technology 98 (2007) 3061-3068.

(56) References Cited

OTHER PUBLICATIONS

Li, et al. Steam explosion lignins; their extraction, structure and potential as feedstock for biodiesel and chemicals. Bioresource Technology. 2009.
Lignimatch. Future use of lignin in value added products: A roadmap for possible Nordic/Baltic innovation. The roadmap compiles inputs from the detailed technical reports delivered in the LigniMatch project during 2007-2009. For more information, see the project website at http://www.chalmers.se/gmv/EN/projects/lignimatch.
Liitia, et al. Application of Solid-State $^{13}$C NMR Spectroscopy and Dipolar Dephasing Technique to Determine the Extent of Condensation in Technical Lignins. Solid State Nuclear Magnetic Resonance. 2002; 21:171-186.
Lin et al. Chemical Thermostabilization for the Preparation of CArbon Fibers from Softwood Lignin. BioResources. 2012; 7(4): 5634-5646.
Liu, et al. Citrus Pectin: Characterization and Inhibitory Effect on Fibroblast Growth Factor-Receptor Interaction. J. Agric. Food Chem. 2001; 49:3051-3057.
Liu, et al. Partial flow of compressed-hot water through corn stover to enhance hemicellulose sugar recovery and enzymatic digestibility of cellulose. Bioresource Technology. 2005; 96:1978-1985.
Loe, et al. Vanillin from wood: A CO2-frien . . . Lignin-based vanillin draws on the original biorefinery concept. Green chemistry. May 1, 2011. Abstract only.
Lora, et al. Recent Industrial Applications of Lignin: A Sustainable Alternative to Nonrenewable Materials. Journal of Polymers and the Environment, Apr. 2002; 10(1-2):39-48.
Lora, et al. Use of sulfur-free lignin in wood adhesives: Industrial experiences and environmental impacts. 2005; 8-14.
Lora. Lignin recovery technology transfer: first industrial implementation of the LPS process in India. 2005.
Lora., et al. Autohydrolysis sf aspen milled wood lignin. AYMANC. an. J. Chem. 1980; 58:669-676.
Lund, et al. Enzymatic modification of kraft ligninthrough oxidative coupling with water-soluble phenols. Appl Microbiol Biotechnol. 2001; 55:6*9-703.
Macala, et al. Hydrogen Transfer from Supercritical Methanol over a Solid Base Catalyst: A Model for Lignin Depolymerization. ChemSusChem. 2009: 2:215-217.
Malherbe, et al. Lignin Chemistry and Selected Applications. ILI—International Lignin Institute, Internal work for Umbrella. Aug. 23, 2007.
Malutan, et al. Contribution to the Study of Hydroxymethylation Reaction of Alki lignin. BioResources. 2008; 3(1):13-20.
Malutan, et al. Lignin modification by epoxidation. BioResources. 2008; 3(4): 1371-1376.
Mandavgane et al. Desilication of agro based black liquor and green liquor using jet loop reactor. Indian Journal of Chemical Technology. 2007; 14: 606-610.
Manninen, et al. Comparing the VOC emissions between air-dried and heat-treated Scots pine wood. Atmospheric Environment. 2002; 36:1763-1768.
Marcano, et al. Surface activity of lignin fractions obtained at different pH values. 2005.
Martin, et al. Engineering a mevalonate pathway in *Escherichia coli* for production of terpenoids. Nature Biotechnology. 2003; 21(7):796-802.
Martin, et al. Studies on thermal properties of sisal fiber. Thermochemica Acta 2010, 506, 14-19.
Martinez-Inigo, et al. Time course of fungal removal of lipophilic extractives from Eucalyptus globulus wood. Journal of Biotechnology. 2000; 84:119-126.
Martin-Sampedro, et al. Combination of steam explosion and laccase-mediator treatments prior to Eucalyptus globulus kraft pulping. Bioresource Technology 2011; 102:7183-7189.
Masura. A mathematical model for neutral sulfite pulping of various broadleaved wood species. Wood Science and Technology. 1998; 32:1-13.

Mathias, et al. Production of Vanillin by Oxidation of Pine Kraft Lignins with Oxygen. Holzforschung. 1995; 49:273-278. Abstract only.
Mattinen, et al. Polymerization of different lignins by laccade. BioResources. 2008; 3(2):549-565.
McFeeters, et al. Measurement of Pectin Methylation in Plant Cell Walls. Analytical biochemistry. 1984; 139:212-2 17.
McMillan. Processes for Pretreating Lignocellulosic Biomass: A Review. NatioRnenaewlable Energy Laboratory, A Division of Midwest Research Institute, Operated for the U.S. Department of Energy , Under Contract No. DE-ACO2-83CH 10093. Nov. 1992.
Meister. Product synthesis, polymer characterization and applications testing of lignin graft copolymers. The international Lignin Institute, 5th international Forum Sep. 7, 2000, Bordeaux (France).
Mendes, et al. Extraction of hemicelluloses prior to kraft cooking: a step for an integrated biorefinery in the pulp mill. XXI Tecnicelpa Conference and Exhibition/VI CIADICYP 2010. Oct. 12-15, 2010.
Mesfun. Integration of hot water extraction in biomass based CHP plants-possibilities for green-chemicals and increased electricity production. Integration of hot water extraction in biomass based CHP plants-possibilities for green-chemicals and increased electricity production. 2010.
Meyer. Nanotechnology for fibers characterisation. CTP's Scientific and Technological Unit 'Process Pulp—IntechFibers', Jan. 5, 2009.
Montane, et al. Activated carbons from lignin: kinetic modeling of the pyrolysis of Kraft lignin activated with phosphoric acid. Chemical Engineering Journal. 2005; 106:1-12.
Morreel, et al. Mass Spectrometry-Based Sequencing of Lignin Oligomers. Plant Physiology. Aug. 2010; 153:1464-1478.
Mosier, et al. Features of promising technologies for pretreatment of lignocellulosic biomass. Bioresource Technology. 2005;96:673-686.
Mulder, et al. Lignin based controlled released coating. 2011.
Munoz, et al. Bioethanol production from bio-organosolv pulps of Pinus radiata and Acacia dealbata. J Chem Technol Biotechnol. 2007; 82:767-774.
Mussatto, et al. Production, characterization and application of activated carbon from brewer's spent grain lignin. Bioresource Technology. 2010; 101:2450-2457.
Myrvold. A new model for the structure of lignosulphonates. 2005.
Naae. New lignin chemicals and applications: new uses in petroleum recovery. The international Lignin Institute, 5th international Forum Sep. 7, 2000, Bordeaux (France).
Nagamatsu, et al. Cascade-type flow of lignocellulosic components through the phase-separation system. J. Adv. Sci. 2001; 13(3):517-520.
Nagy, et al. Catalytic hydrogenolysis of ethanol organosolv lignin. Holzforschung. 2009; 63:513-520.
Nagy, et al. Characterization of CO2 precipitated Kraft lignin to promote its utilization. Green Chem. 2010; 12:31-34.
Nagy. Biofuels from lignin and novel biodiesel analysis. PhD thesis. 2009; Georgia Institute of Technology.
Narayan et al. The promise of bioplastics. Presentation. Michigan State University. 2012.
Nassar, et al. Mechanism of thermal decomposition of lignin. Wood and fiber Science. 1984; 16(3):441-453.
Neilson et al. Evaluation of Organosolv Pulp as a Suitable Substrate for Rapid Enzymatic Hydrolysis. Biotechnology and bioengineering; 1983; 609-612.
Nguyen, et al. Is gel permeation chromatography applicable to lignin? 2007.
Nguyen, et al. Molecular weight and functional group analysis of a Soda lignin fractionated by ultrafiltration and selective dissolution. 2008.
Nguyen, et al. Molecular weight in LignoAnalyse 1, "Is GPC applicable to lignin?" Rome, Forum 8, May 10-12, 2007.
Nguyen. GPC- 2D FTIR : a novel technique for fractionated lignin characterization. SERMACS 2009.
Nikam et al. Density and Viscosity Studies of Glucose and Fructose Solutions in Aqueous and in NH4CL. Journal of Molecular Liquids; 2000; 87; 97-105.

(56) References Cited

OTHER PUBLICATIONS

Nitz. Lignin based polymer compounds and liquid wood. The international Lignin Institute, 5th international Forum Sep. 7, 2000, Bordeaux (France).

Nogueira, et al. Crude tall-oil sodium salts micellization in aqueous solutions studied by static and dynamic light scattering. Colloids and Surfaces A: Physicochemical and Engineering Aspects. 2001; 191: 263-268.

Norgren. Self-Aggregation of Kraft Lignin in Aqueous Solutions. 2005; 23-30.

Norman, et al. LXXIV. Studies on pectin. V. The hydrolysis of pectin. May 1, 1930; 649-660.

NREL. Enzyme Sugar-Ethanol Platform Project. National Renewable Energy Laboratory , Operated for the U.S. Department of Energy by Midwest Research Institute • Battelle • Bechtel. 2010.

Nyanhongo, et al. A new robust antioxidant activity measuring method based on laccase oxidation of syringaldazine. Graz University of Technology. 2009.

Oh, et al. Pretreatment of Lignocellulosic Biomass using Combination of Ammonia Recycled Percolation and Dilute-Acid Process. J. Int. Eng. Chem. 2002; 8(1):64-70.

Olarte et al. Base-Catalyst Depolimerization of Lignin and Hydrogenation of Lignin Model Compounds for Alternative Fuel Production. PhD Thesis; Georgia Institue od Technology. 2011.

Oliet, et al. Solvent effects in autocatalyzed alcohol-water pulping comparative study between ethanol and methanol as delignifying agents. Chemical Engineering Journal. 2002; 87:157-162.

On, et al. Studies on pulp and paper mill fiber residues as resources. (II). Studies on acid hydrolysis of sludge. Coll. Eng., Jeonbuk Univ., Jenzu, S. Korea. Polpu, Chongi Gisul (1985), 17(1), 38-44. CODEN: PCGIDY ISSN: 0253-3200. Abstract only.

Onda et al. Selective Hydrolysis of Cellulose and Polysaccharides into Sugars by Catalytic Hydrothermal Method Using Sulfonated Activated-carbon. Journal of Japan Petroleum Institue.2012; 55(2): 73-86.

ORNL. Manufacturing of Carbon Fibers Using Microwave Assisted Plasma Technology. Managed and operated by UT-Battelle, LLC for the U.S. Department of Energy under contract DE-AC05-00OR22725. 2005.

Oudia, et al. Analytical pyrolysis study of biodelignification of cloned Eucalyptus globulus (EG) clone and Pinus pinaster Aiton kraft pulp and residual lignins J. Anal. Appl. Pyrolysis. 2009; 85:19-29.

Ouensanga, et al. Thermal degradation of sugar cane bagasse. Thermochimica acta 1988, 125, 89-97.

Ouyang, et al. Chemical modification of lignin assisted by microwave irradiation. Holzforschung, vol. 65, 2011, DOI 10.1515/HF. 2011.067.

Pan et al. Effect of replacing polyol by organosolv and kraft lignin on the property and structure of rigid polyurethane foam. Biotechnology for biofuels. 2013; 6: 1-12.

Pan, et. al. Pretreatment of Lodgepole Pine Killed by Mountain Pine Beetle Using the Ethanol Organosolv Process: Fractionation and Process Optimization. Ind. Eng. Chem. Res. 2007;46: 2609-2617.

Pandey, et al. Lignin Depolymerization and Conversion: A Review of Thermochemical Methods. Chem. Eng. Technol. 2011; 34(1):29-41.

Papadopoulou, et al. The Challenge of Bio-Adhesives for the Wood Composite Industries. 2008.

Papajannopoulous, et al. GC-MS analysis of oleoresin of three Greek pine species. Holz als Roh- und Werkstoff. 2001; 59:443-446.

Pasco, et al. High Temperature Alkali Treatment of Kraft Black Liquor. This poster was presented at the 15th International Symposium on Wood, Fibre and Pulping Chemistry in Oslo on Jun. 15-18, 2009.

Pasquini, et al. Extraction of lignin from sugar cane bagasse and Pinus taeda wood chips using ethanol-water mixtures and carbon dioxide at high pressures. J. of Supercritical Fluids. 2005; 36:31-39.

Pasquini, et al. Sugar cane bagasse pulping using supercritical CO2 associated with co-solvent 1-butanol/water. J. of Supercritical Fluids. 2005; 34:125-131.

Pearl. Vanillin from Lignin Material. J. Am. Chem. Soc., 1942; 64(6):1429-1431. Abstract only.

Pecina, et al. GC-MS and HPLC analyses of lignin degradation products in biomass hydrolyzates. Fresenius Z Anal Chem. 1986; 325:461-465.

Pepper, et al. Improvements in the acidolysis procedure for lignin isolation and in the procedure for the analysis of lignin oxidation products. Can J. Chem. 1961; 39:390-391.

Pepper, et al. The effect of initial acid concentration on the lignin isolated by the acidolysis of aspen wood. Can J. Chem. 1961; 39:1454-1461.

Pepper, et al. The Isolation of a Representative Lignin Fraction From Wood and Straw Meals. Canadian J. of Chemistry. 1962; 40:1026-1028.

Perez, et al. Study of the behavior of metal adsorption in acid solutions on lignin using a comparison of different adsorption isotherms. Lat. Am. appl. res. v.37 n.2 Bahia Blanca Apr. 2007.

Perng et al. Pilot Treatment of OCC-based Paper Mill Wastewater Using Pulsed Electrocoagulation. Water Qual. Res. J. Canada; 2007; 42(1); 63-71.

Perng et al. Treatment of a Specialty Paper Mill Wastewater Using a Pilot-scale Pulsed Electrocoagulation Unit. Taiwan J for Sci; 2007; 22(3); 355-366.

Peterson, et al. Thermochemical biofuel production in hydrothermal media: A review of sub and supercritical water technologies. Energy & Enviromental Science. 2008; 1:32-65.

Pielhop, et al. Two-step approach for the conversion of kraft lignin into aromatic chemicals. NWBC 2011, Stockholm, Mar. 21-24, 2011.

Popa, et al. Composites based on natural resources: lignocelluloses, lignins and furan resins. 2008.

Popa, et al. On the interaction of lignins, furan resins and furfuryl alcohol in adhesive systems. Cellulose Chem. Technol. 2007; 41(2-3):119-123.

Popescu et al. Analytical methods for Lignin charactization. II. Spectroscopic studies. Cellulose Chemistry and Technology. 2006; 40(8): 597-621.

Pu, et al. Ionic Liquid as a Green Solvent for Lignin. Journal of Wood Chemistry and Technology. 2007; 27:23-33.

Pu, et al. NMR Characterization of C3H and HCT Down-Regulated Alfalfa Lignin. Bioenerg. Res. 2009; 2:198-208.

Pulping and Bleaching, PSE 476 powerpoint. 2011.

Pye. The Alcell Process—A Proven Alternative to Kraft Pulping. 1990 Pulping Conference, TAPPI Proceedings. 991-996.

Quinde. Enzymes in the pulp and paper industry: a review. 1994.

Qvintus-Leino. Utilisation of lignin in fiber board gluing. VTT Processes , Finland. 2003.

Ragan, et al. LignActiv—Activated Carbon from Renewable Resources—Lignin. Nordic Wood Biorefinery Conference. Stockholm, Mar. 24, 2011.

Ragauskas. Forest BioRefinery Lignin. School of Chemistry and Biochemistry, Georgia Institute of Technology. 2010.

Ragauskas. Rediscovering the Future of Lignin Chemistry. 2003.

Ramiah, et al. TGA and DTA of Cellulose, Hemicellulose, Lignin. J. Appl. Poly. Sci. 1970, 14, 1323-1337.

Reinhold. SEC of lignins. Mainz, Germany. 2007.

Reinhold. SEC of lignins. Mainz, Germany. Powerpoint. 2007.

Reith. Development of integrated lignocellulose biorefinery for co-production of chemicals, transportation fuels, electricity and heat. EU FP6 Integrated Project BIOSYNERGY. 2009.

Riga/Latvia. Wood-based adhesives: environmental aspects. 5th EU Programme project WOODPRO Integration of Latvian State Institute of Wood Chemistry in European Research Area. Workshop, Jul. 20-21, 2005.

Ritcey et al. Development of Industrial Solvent Extraction Processes. (Report) Gordon M. Ritcey & Associates, Inc; Nepean, Ontario, Canada.2004.

Robertson. Factors Governing the Nitration of Cellulose. PhD Thesis; Cornell University. 1946.

(56) References Cited

OTHER PUBLICATIONS

Robertson. The fractional extraction and quantitative determination of pectic substances in grapes and musts. Am. J. Enol. Vitic. 1979; 30(3):182-186.

Rogers, et al. The Advanced Materials Webinar Series: Carbon Fibers. Southern Advanced Materials in Transportation Alliance (SAMTA). 2011.

Ruiz-Rosa, et al. The production of submicron diameter carbon fibers by the electrospinning of lignin. Carbon. 2010; 48:696-705.

Saari et al. Adsorption Equilibria of Arabinose, Fructose, Galactose, Rhamnose, Sucrose, and Xylose on Ion-Exchange Resins. J. Chem. Eng.; 2010; 55; 3462-3467.

Saariaho et al. Development of the partial least squares models for the interpretation of the UV resonance Raman spectra of lignin model compounds. Vibrational Spectroscopy. 2005; 37(1): 111-121.

Saariaho. Resonance raman spextroscopy in the analysis of residual lignin and other unsaturated structures in chemical pulps. Helsinki University of Technology (Espoo, Finland) on Jan. 14, 2005.

Saltberg et al. Removal of metal ions from wood chips during acidic leaching 1: Comparison between Scandinavian softwood, birch and eucalyptus. Nordic Pulp and Paper Research Journal. 2006; 21: 507-512.

Saltberg, et al. Removal of metal ions from wood chips during acidic leaching 2: Modeling leaching of calcium ions from softwood chips. Nordic Pulp and Paper Research J. 2006; 21(4):513-519.

Samuel, et al. Structural Characterization and Comparison of Switchgrass Ball-milled Lignin Before and after Dilute Acid Pretreatment. Appli. Micr. BioTech. 2010, 162:62-74.

Sannigrahi, et al. Cellulosic biorefineries—unleashing lignin opportunities. Current Opinion in Environmental Sustainability. 2010; 2:383-393.

Sannigrahi, et al. Effects of Two-Stage Dilute Acid Pretreatment on the Structure and Composition of Lignin and Cellulose in Loblolly Pine. Bioenerg. Res. 2008; 1:205-214.

Sannigrahi, et al. Pseudo-lignin and pretreatment chemistry. Energy Environ. Sci. 2011; 4:1306-1310.

Saquin, et al. Lignin Oxidative Chemistry Using Supercritical / Expanded Media. 2005.

Sarkanen, et al. The development of plasticizers for alkylated kraft ligninbased polymeric materials. 2005.

Sarkanen, et al. The development of plasticizers for alkylated kraft ligninbased polymeric materials. Powerpoint. 2005.

Sato, et al. Determination of monosaccharides derivatized with 2-aminobenzoic Acid by capillary electrophoresis. Ana. BioChem. 1997; 251: 119-121.

Schaeffer. ASTM activated carbon standards. 2002.

Schuchardt et al. Hydrolysis of sugar cane bagasse with hydrochloric acid, promoted by metallic cations. Journal of Chemical Technology & Biotechnology. 1986; 36:329-334.

Schultz, et al. Proposed Mechanism for the Nitrobenzene Oxidation of Lignin. Holzforschung—International Journal of the Biology, Chemistry, Physics and Technology of W. 1986; 40(2):93-97.

Scifinder. Steam pretreatment of wood in relation to enzymatic hydrolysis. Final report. Energy Res. Abstr. 1989, 14(17), Abstr. No. 35904.

Selyanina, et al. Stabilization effect of microparticles of sulfate lignin on water-oil emulsion. 2005.

Sen, et al. Kraft lignin chain extension chemistry via propargylation, oxidative coupling, and claisen rearrangement. Biomacromolecules; 2013; 14(10); 3399-3408.

Sena-Martins, et al. Enzyme modified lignins for environment—friendly products. 2005.

Sena-Martins, et al. Enzyme modified lignins for environment—friendly products. Powerpoint. 2005.

Sendich, et al. Recent process improvements for the ammonia fiber expansion (AFEX) process and resulting reductions in minimum ethanol selling price. Bio. Tech. 2008; 99:8429-8435.

Shatalov, et al. Kinetics of organosolv delignification of fibre crop Arundo donax L. Industrial Crops and Products. 2005; 21:203-210.

Shen, et al. Lignin-Based Activated Carbon Fibers and Controllable Pore Size and Properties. Journal of Applied Polymer Science. 2011; 121:989-994.

Shulga, et al. Effect of rheological properties of the lignin-based adhesive on aggregating of light-textured soil. 2008.

Shulga. Advanced application of lignin-based adhesives. 2005; 42-47.

Simonell, et al. Lignin Pyrolysis Products, Lignans, and Resin Acids as Specific Tracers of Plant Classes in Emissions from Biomass Combustion. Environ. Sci. Technol. 1993; 27:2533-2541.

Singh, et al. Visualization of Biomass Solubilization and Cellulose Regeneration During Ionic Liquid Pretreatment of Switchgrass. Biotechnology and Bioengineering. Sep. 1, 2009; 104(1):68-75.

Sluiter et al. Determination of Structural Carbohydrates and Lignin in Biomass Determination of Structural Carbohydrates and Lignin in Biomass. Technical Report. NREL/TP-510-42618. 2008. Revised 2011.

Srndovic. Ultrastructure of the primary cell wall of softwood fibres studied using dynamic FT_IR spectroscopy. Licentiate Thesis, Royal Institute of Technology. Stockholm 2008.

Steele et al. Recent breakthroughs in enzymes for biomass hydrolysis. Presentation; National Ethanol Conference; Texas. 2009.

Stepnowski et al. Analysis of Environmental Fate and Quantitative Methods for Determination of Ionic Liquids. Conference report; International Conference on Enviromental Science and Technology. 2007; KOS, Greece.

Stewart. Lignin as a base material for materials applications: Chemistry, application and economics. Industrial crops and products. 2008; 207:202-207.

Sudo, et al. A New Carbon Fiber from Lignin. Journal of Applied Polymer Science. 1992; 44:127-134.

Sudo, et al. A New Modification Method of Exploded Lignin for the Preparation of a Carbon Fiber Precursor. Journal of Applied Polymer Science. 1993; 48:1485-1491.

Sun et al. Alkaline and Organosolv Lignins from Furfural Residue: Structural Features and Antioxidant Activity. BioResources. 2014; 9(1): 772-785.

Svensson. Minimizing the sulfur content in Kraft lignin. Degree Project, ECTS 30.0,At STFI-Packforsk, Stockholm, 2008.

Taherzadeh, et al. Pretreatment of Lignocellulosic Wastes to Improve Ethanol and Biogas Production: A Review. Int. J. Mol. Sci. 2008; 9:1621-1651; DOI: 10.3390/ijms9091621.

Tanase, et al. Mass Balance of Extractives Around Impressafiner in Mill and Pilot Scale. 2009. 1-6.

Tang, et al. Effect of Inorganic Salts on Pyrolysis of Wood, Cellulose, and Lignin Determined by Differential Thermal Analysis. U.S. Forest Service Research FPL 82 Jan. 1968.

TAPPI. Acid-insoluble lignin in wood and pulp. T 222 om-88, TAPPI 1988.

Tarabanko, et al. Mechanism for the Catalytic Oxidation of Lignin to Vanillin. Kinetic and Catalitysis. 2004; 45(4):569-577.

Tejado, et al. Isocyanate modified lignins for formulations of novolac resins. ILI's 7th Forum and Eurolignin meeting, Barcelona 2005.

Telysheva. Applicability of a free radical (DPPH) method for estimation of antioxidant activity of lignin and its derivatives. The international Lignin Institute, 5th international Forum Sep. 7, 2000, Bordeaux (France).

Terashima, et al. Solid state NMR spectroscopy of specifically 13C-enriched lignin in wheat straw from coniferin. Phytochemistry. 1997; 46(5):863-870.

Thielemans, et al. Lignin Esters for Use in Unsaturated Thermosets: Lignin Modification and Solubility Modeling. Biomacromolecules. 2005; 6:1895-1905.

Thompson, et al. Comparison of Pretreatment Methods on the Basis of Available Surface Area. Bioresource Technology. 1992; 39:155-163.

Timur, et al. Characterization and application of activated carbon produced from oak cups pulp. Journal of Analytical and Applied Pyrolysis. 2010; 89:129-136.

Toledano et al. Characterization of Key Functional Groups of Lignin. Presentation; 5th Italian meeting on lignocellulosic chemistry. 2009.

(56) References Cited

OTHER PUBLICATIONS

Toledano, et al. Characterization of key functional groups of lignin. 5th Italian meeting on lignocellulosic chemistry. Sep. 1-4, 2009—Villa Monastero Varenna (Lecco) Italy.
Toledano, et al. Study of fractionation of lignin by ultrafiltration and selective recipitation. 2009.
Tomani, et al. Development and demonstration of the lignoboost process. 2007.
Trickett. Utilization of Baggase for the production of C5 and C6 sugars. MS Thesis; University of Natal, Durban, South Africa. 1982.
Unal, et al. Dechlorination of Bleached Kraft Pulp by Laccase Enzyme Produced from Some White-Rot Fungi. Turk J Biol. 2001; 25:67-72.
Updegraff et al. Semimicro determination of cellulose in biological materials. Analytical biochemistry. 1969; 32(3):420-424.
Uraki, et al. Preparation of activated carbon fibers with large specific surface area from softwood acetic acid lignin. J Wood Sci. 2001; 47:465-469.
Vallejos et al. Chemical and physico-chemical characterization of lignins obtained from ethanol-water fractionation of bagasse. BioResources. 2011; 6: 1158-1171.
Van Dam, et al. Emerging markets for lignin and lignin derivatives. The quest of taming the last of the "wild bio-polymers". 2005.
Van Dam. Characterization of Sulfur-free lignins from alkaline pulping of annual fibre crops. The international Lignin Institute, 5th international Forum Sep. 7, 2000, Bordeaux (France).
Van De Pas, et al. Epoxy Resins from Lignin-derived Phenols. SCION next generation biomaterials. Poster 2009.
Vasile, et al. Thermogravimetry (TG) and derivative thermogravimetry (DTG) of lignin. Analytical methods for lignin characterization. International Lignin Institute Version: 1.2 Last date of review: Aug. 2008.
Vazquez, et al. Acetosolv pine lignin as copolymer in resins for manufacture of exterior grade plywoods. Bioresource Technology. 1999; 70:209-214.
Vazquez, et al. Effect of chemical modification of lignin on the gluebond performance of lignin-phenolic resins. Bioresource Technology. 1997; 60:191-198.
Vuori, et al. Liquefaction of Kraft Lignin: 1. Primary Reactions under Mild Thermolysis Conditions. Holzforschung—International Journal of the Biology, Chemistry, Physics and Technology of Wood , vol. 42 (3) de Gruyter—Jan. 1, 1988.
Wallmo, et al. Effect of precipitation conditions on properties of lignin from the LignoBoost process. 2007.
Wang, et al. Influence of steaming explosion time on the physic-chemical properties of cellulose from Lespedeza stalks (*Lespedeza crytobotrya*). Bioresource Technology. 2009; 100:5288-5294.
Wang. David Wang's Wood Chemistry Class. Basic Lignin Chemistry. 2011.
Wang. Thermal Modification of Wood. Faculty of Forestry University of Toronto. 2011.
Warren. Future Lower Cost Carbon Fiber for Autos: International Scale-up & What is Needed. Oak Ridge National Laboratory, Tennessee, USA. 2007.
Wood, et al. Determination of Methanol and Its Application to Measurement of Pectin Ester Content and Pectin Methyl Esterase Activity. Analytical biochemistry. 1971; 39:418-428.
Woodbridge et al. Nitrocellulose from wood pulp. J. Ind.Eng. Chem. 1920; 12(4):380-384.
Wyman, et al. Coordinated development of leading biomass pretreatment technologies. Bioresource Technology. 2005; 96:1959-1966.
Xie, et al. Opportunities with Wood Dissolved in Ionic Liquids. In Cellulose Solvents: Foe Analysis, Shaping and Chemical Modification. Chapter 19. 2010;343-363.
Yang, et al. Pretreatment: the key to unlocking low-cost cellulosic ethanol. Biofuels, Bioprod. Bioref 2008; 2:26-40.
Ye, et al. Spontaneous High-Yield Production of Hydrogen from Cellulosic Materials and Water Catalyzed by Enzyme Cocktails. ChemSusChem. 2009; 2:149-152.
Yeoh, et al. Comparisons between different techniques for water-based extraction of pectin from orange peels. Desalination 2008; 218:229-237.
Yoshida, et al. Gasification of biomass model compounds and real biomass in supercritical water. Biomass and Bioenergy.2004; 26:71-78.
Yuan, et al. Hydrolytic degradation of alkaline lignin in hot-compressed water and ethanol. Bioresource Technology 101 (2010) 9308-9313.
Zakzeski, et al. The Catalytic Valorization of Lignin for the Production of Renewable Chemicals. Chem. Rev. 2010; 110:3552-3599.
Zhang, et al. Quantitative 2D HSQC NMR Determination of Lignin-sub Structures by Selecting Suitable Internal Standard References. 2007.
Zheng, et functionalized al. Electron beam by lignin Italic induced changes in the surface properties of starch films 5 conference—Sep. 2-4—Varenna—2009.
Zheng, et al. Overview of biomass pretreatment for cellulosic ethanol production. Int J Agric & Biol Eng. 2009; 2(3):51-68.
Zheng, et al. Supercritical carbon dioxide explosion as a pretreatment for cellulose hydrolysis. Biotechnology Letters. Aug. 1995; 17(8):845-850.
Zhu et al. Equilibrium of Lignin Precipitation. Chulmers University of Technology; Technical report; Sweden. 2003.
Zhu, et al. Understanding methanol formation in pulp mills. 1999 International Environmental Conference, pp. 139-143.
Zimbardi, et al. Acid impregnation and steam explosion of corn stover in batch processes. Industrial Crops and Productions. 2007; 26:195-206.
U.S. Appl. No. 61/473,134, filed Apr. 7, 2011, Eyal.
U.S. Appl. No. 61/483,777, filed May 9, 2011, Jansen et al.
U.S. Appl. No. 61/487,319, filed May 18, 2011, Jansen et al.
U.S. Appl. No. 61/524,350, filed Aug. 17, 2011, Eyal et al.
U.S. Appl. No. 61/528,257, filed Aug. 28, 2011, Jansen et al.
U.S. Appl. No. 61/539,196, filed Sep. 26, 2011, Jansen et al.
U.S. Appl. No. 61/539,239, filed Sep. 26, 2011, Jansen et al.
U.S. Appl. No. 61/539,272, filed Sep. 26, 2011, Jansen et al.
U.S. Appl. No. 61/545,823, filed Oct. 11, 2011, Jansen et al.
Aden, et al. Lignocellulosic Biomass to Ethanol Process Design and Economics Utilizing Co-Current Dilute Acid Prehydrolysis and Enzymatic Hydrolysis for Corn Stover. National Renewable Energy Laboratory, NREL is a U.S. Department of Energy Laboratory Operated by Midwest Research Institute. Jun. 2002.
Adina, et al. Application of FTIR Spectroscopy for a Rapid Determination of Some Hydrolytic Enzymes Activity on Sea Buckthorn Substrate. Romanian Biotechnological Letters. 2010; 15(6):5738-5744.
ADM corn 42/43 syrup. Typical data information. Accessed Oct. 5, 2012.
Ahmed, et al. Preparation and studies on immobilized α-glucosidase from baker's yeast *Saccharomyces cerevisiae*. J. Serb. Chem. Soc. 2007; 72(12):1255-1263.
Albertson, et al. Addition Compounds of Sulfur Dioxide. Sep. 1943; 65:1687-1690.
Amidon, et al. Biorefinery: Conversion of Woody Biomass to Chemicals, Energy and Materials. Journal of Biobased Materials and Bioenergy. 2008; 2:100-120.
Antonoplis, et al. High pressure HC1 conversion of cellulose to glucose. Lawrence Berkeley National Laboratory, University of California, Paper LBL,14221. Aug. 1981.
Atsuki. Action of highly concentrated hydrochloric acid on cellulose. Seniso Kogyo (1925), 1 53-61. CODEN: SKOGBJ ISSN: 0371-070X. Abstract only.
Badger. Ethanol from cellulose: a general review. Trends in new crops and new uses. 2002; 17-21.
Bakker. Advanced physical/chemical fractionation. Workshop of the EU FP6, Integrated Project BIOSYNERGY. Nov. 17, 2011.
Baniel, et al. Porogen derived membranes. 1. Concept description and analysis. J. of Membrane Science. 1990; 54:271-283.
Baniel. Reactions and processes in Liquidliquid (L/L) systems. Pure & Appl. Chem. 1986; 58(6):879-883.

(56) References Cited

OTHER PUBLICATIONS

Barton. CRC handbook of solubility parameters and other cohesion parameters. CRC Press. Boca Raton. 1991; 122-138.
Bayat-Makooi, et al. Hydrolysis of cellulose with hydrochloric acid enhanced by cations. Dep. Wood Paper Sci., North Carolina State Univ., Raleigh, NC, USA. Editor(s): Kennedy, John F. Cellul. Its Deriv. (1985), 135-41. Publisher: Horwood, Chichester, UK CODEN: 54GPAW. Abstract only.
Beck, et al. Production of ethanol by bioconversion of wood sugars derived from two-stage dilute acid hydrolysis of hardwood. Biomass. 1984; 6:101-110.
Beg, et al. Cyclic transport of Fe3+ as H[FeCl4] and H[FeBr4] through a dibutyl ether-benzene membrane. Journal of Membrane Science. 1985; 24:97-100.
Berg, et al. The breaking of ternary acetate-alcohol-water azeotropes by extractive distillation. Chem. Eng. Commun. 1986; 48:93-101.
Bergius. Conversion of wood to carbohydrates and problems in the industrial use of concentrated hydrochloric acid. Industrial and Engineering chemistry. 1937; 29(3):247-253.
Bergius. The utilisation of wood for the production of foodstuffs, alcohol and glucose. Chemical society institution. Nov. 15, 1933.
Bergius. Winslow Notes on Bergius Process. 1937.
Bergius. Wood Sugar Plants at Mannheim-Rheinau & Regensburg. 1945.
Berndes, et al. The contribution of biomass in the future global energy supply: a review of 17 studies. Biomass and Bioenergy. 2003; 25:1-28.
Bilanicova, et al. Improvements in Enzymatic Preparation of Alkyl Glycosides. Czech J. Food Sci. 2010128(1): 69-73.
Binder, et al. Mechanistic insights on the conversion of sugars into 5-hydroxymethylfurfural. Energy Environ. Sci., 2010; 3:765-771.
Blommel, et al. Production of conventional liquid fuels from sugars. Virent energy systems. Aug. 25, 2008. 1-14.
Bochek. Effect of Hydrogen Bonding on Cellulose Solubility in Aqueous and Nonaqueous Solvents. Russian Journal of Applied Chemistry, vol. 76, No. 11, 2003, pp. 1711-1719.
Bozell. The Use of Renewable Feedstocks for the Production of Chemicals and Materials—A Brief Overview of Concepts. National Renewable Energy Laboratory, 1617 Cole Boulevard, Golden, CO 80401. 2010.
Bridgwater, et al. Identification and market analysis of most promising added-value products to be co-produced with the fuels. Project No. 212831, Project end date: May 31, 2010; 1-132.
Brown, et al. Initial Market Assessment for Small-Scale Biomass-Based CHP, Prepared under Task No. WF6N.1050. National Renewable Energy Laboratory. Jan. 2008.
Brown. Determination of Dry Substance in Beet Sugar Juices, A Precision Method. Industrial and Engineering chemistry. Jul. 1924; 16(7):746-748.
Brown. Mixed acid recovery with the APU™ acid sorption system. ECO-TEC, Technical Paper 147, Jan. 1997.
Brummer, et al. Understanding Carbohydrate Analysis. Chapter 2. Copyright 2005 by Taylor & Francis Group, LLC.
Brunner. Near critical and supercritical water. Part I. Hydrolytic and hydrothermal processes. J. of Supercritical Fluids. 2009; 47:373-381.
Bunker. The Wartime Production of Food Yeast in Germany. 2010.
Burchell, et al. The development of novel activated carbon composites. 17th Annual Conference on Fossil Energy Materials, Wyndham Baltimore Inner Harbor Hotel, Baltimore, Maryland, Apr. 22-24, 2003.
Bustos, et al. Modeling of the Hydrolysis of Sugar Cane Bagasse with Hydrochloric Acid. Applied Biochemistry and Biotechnology. 2003; 104:51-68.
Byrne. Expression, purification and crystallisation of membrane proteins. 2011.
Campbell,et al. The Saccharification of Wood by the Bergius process at Suddeutschen Holzversucherung Werke A.G. Regensburg. Report on visit to Suddeutschen Holzversucherung Werke A.G. Regensburg.CIOS trip No. 764, this target was visited on Aug. 9, 1945.
Campos. Calculations of VLE in electrolytes systems using chemical theory: aqueous acis chloridric system. 2nd Mercosur Congress on Chemical Engineering; 4th Mercosur Congress on Process Systems Engineering. 2008.
Cardona, et al. Production of bioethanol from sugarcane bagasse: Status and perspectives. Bioresource Technology. 2010; 101:4754-4766.
Carole, et al. Opportunities in the Industrial Biobased Products Industry. Applied Biochemistry and Biotechnology. 2004; 113-116:871-88.
Carr. The Biobased Revolution: How Biotechnology and Policy are Changing the Way Materials are Made. ASC Fall Convention & Expo. Oct. 11, 2005.
Carvalho, et al. Comparison of different procedures for the detoxification of eucalyptus hemicellulosic hydrolysate for use in fermentative processes. J Chem Technol Biotechnol 2006; 81:152-157.
Castro, et al. Ecologically safe alkyl glucoside-based gemini surfactants. ARKIVOC 2005 (xii) 253-267, ISSN 1424-6376.
Cayle, et al. The application of Mathews' Formula in Enzymatic Starch Conversions. Mar. 1966; 43:237-244.
CELUNOL. EESI Congressional Briefing. Sep. 22, 2006.
Chalov, et al. Continuous hydrolysis of plant tissue polysaccharides with 46-48% hydrochloric acid. III. Absorption of hydrogen chloride by moist wood. Izvestiya Vysshikh Uchebnykh Zavedenii, Lesnoi Zhurnal (1966), 9(6), 139-43. CODEN: IVZLAL ISSN: 0536-1036. Abstract only.
Chalov, et al. Continuous hydrolysis of plant tissue polysaccharides with 46-48% hydrochloric acid. IV. The problem of the limit concentration of sugars in the hydrolyzate. Sbornik Trudov, Vsesoyuznyi Nauchno-Issledovatel'skii Institut Gidroliza Rastitel'nykh Materialov (1965), 13 31-8. CODEN: SVGSAN ISSN: 0371-4322. Abstract only.
Chalov, et al. Continuous hydrolysis of plant tissues with 46-48% hydrochloric acid. VII. Composition of products of hydrolytic destruction of cellulose by concentrated hydrochloric acid. Zhurnal Prikladnoi Khimii (Sankt-Peterburg, Russian Federation) (1967), 40(4), 929-30. CODEN: ZPKHAB ISSN: 0044-4618. Abstract only.
Chalov, et al. Continuous hydrolysis of plant tissues with 46-48% hydrochloric acid. II. Effect of hydrogen chloride on oven-dry wood. Izv. Vysshikh Uchebn. Zavedenii, Lesn. Zh. (1963), 6(2), 141-4. Abstract only.
Chalov, et al. Continuous hydrolysis of wood with 46-48% hydrochloric acid. 1962), 5(No. B), 141-8. CODEN: IVZLAL ISSN: 0536-1036. Abstract only.
Chalov, et al. Differential hydrolysis of wood with concentrated hydrochloric acid in diffusion equipment. 1961), 4(6), 138-46. CODEN: IVZLAL ISSN: 0536-1036. Abstract only.
Chalov, et al. Equilibrium state in the system cellulose-hydrogen chloride-water-hydrolysis products. USSR. Sb. Tr. Vses. Nauch.-Issled. Inst. Gidroliza Rastit. Mater. (1968), 17 173-9. From: Ref. Zh., Khim 1969, Abstr. No. 15p23. Abstract only.
Chalov, et al. Hydrolysis of difficult-to-hydrolyze polysaccharides of wood with 30-6% hydrochloric acid at 20-40.deg. USSR. Sb. Tr. Vses. Nauch.-Issled. Inst. Gidroliza Rast. Mater. (1969), 18 58-66. From: Ref. Zh., Khim 1970, Abstr. No. 11P29. Abstract only.
Chalov, et al. Hydrolysis of hemicellulose components of pinewood with 30-36% hydrochloric acid. Zhurnal Prikladnoi Khimii (Sankt-Peterburg, Russian Federation) (1961), 34 1601-8. CODEN: ZPKHAB ISSN: 0044-4618. Abstract only.
Chalov, et al. Hydrolysis of hemicellulose components of pinewood with 30-36% hydrochloric acid at 30-40.deg. Gidroliznaya i Lesokhimicheskaya Promyshlennost (1968), 21(3), 4-6. CODEN: GLKPA2 ISSN: 0016-9706. Abstract only.
Chalov, et al. Hydrolysis of lignocellulose with 38-41% hydrochloric acid at 20°. Vysshikh Uchebn. Zavedenii, Lesn. Zh. (1964), 7(2), 137-43. Abstract only.
Chalov, et al. Hydrolysis of pinewood lignocellulose with 41% hydrochloric acid in a [6-] diffuser unit. Izvest. Vysshikh Ucheb. Zavedenii, Lesnoi Zhur. (1961), 4(No. 2), 131-7. Abstract only.

(56) References Cited

OTHER PUBLICATIONS

Chalov, et al. Hydrolysis of polysaccharides of pinewood with 38-41% hydrochloric acid at 20°. Zhurnal Strukturnoi Khimii (1962), 35(No. 6), 1347-55. CODEN: ZSTKAI ISSN: 0136-7463. Abstract only.
Chalov, et al. Hydrolysis of polysaccharides of plant fiber in concentrated aqueous and gaseous hydrochloric acid. Zhurnal Prikladnoi Khimii (Sankt-Peterburg, Russian Federation) (1960), 33 2743-50. CODEN: ZPKHAB ISSN: 0044-4618. Abstract only.
Chalov, et al. Hydrolysis of wood with concentrated hydrochloric acid. Gidroliznaya i Lesokhimicheskaya Promyshlennost (1959), 12(No. 4), 1-4. Abstract only.
Chalov, et al. Hydrolysis of wood with concentrated hydrochloric acid. Gidroliz. i Lesokhim. Prom. (1959), 12(No. 3), 3-5. Abstract only.
Chalov, et al. Hydrolysis of wood with gaseous hydrochloric acid under atmospheric pressure. Gidroliznaya i Lesokhimicheskaya Promyshlennost (1959), 12 14-18. Abstract only.
Chalov, et al. Two-stage hydrolysis of wood by use of mechanochemical degradation of lignocellulose in the presence of hydrochloric acid. Sbornik Trudov. Gosudarstvennyi Nauchno-issledovatel'skii Institut Gidroliznoi i Sul'fitno-spirtovoi Promyshlennosti (1966), 15 189-98. CODEN: SGSSAC. Abstract only.
Chalov, et al. Withdrawal of the heat of absorption during hydrolysis of wood with gaseous hydrogen chloride. 1962), 5(No. 1), 155-62. CODEN: IVZLAL ISSN: 0536-1036. Abstract only.
Chandra, et al. Substrate Pretreatment: The Key to Effective Enzymatic Hydrolysis of Lignocellulosics? Adv Biochem Engin/Biotechnol. 2007; 108: 67-93.
Chevalier, et al. Vapor-Liquid Equilibrium Data for the Systems H2O-H2SO4-HCl, H2O-H2SO4-HBr, and H2O-HBr at 780 mmHg Pressure. J. Chem. Eng. Data. 1980; 25:271-273.
Claricone Clarifiers and FiltraCone treatment plants. CB&I. Accessed Nov. 30, 2011.
Cognis. MCT Redbook. Solvent Extraction Reagents and Applications. Cognis miningchemicals technology. 2010.
Cole. XCV. The determination of reducing sugars by titration of ferricyanide. Biochem. 1933 xxvii, pp. 723-726.
Coma, et al. alpha-Glucosidase and N-Acetyl-p-o-glucosaminidase Isoenzymes in Serum. Clin. Chem. 1992; 38(2):223-226.
Crittenden, et al. Extraction of Hydrogen Chloride from Aqueous Solutions. Engineering and Process Development. Feb. 1954; 46(2):265-274.
Cui. Structural Analysis of Polysaccharides. Chapter 3. Copyright 2005 by Taylor & Francis Group, LLC.
Curtis, et al. Equilibria in furfural—water systems under increased pressure and the influence of added salts upon the mutual solubilities of furfural and water. 1948; 213-235.
De Guzman. Bio-adipic acid prepares for entry. ICIS Chemical Business Sep. 27, 2010. www.icis.com.
De Los Rios, et al. Removal of Metal Ions from Aqueous Solutions by Extraction with Ionic Liquids. J. Chem. Eng. Data. 2010; 55:605-608.
Demirbas. Furfural Production from Fruit Shells by Acid-Catalyzed Hydrolysis, Energy Sources, Part A: Recovery, Utilization, and Environmental Effects. 2006; 28(2):157-165.
Demirbas. Products from lignocellulosic materials via degradation processes. Energy Sources, Part A. 2008; 30:27-37.
Dipardo. Outlook for Biomass Ethanol Production and Demand. Energy Information Administration. 2008; 1-14.
Drenkow. Wood Saccharification. A Modified Rheinau Process. 1976. DouglasDrenkow.com/write2a.html.
Duque. Acid-functionalized nanoparticles for hydrolysis of lignocellulosic feedstocks. Master of Science, Department of Biological and Agricultural Engineering, College of Engineering, Kansas State University, Manhattan, Kansas. 2009.
Dyadic. AlternaFuel® 200P, Product #326, (For considerations in biomass saccharification applications). 2010.
Dyadic. Enzyme Development for Fuel Ethanol Production from Pre-treated Biomass, Technical Report May 2010, Saccharification I.D: Sacc May 17, 2010.
Ehara, et al. A comparative study on chemical conversion of cellulose between the batch type and flow type systems in supercritical water. Cellulose. 2002; 9:301-311.
Elhanan, et al. Solvent Sublation of Iron( Ill) Chloride by Tri-n-Octylamine. Analytical chemistry. Apr. 1969; 40(4):671-674.
Excoffier, et al. Saccharification of Steam-Exploded Poplar Wood. Biotechnology and bioengineering. Dec. 20, 1991; 38(11):1308-1317.
Eyal, et al. A process for defluorination and purification of wet process phosphoric acids containing high al concentrations. Solvent Extraction and ion exchange. 1984; 2(4):677-697.
Eyal, et al. Extraction of Strong Mineral Acids by Organic Acid-Base Couples. Ind. Eng. Chem. Process Des. Dev. 1982, 21, 334-337.
Eyal, et al. pH dependence of carboxylicand mineral acid extraction by amine-based extractants: effects of pKa, Amine Basicity, and diluent properties. Ind. Eng. Chem. Res. 1995; 34:1789-1798.
Eyal, et al. Potassium Nitrate through Solvent Separation of Strong Acids. Ind. Eng. Chem. Process Des. 1985; 24:387-390.
Eyal, et al. Recovery and concentration of strong mineral acids from dilute solutions through LLX.I: review of parameters for adjusting extractant propert and analysis of process options. Solvent Extraction and ion exchange. 1991; 9(2):195-210.
Eyal, et al. Sulfuric acid recovery through solvent aided decomposition of ammonium sulfate. Solvent Extraction and ion exchange. 1986; 44:803-821.
Eyal, et al. Wet process phosphoric acid defluorination by aminebased extractants. Solvent Extraction and ion exchange. 1984; 2(4&5):659-675.
Fahim, et al. Liquid-Liquid Equilibria of the Ternary System Water + Acetic Acid + 1-Hexanol. J. Chem. Eng. Data. 1997; 42:183-186.
Foran, et al. Beyond 2025: Transitions to the biomass-alcohol economy using ethanol and methanol. Working Paper Series 99/07. Dec. 1999.
Foxit. Chemicals partition in wood. Mar. 2011.
Fungsin, et al. Conversion of cassava waste into sugar using Aspergillus niger and Trichoderma reesei for ethanol production. 2010.
Galbe, et al. A review of the production of ethanol from softwood. Appl Microbiol Biotechnol. 2002; 59:618-628.
Galbe, et al. Process Engineering Economics of Bioethanol Production. Adv Biochem Engin/Biotechnol. 2007; 108:303-327.
Galego, et al. Mechanism of the thermal resinification of pure furfural . Revista CENIC, Ciencias Fisicas. 1975; 6(1):163-180. Abstract only.
Gani, et al. Molecular design of solvents for liquid extraction based on unifac. Fluid Phase Equilibria. 1983; 13:331-340.
Garna, et al. Kinetic of the hydrolysis of pectin galacturonic acid chains and quantification by ionic chromatography. Food Chemistry. 2006; 96:477-484.
Genencor. Enzyme Products for Fuel Ethanol Production. Genencor, 2007 Danisco US Inc.
Georgopoulos, et al. Thermoplastic polymers reinforced with fibrous agricultural residues. 2009.
Goldstein, et al. The hydrolysis of cellulose with superconcentrated hydrochloric acid. Biotechnology and Bioengineering Symposium (1984), Volume Date 1983, 13(Symp. Biotechnol. Fuels Chem., 5th, 1983), 17-25. CODEN: BIBSBR ISSN: 0572-6565. Abstract only.
Goldstein. Potential for Converting Wood into Plastics, Chemicals from wood may regain importance as the cost of petroleum continues to rise. Science, Sep. 12, 1975; 189(4206):847-852.
Goto, et al. Supercritical Thermal Decomposition of Cellulose: Experiments and Modeling. Ind. Eng. Chem. Res. 1990; 29:1091-1095.
Gray, et al. Sugar Monomer and Oligomer Solubility, Data and Predictions for Application to Biomass Hydrolysis. Applied Biochemistry and Biotechnology. 2003; 105-108:179-193.
Greenwald. The dissociation of some calcium salts. Mar. 7, 1938; 437-452.

(56) References Cited

OTHER PUBLICATIONS

Grethlein, et al. The Cost of Ethanol Production from Lignocellulosic Biomass—A Comparison of Selected Alternative Processes. USDA. Specific Cooperative Agreement No. 58-1935-2-050. Apr. 30, 1993.
Griffith, et al. Low cost carbon fiber for transportation application. USDE. 2003.
Grinbaum. An Integrated method for Development and Scaling up of Extraction Processes. "Ion Exchange and Solvent Extraction", Y. Marcus, A. Sangupta (eds.), vol. 15, Elsevier, 2002.
Guirguis, et al. Purification of phosphoric acid by a mixture of hydrophobic and hydrophilic extractants. Adv. Process. Met. Mater., Sohn Int. Sym. 2006; 3:451-465.
Hagglund. Report of the research activities of the Cellulose Laboratory (Stockholm, Sweden) during the year 1941. Svensk Papperstidning (1942), 45 123-35. Abstract only.
Hagglund. The Decomposition of Wood by Acids wood Saccharification. Chemistry of Wood. New York: Academic Press, 1951. 631. Chapter IV. 390-413.
Hall, et al. Wood saccharification. USDA. Unasylva. 2007; 10(1).
Hall. Polyhydric alcohol from wood. US Department of Agriculture, Forest Service, Forest Products Laboratory, Madison, Wisconsin. No. 1984. Jul. 1954.
Hallac, et al. Biomass Characterization of Buddleja davidii: A Potential Feedstock for Biofuel Production. J. Agric. Food Chem. 2009; 57(4):1275-1281.
Hamelinck, et al. Ethanol from lignocellulosic biomass: techno-economic performance in short-, middle- and long-term. Biomass and Bioenergy. 2005; 28:384-410.
Hamelinck, et al. Production of advanced biofuels. International Sugar Journal. 2006; 108(1287):168-175.
Han, et al. Optimizing lignocellulosic feedstock for improved biofuel productivity and processing. Biofuels, Bioprod. Bioref. 2007; 1:135-146.
Harada, et al. Formation of Isoamylase by Pseudomonas. Applied Microbiology. Oct. 1968; 16(10):1439-1444.
Harris, et al. Hydrolysis of wood cellulose with hydrochloric acid and sulfur dioxide and the decomposition of its hydrolytic products. Journal of Physical and Colloid Chemistry. (1949), 53:344-51. Abstract only.
Harris, et al. The Madison Wood-Sugar Process. US Dept. of Agriculture. Jun. 1946; 1-21.
Harris. Derived products and chemical utilization of wood waste. Forest Products Laboratory; Forest Service US Department of Agriculture; Rept. No. R1666-10. Jun. 1949.
Harrison. CLVII. A note on the solubilities of calcium soaps. 1924; 1222-1223.
Hatch, et al. acid retardation, A Simple Physical Method for Separation of Strong Acids from Their Salts. I & E C process design and development. Oct. 1963; 2(4):253-263.
Hatcher. Dipolar-Dephasing $^{13}$C NMR Studies of Decomposed Wood and Coalified Xylem Tissue:Evidence for Chemical Structural Changes Associated with Defunctionalization of Lignin Structural Units during Coalification. Energy. Fuels. 1988; 2:48-58.
Havlik, et al. Atmospheric leaching of EAF dust with diluted sulphuric acid. Hydrometallurgy. 2004; doi:10.1016/j.hydromet.2004.10.008.
Hawley, et al. Comparison of hydrogen fluoride saccharification of lignocellulosic materials with other saccarification technologies. Energy in Agriculture. 1983; 2:219-244.
Hayes, et al. The Biofine Process: Production of Levulinic Acid, Furfural and Formic Acid from Lignocellulosic Feedstocks. Biorefinery (8b). 2011.
Held. Catalytic conversion of renewable plant sugars to fungible liquid hydrocarbon fuels using the bioforming process. TAPPI IBBC session 3. Virent Energy systems. Oct. 15, 2009.
Heppolette, et al. Effect of a-methylation on the parameters characterizing hydrolysis in water for a series of halides and sulfonates. Canadian Journal of Chemistry. 1966; 44:677-684.
Herrera, et al. Effect of the hydrochloric acid concentration on the hydrolysis of sorghum straw at atmospheric pressure. Journal of Food Engineering.2004; 63:103-109.
Herrera, et al. Production of Xylose from Sorghum Straw Using Hydrochloric Acid. Journal of Cereal Science. 2003; 37:267-274.
Herty. Advanced Materials Development Center. HC1 Clean Tech Composite Sample—Extracted Wood Sample. 2010.
Heuts, et al. Chrysosporium lucknowense cellulase production platform for applications in biorefineries. DYADIC® Netherlands. 2010.
Higgins, et al. Hydrolysis of cellulose using HCL: A comparison between liquid phase and gaseous phase processes. Agricultural wastes. 1982; 4:97-116.
Hinz, et al. Hemicellulase production in Chrysosporium lucknowense C1. Journal of Cereal Science. 2009; 50(3):318-323. doi:10.1016/j.jcs.2009.07.005.
Hirst, et al. CCCLXXXII.—The action of highly concentrated hydrochloric acid on cellulose and on some derivatives of glucose and of xylose. 1923; 3226-3235.
Hiwale, et al. Industrial Applications of Reactive Distillation: Recent Trends. International Journal of Chemical Reactor Engineering, vol. 2 [2004], Review R1. 1-54.
Hodge. Chemistry of Browning Reactions in Model Systems. Agricultural and Food Chemistry. Oct. 14, 1953; 1(15):928-943.
Holota, et al. One-stage hydrolysis of beechwood sawdust by gaseous hydrogen chloride. Vyskum (1967), (2), 105-18. CODEN: DRVYAP ISSN: 0012-6136. Abstract only.
Horsley, et al. Azeotropic Data—II, No. 35, Advances in Chemistry Series. American Chemical Society, Washington, D.C. 1962.
Horvath, et al. IUPAC-NIST Solubility Data Series 68. Halogenated Aliphatic Hydrocarbon Compounds C3—C1 With Water. J. Phys. Chem. Ref. Data. 1999; 28(3):649-777.
Hou-Rui, et al. Novel Isolates for Biological Detoxification of Lignocellulosic Hydrolysate. Appl Biochem Biotechnol 2009; 152:199-212.
Howarth, et al. Methane and the greenhouse-gas footprint of natural gas from shale formations, A letter. Climatic Change, Accepted: Mar. 13, 2011, DOI 10.1007/s10584-011-0061-5.
Hu, et al. Chemical profiles of switchgrass. Bioresource Technology. 2010; 101:3253-3257.
Huber, et al. Synthesis of Transportation Fuels from Biomass: Chemistry, Catalysts, and Engineering. Chemical Reviews. Published on Web Jun. 27, 2006 Page EST: 54.3, 10.1021/cr068360d.
Huber. Breaking the Chemical and Engineering Barriers to Lignocellulosic Biofuels: Next Generation. Based on the: Jun. 25-26, 2007 ,Workshop, Washington D.C.
Hutchins, et al. Aqueous polar aprotic solvents. Efficient sources of nucleophilic oxygen. J. Org. Chem. 1983; 48:1360-1362.
Ibrahim, et al. Comparison of alkaline pulping with steam explosion for glucose production from rice straw. Carbohydrate Polymers. 2011; 83:720-726.
International search report and written opinion dated Dec. 5, 2011 for PCT/IL2011/000517.
Iranmahboob, et al. Optimizing acid-hydrolysis: a critical step for production of ethanol from mixed wood chips. Biomass and Bioenergy. 2002; 22:401-404.
IsoClear 42% high fructose 80% solids corn syrup. Technical product information. Cargill. Updated Aug. 14, 2012.
Itzkowitz. Biodiesel from sugars. 2011.
Izydorczyk, et al. Polysaccharide Gums: Structures, Functional Properties, and Applications. Chapter 6. Copyright 2005 by Taylor & Francis Group, LLC.
Izydorczyk. Understanding the Chemistry of Food Carbohydrates. Chapter 1. Copyright 2005 by Taylor & Francis Group, LLC.
Jacobsen, et al. Cellulose and Hemicellulose Hydrolysis Models for Application to Current and Novel Pretreatment Processes. Applied Biochemistry and Bio. 2000; 84-86:81-96.
Johnson. Effects of Dilute Acid Hydrolyzate Components on Glucose Degradation. National Bioenergy Center, NREL, 1617 Cole Blvd., Golden, Colorado 80401, USA. 2011.

(56) References Cited

OTHER PUBLICATIONS

Kadam, et al. Generating Process and Economic Data Needed for Preliminary Design of PureVision Biorefineries. DOE Project No. DE-FG36-05GO85004, Final Nonproprietary Technical Report. Dec. 28, 2007.

Kaewwongsa, et al. Intestinal digestibility of the residual components of cassava pulp solid state fermentation by Saccharomyces cerevisiae. Suranaree J. Sci. Technol. 2009; 16(4):291-296.

Kamm, et al. Chemical and biochemical generation of carbohydrates from lignocellulose-feedstock (Lupinus nootkatensis)—quantification of glucose. Chemosphere. 2006; 62:97-105.

Kamm, et al. Definition and technical status of Biorefineries. BioreFuture 2008, Tuesday Feb. 12, 2008, Brussels.

Katzen, et al. A View of The History of Biochemical Engineering. Advances in Biochemical Engineering/Biotechnology. 2000; 70:77-91.

Kauko. Similarity of the action of hydrochloric acid upon cellulose and humus. Ann. acad. sci. Fennicae (1927), 26A(No. 15), 3-7. Abstract only.

Khan, et al. Kinetic Study on Palm Oil Waste Decomposition. Biofuel's Engineering Process Technology. 2011. Chapter 22, pp. 523-536.

Khan, et al. PROTOBIND 1075—An Indigenous Economical and Eco-friendly Renewable Raw Material for the Plywood Industry. 2011.

Kim, et al. Continuous Countercurrent Extraction of Hemicellulose from Pretreated Wood Residues. Applied Biochemistry and Biotechnology. 2001; 91-93:253-267.

Kim, et al. Enzyme hydrolysis and ethanol fermentaion of liquid hot water and AFEX pretreated distillers' grains at high-solid loadings. Bio. Tech. 2008; 99:5206-5215.

Kimberley, et al. A colorimetric method for the quantitation of galacturonic acid. Applied biochemistry and biotechnology. 1993; 43:51-54.

Kinders, et al. Saccharification of HC1-treated substrate provided by HCL-Cleantech, Technical Report, Mar. 2010. Dyadic International Inc. // Confidential and Proprietary Information.

Kireble, et al. The Electromotive Force Measurements of Hydrochloric Acid Solutions with and without Sucrose and their Relation to the Rate of Sucrose Hydrolysis. Chemical Laboratory of Trinity college. Jan. 1935; 57:19-22.

Kjellstrand, et al. Development of toxic degradation products during heat sterilization of glucose-containing fluids for peritoneal dialysis: influence of time and temperature. Perit Dial Int. 1995;15(1):26-32.

Kobayashi, et al. A continuous process for the synthesis of hexyl beta-D-glucoside in aqueous phase using immobilized-glucosidase and with 1-hexanolextractive product recovery. Biotechnology Letters. 2000; 22:1845-1848.

Kobayashi, et al. Synthesis of alkyl glycosides through b-glucosidase-catalyzed condensation in an aqueous-organic biphasic system and estimation of the equilibrium constants for their formation. Journal of Molecular Catalysis B: Enzymatic. 2000; 11:13-21.

Korotkov, et al. Continuous hydrolysis of plant tissues with 46-48 hydrochloric acid. VI. The effect of heat on wood saturated with gaseous hydrogen chloride, with simultaneous increase of the partial pressure of hydrogen chloride. Sbornik Trudov, Vsesoyuznyi Nauchno-Issledovatel'skii Institut Gidroliza Rastitel'nykh Materialov (1965), 14 180-91. Abstract only.

Kosswig, et al. A new Process for Obtaining Hydrogen Chloride from Dilute Hydrochloric Acid. Chemical Economy & Engineering Review. Jun. 1983; 15(6)(No. 169):30-33.

Kribble, et al. The Electromotive Force Measurements of Hydrochloric Acid Solutions with and without Sucrose and their Relation to the Rate of Sucrose Hydrolysis. Jan. 1935; 57:19-22.

Kucuk, et al. Biomass Conversion Processes. Energy Conyers. Mgmt. 1997; 38(2):151-165.

Kumar, et al. Effect of Enzyme Supplementation at Moderate Cellulase Loadings on Initial Glucose and Xylose Release From Corn Stover Solids Pretreated by Leading Technologies. Biotechnology and Bioengineering. Feb. 1, 2009; 102(2):457-567.

Kusama, et al. Wood saccharification by gaseous hydrogen chloride. Chisso Corp., Tokyo, Kogyo Kagaku Zasshi. 1966. Parts 1-V and VIII. Abstracts only.

Lam, et al. Kinetic Modeling of Pseudolignin Formation in Steam Exploded Woody Biomass. 2011.

Lange, et al. Lignocellulose conversion: an introduction to chemistry, process and economics. Biofuels, Bioprod. Bioref. 2007; 1:39-48.

Lapan, et al. Hydrochloric and sulfuric acid hydrolyzates of fir wood. Izvestiya Nauchno-Issledovatel'skogo Instituta Nefte-i Uglekhimicheskogo Sinteza pri Irkutskom Universitete (1970), 12 102-4. CODEN: INEUBO ISSN: 0367-9195. Abstract only.

Lavarack, et al. The acid hydrolysis of sugarcane bagasse hemicellulose to produce xylose, arabinose, glucose and other products. Biomass and Bioenergy. 2002; 23:367-380.

Lebedev, et al. Hydrolysis of cellulose with concentrated hydrochloric acid at different temperatures. Sb. Tr., Gos. Nauchn.-Issled. Inst. Gidrolizn i Sul'fitno-Spirt. Prom. (1961), 9 7-19. Abstract only.

Lebedev, et al. Hydrolysis of wood with concentrated hydrochloric acid solutions at different temperatures. Sb. Tr., Gos. Nauchn.-Issled. Inst. Gidrolizn i Sul'fitno-Spirt. Prom. (1961), 9 20-35. Abstract only.

Lee, et al. Dilute-Acid Hydrolysis of Lignocellulosic Biomass. Advances in Biochemical Engineering/ Biotechnology. 1999; 65:93-115.

Lee, et al. Solvent Extraction of Zinc from Strong Hydrochloric Acid Solution with Alamine336. Bull. Korean Chem. Soc. 2009; 30(7):1526-1530.

Leonard, et al. Fermentation of wood sugars to ethyl alcohol. US Department of Agriculture, Forest Service, Forest Products Laboratory, Madison, Wisconsin. No. R1466. Dec. 1944.

Leshchuk, et al. Continuous hydrolysis of plant tissue with 45-48% hydrochloric acid. V. Equilibrium in the system polysaccharides-hydrolysis products-hydrochloric acid. Gidrolizn. i Lesokhim Prom. (1965), 18(5), 10-13. Abstract only.

Leshchuk, et al. Intensification of differential hydrolysis of softwood with concentrated hydrochloric acid in a diffusion apparatus. USSR. Sb. Tr. Vses. Nauch.-Issled. Inst. Gidroliza Rast Mater. (1968), 17 16-73. From: Ref. Zh., Khim 1969, Abstr. No. 17P20. Abstract only.

Leshchuk, et al. Penetration of concentrated hydrochloric acid into the pores of wood particles and the formation of hydrolyzates within the particles. Sbornik Trudov. Gosudarstvennyi Nauchno-issledovatel'skii Institut Gidroliznoi i Sul'fitno-spirtovoi Promyshlennosti (1966), 15 156-67. CODEN: SGSSAC. Abstract only.

Li, et al. Acidolysis of Wood in Ionic Liquids. Ind. Eng. Chem. Res. 2010; 49(7):3126-3136.

Li, et al. Interaction of Supercritical Fluids with Lignocellulosic Materials. Ind. Eng. Chem. Res. 1988; 27:1301-1312.

Lin, et al. Ethanol fermentation from biomass resources: current state and prospects. Appl Microbiol Biotechnol. 2006; 69:627-642.

Lin, et al. Liquid-Liquid Equilibria for Ternary Mixtures of Water + Ethanol with 1-Hexanol, Butyl Propionate, or Ethyl Caproate. J. Chem. Eng. Data. 2003; 48:587-590.

Liu, et al. Effects of Lignin-Metal Complexation on Enzymatic Hydrolysis of Cellulose. J. Agric. Food Chem. 2010; 58:7233-7238.

Liu, et al. Solvation of Extracted Complex Metal Acids. VII. An Improved Model. The Journal of Physical Chemistry. 1974; 78(25):2572-2575.

Liu. Understanding Starches and Their Role in Foods. Chapter 7. Copyright 2005 by Taylor & Francis Group, LLC.

Locke. Chemical Conversion Products from wood. USDA. Aug. 1960.

Long, et al. Application of the Ho Acidity Function to kinetics and Mechanisms of acid Catalysis. Mar. 30, 1957; 935-1010.

Lora. GreenValue—Technologies and Products. GreenValueEnterprises LLC, Media, PA, USA. 2011.

Lora. Non-Wood Biorefinery Developments Outside North America. 2011.

(56) References Cited

OTHER PUBLICATIONS

Lynd, et al. Strategic Biorefinery Analysis: Analysis of Biorefineries, Jan. 24, 2002-Jul. 1, 2002. Subcontract Report, NREL/SR-510-35578, Jan. 10, 2005.
Mabee, et al. Updates on Softwood-to-Ethanol Process Development. Applied Biochemistry and Biotechnology, 2006;129-132:55-70.
MacKenzie, et al. The solvent extraction of some major metals an overview. 2010.
Mai, et al. Biotechnology in the wood industry. Appl Microbiol Biotechnol; 2004; 63:477-494.
Marchal, et al. Conversion into acetone and butanol of lignocellulosic substrates pretreated by steam explosion. Biotechno!ogy Letters. 1986; 8(5):365-370.
Marchal, et al. Large-Scale Enzymatic Hydrolysis of Agricultural Lignocellulosic Biomass. Part 2: Conversion into Acetone-Butanol. Bioresource Technology. 1992; 42:205-217.
Marker, et al. Optical properties of glucose. 2009.
Marone, et al. Effect of particle sizes on the kinetics of drying of a hydrochloric acid hydrolysate mass. Gidroliznaya i Lesokhimicheskaya Promyshlennost (1976), (3), 15. CODEN: GLKPA2 ISSN: 0016-9706. Abstract only.
Mascal, et al. Direct, High Yield Conversion of Cellulose into Biofuel. Angew. Chem. Int. Ed. 2008; 7:7924-7926.
Mascal, et al. High-Yield Chemical Conversion of Biomass into Biofuels and Value added Products. Clean Technology 2010, www.ct-si.org, ISBN 978-1-4398-3419-0. 124-127.
Mascal, et al. Towards the Efficient, Total Glycan Utilization of Biomass. ChemSusChem. 2009; 2:423-426.
McAloon, et al. Determining the Cost of Producing Ethanol from Corn Starch and Lignocellulosic Feedstocks. National Renewable Energy Laboratory, Contract No. DE-AC36-99-GO10337, NREL/TP-580-28893. Prepared under Task No. BFP1.7110. Oct. 2000.
McKenzie, et al. Levulinic acid. Organic Syntheses, Coll. vol. 1, p. 335 (1941); vol. 9, p. 50 (1929). Apr. 29, 2010.
Membralox ceramic membrane products. Pall corporation. 2004; 1-12.
Menchikov, et al. An Effective Method for Alcohol Preparation by Hydrolysis of Organohalides in the Presence of Copper and its Salts in Aqueous DMSO. Mendeleev Commun. 1995; 5(6): 223-224.
Mielenz. Ethanol production from biomass: technology and commercialization status. Current Opinion in Microbiology. 2001; 4:324-329.
Mikkola, et al. Hydrolytic decomposition of glycosides in aqueous acids. ARKIVOC 2009 (iii) 39-53.
Miljkovic. Carbohydrates, Synthesis, Mechanisms, and Stereoelectronic Effects. Springer Science+Business Media, LLC 2009.
Miller. Characteristics and Availability of Commercially Important Woods, Chapter 1. Forest Products Laboratory. 1999. Wood handbook—Wood as an engineering.
Miller. Structure of Wood. Chapter 2. 2009.
Miller. Utilization of wood under Germany's four year plan. Forests Products Division, Bureau of Foreign and Domestic Commerce U.S. Department of Commerce, Washington. 2009; 495-503.
Miller. Vapor-Liquid Equilibria below 0° C. of Hydrogen Chloride Solutions Saturated with Calcium Chloride. J. Chem. Eng. Data. 1990; 35:436-440.
Miller. Vapor-Liquid Equilibria of Water-Hydrogen Chloride Solutions below 0° C. J. Chem. Eng. Data 1983; 28:363-367.
Miller. Vapor-Liquid Equilibria of Water-Hydrogen Chloride-Sodium Chloride-Water Solutions below 0° C. J. Chem. Eng. Data. 1985; 30:296-301.
Minina, et al. Hydrolysis of various types of cellulosic raw materials with highly concentrated hydrochloric acid. I. Effect of time, temperature, and acid ratio on the yield of sugars. USSR. Strukt. Modif. Khlop. Tsellyul. (1966), No. 3 315-24. From: Ref. Zh., Khim. 1969, Abstr. No. 1P31. Abstract only.

Miyazawa, et al. Polysaccharide Hydrolysis Accelerated by Adding Carbon Dioxide under Hydrothermal Conditions. Biotechnol. Prog. 2005; 21:1782-1785.
Moelwyn-Hughes. The kinetics of the hydrolysis of certain glucosides, part 11: trehalose, umethylglucoside and tetramethyl-a-amethyglucoside. Nov. 23, 1928; 81-92.
Mooney, et al. The effect of initial pore volume and lignin content on the enzymatic hydrolysis of softwoods. Bioresource Technology. 1998; 64:113-119.
Moreschi, et al. Hydrolysis of Ginger Bagasse Starch in Subcritical Water and Carbon Dioxide. J. Agric. Food Chem. 2004; 52, 1753-1758.
Mosier, et al. Characterization of acid catalytic domains for cellulose hydrolysis and glucose degradation. Biotechnology and bioengineering, Sep. 20, 2002; 79(6):1-9.
Mosier, et al. Characterization of Dicarboxylic Acids for Cellulose Hydrolysis. Biotechnol. Prog. 2001; 17:474-480.
Mythili, et al. Synthesis, mechanical, thermal and chemical properties of polyurethanes based on cardanol. Bull. Mater. Sci. Jun. 2004 ;27(3):235-241.
Nevell. The hydrolysis of cotton cellulose by hydrochloric acid in benzene. Dep. Polym. Fibre Sci., Univ. Manchester Inst. Sci. Technol., Manchester, UK. Carbohydrate Research (1976), 49 163-74. CODEN: CRBRAT ISSN: 0008-6215. Abstract only.
Novozymes application sheet. Cellic® CTec2 and HTec2—Enzymes for hydrolysis of lignocellulosic materials, Fuel Ethanol. 2010.
Novozymes application sheet. CellicTM CTec and Htec, Advanced enzymes for hydrolysis of lignocellulosic materials. Novozymes A/S No. 2009-05048-01. 2009.
Novozymes. The key to the first commercially viable enzymes for cellulosic ethanol. 2010. www.bioenergy.novozymes.com.
NREL. Enzyme Sugar-Ethanol Platform Project. National Renewable Energy Laboratory, Operated for the U.S. Department of Energy by Midwest Research Institute • Battelle • Bechtel. 2010.
NWBC. Program, 3rd Nordic Wood Biorefinery Conference (NWBC 2011), Stockholm, Sweden, Mar. 22-24, 2011.
Nystrand. Feasibility of lignocellulose as feedstock for biological production of super absorbent polymers. Department of Physics, Chemistry and Biology Master's Thesis; Linköping University Department of Physics, Chemistry and Biology 581 83 Linkoping. Oct. 2010.
Odincovs, et al. The influence of temperature on the hydrolysis of wood and cellulose with concentrated hydrochloric acid. Trudy Inst. Lesokhoz. Problem, Akad. Nauk Latv. S.S.R. (1951), No. 2 68-82. Abstract only.
Odintsov, et al. Hydrolysis of woods with concentrated acids. Lesokhimicheskaya Promyshlennost (1940), 3(No. 9), 14-19. Abstract only.
Olsson, et al. Fermentation of lignocellulosic hydrolysates for ethanol production. Enzyme and Microbial Technology. 1996; 18:312-331.
Ong. Conversion of lignocellulosic biomass to fuel ethanol—a brief review. The planter kuala lumpur. 2004; 80(941):517-524.
Palmqvist, et al. Fermentation of lignocellulosic hydrolysates. II: inhibitors and mechanisms of inhibition. Bioresource Technology. 2000; 74:25-33.
Pan, et al. Biorefining of Softwoods Using Ethanol Organosolv Pulping: Preliminary Evaluation of Process Streams for Manufacture of Fuel-Grade Ethanol and Co-Products. Biotechnology and bioengineering. May 20, 2005; 90(4).
Papadopoulos, et al. The behavior of lignin during hydrolysis of sweetgum wood with concentrated hydrochloric acid at moderate temperatures. Dep. Wood Paper Sci., North Carolina State Univ., Raleigh, NC, USA. Holzforschung (1981), 35(6), 283-6. CODEN: HOLZAZ ISSN: 0018-3830. Abstract only.
Papadoupolous, et al. Behavior of sweetgum wood xylan and lignin during hydrolysis with concentrated hydrochloric acid at moderate temperatures. Dep. Wood Pap. Sci., North Carolina State Univ., Raleigh, NC, USA. Journal of Applied Polymer Science: Applied Polymer Symposium (1983), 37(Proc. Cellul. Conf., 9th, 1982, Part 2), 631-40. CODEN: JPSSDD ISSN: 0271-9460. Abstract only.

(56) References Cited

OTHER PUBLICATIONS

Parisi. Advances in Lignocellulosics Hydrolysis and in the Utilization of the Hydrolyzates. Advances in Biochemical Engmeering/Biotechnology. 1989; 38:53-87.
Paszner, et al. High-yield Organosolv process for conversion of cellulosic biomass to ethanol. Fac. For., Dep. Harvest. Wood Sci., Vancouver, BC, Can. Energy from Biomass and Wastes (1989), 12 1297-318. CODEN: EBWADU ISSN: 0277-7851. Abstract only.
Patel, et al. Medium and long-term Opportunities and Risks of the Biotechnological Production of Bulk Chemicals from Renewable Resources—The Potential of White Biotechnology The BREW project. Utrecht University. Sep. 2006. www.chem.uu.nl/nws.
Pazur. Reversibility of enzymatic transglucosylation reactions. Received for publication, Jan. 17, 1955, pp. 531-538.
Perlack, et al. Biomass as feedstock for a bioenergy and bioproducts industry: the technical feasibility of a billion-ton annual supply. U.S. Department of Energy, under contract DE-AC05-000R22725. Apr. 2005.
Pessoa Jr, et al. Acid hydrolysis of hemicellulose from sugarcane bagasse. Braz. J. Chem. Eng. vol. 14 No. 3 São Paulo Sep. 1997.
Petkevich, et al. Hydrolysis of wood with concentrated hydrochloric acid in a pilot battery of diffusers. Sb. Tr., Gos. Nauchn.-Issled. Inst. Gidrolizn i Sul'fitno-Spirt. Prom. (1960), 8 47-65. Abstract only.
Pettersen. The Chemical Composition of Wood. In: Rowell M., ed. The chemistry of solid wood. Advances in chemistry series 207. Washington, DC: American Chemical Society; 1984: Chapter 2.
Philip, et al. Review Polyhydroxyalkanoates: biodegradable polymers with a range of applications. J Chem Technol Biotechnol. 2007; 82:233-247.
Phillips, et al. Thermochemical Ethanol via Indirect Gasification and Mixed Alcohol Synthesis of Lignocellulosic Biomass. National Renewable Energy Laboratory, Technical Report NREL/TP-510-41168. Apr. 2007.
Phillips. Technoeconomic Analysis of a Lignocellulosic Biomass Indirect Gasification Process to Make Ethanol. Ind. Eng. Chem. Res. 2007; 46:8887-8897.
Pierce. Instruction Acylation Derivatization Reagents. Pierce, Rockford, IL 61105, US. 2010.
Ping, et al. Evaluation of grape stalks as a bioresource. Industrial Crops and Products. 2011; 33:200-204.
Pisarnitsky, et al. Effect of Acid Hydrolysis of Oak Wood on Its Aroma-Forming Complex. Applied Biochemistry and Microbiology. 2004; 40(6):613-616.
Pogaku, et al. Whey Protein Isolate-Starch System—A Critical Review. International Journal of Food Engineering: vol. 3 : Iss. 6, Article 1. 2007.
Poltoratskii, et al. Liquid-Vapor Equilibrium and Ionization of HCl in the System HCl-H2SO4-H2O at 298 K. Russian Journal of General Chemistry. 2002; 72(9):1339-1342.
Polymer Science. Making Polyurethane. Polymer Science Learning Center, Department of Polymer Science the University of Southern Mississippi. 2005.
Pontin. First, Cure Malaria. Next Global Warming. The New York times/SundayBusiness/Bright Ideas. Jun. 3, 2007.
Popa, et al. A comparison concerning separation and characterization of polyphenols from spruce wood bank. 2010.
Pospiech, et al. Studies on iron(III) removal from chloride aqueous solutions by solvent extraction and transport through polymer inclusion membranes with D2EHPA. Physicochem. Probl. Miner. Process. 2010; 44:195-204.
Prater, et al. Determination of Sulfur Dioxide in Dehydrated Foods. Industrial and engineering chemistry. Mar. 1944; 16(3):153-157.
Priefert, et al. Biotechnological production of vanillin. Appl Microbiol Biotechnol. 2001; 56:296-314. Abstract only.
Purolite. Corn sweetener refining with ion exchange resins guide. The Purolite Compant. 2007. 60 pages. www.purolite.com.
Qian, et al. Acidic Sugar Degradation Pathways an Ab Initio Molecular Dynamics Study. Applied Biochemistry and Biotechnology. 2005;121-124:989-997.
Rabinovich. Wood hydrolysis industry in the Soviet Union and Russia: a mini-review. Cellulose Chem. Technol.2010; 44(4-6):173-186.
Radiotis, et al. Optimizing Production of Xylose and Xylooligomers from Wood Chips. 3rd NWBC, Stockholm, Sweden Mar. 23, 2011.
Ragauskas, et al. From wood to fuels Integrating biofuels and pulp production. Industrial biotechnology. 2006; 2(1):55-65.
Ragauskas, et al. The Path Forward for Biofuels and Biomaterials. Science. Jan. 26, 2006; 311:484-489.
Rangamannar, et al. Improved wet bulk storage of bagasse for newsprint pulp production—part 1. Pulping conference TAPPI proceedings. 1993; 391-398.
Raz. Literature review on concentrated HCl hydrolysis of lignocellulosic material. Aug. 2008.
Raz. Weyland bioethanol report. 2010.
Readnour, et al. Thermodynamic Properties for the Dissociation of Bisulfate Ion and the Partial Molal Heat Capacities of Bisulfuric Acid and Sodium Bisulfate over an Extended Temperature Range. Inorganic Chemistry. Oct. 1969; 8(10):2174-2182.
Reese. A microbiological process report; enzymatic hydrolysis of cellulose. Appl Microbiol. Jan. 1956;4(1):39-45.
Ritcey. Development of Industrial Solvent Extraction Processes. Taylor & Francis Group, LLC. 2004.
Robbins, et al. Liquid-Liquid Extraction Operations and Equipment. Sec. 15. 2009.
Rockwood, et al. Energy Product Options for Eucalyptus Species Grown as Short Rotation Woody Crops. Int. J. Mol. Sci. 2008; 9:1361-1378; DOI: 10.3390/ijms9081361.
Rondinini, et al. Reference value standards and primary standards for pH measurements in Organic Solvents and Water + Organic Solvent Mixtures of Moderate to High Permittivities. Pure & Appl. Chem. 1987; 59(11):1549-1560.
Rovio, et al. Determination of monosaccharide composition in plant fiber materials by capillary zone electrophoresis. Journal of Chromatography A. 2008; 1185:139-144.
Rovio, et al. Determination of neutral carbohydrates by CZE with direct UV detection. Electrophoresis. 2007; 28:3129-3135.
Rozmarin, et al. Fermentative evaluation of prehydrolyzates from chemical cellulose manufacturing. II. Study on some factors affecting the inversion process. Rom. Revista Padurilor-Industria Lemnului-Celuloza si Hirtie: Celuloza si Hirtie (1977), 26(4), 158-62. CODEN: RPLHDX ISSN: 0258-2287. Abstract only.
Rugg. Optimization of the NYU continuous cellulose hydrolysis process. B01447 Biofuels Information Center. Dec. 1982.
Rumbold. Selection of production hosts for real-life feedstock utilization. TNO Kwaliteit van Leven, Oct. 20, 2007.
Rutten, et al. Measurements of the heats of dilution and description of the system $H_2O/H_2SO_4/HCl$ with a solvation model. Fluid Phase Equilibria. 1998; 153:317-340.
Saadatmand, et al. Prehydrolysis in softwood pulping produces a valuable biorefinery fraction for material utilization. Environ. Sci. Technol. Jul. 7, 2012; DOI: 10.1021/es301699n.
Saeman. Kinetics of the hydrolysis of wood and of the decomposition of sugars in dilute acid at high tempratures. USDA. Sep. 1944.
Saha, et al. Dilute Acid Pretreatment, Enzymatic Saccharification, and Fermentation of Rice Hulls to Ethanol. Biotechnol. Prog. 2005; 21:816-822.
Sanchez, et al. Structural analysis of acid catalysed furfuraldehyde resins by thermal degradation techniques. Eur. Polym. J. 1994; 30(1):43-50.
Sanchez, et al. Trends in biotechnological production of fuel ethanol from different feedstocks. Bioresource Technology. 2008; 99:5270-5295.
Sanders, et al. Shuttle hydrochloric acid process for the preparation of oligosaccharides containing products from wood. Comm Eur. Communities, [Rep.] EUR (1987), (EUR 11084, Degrad. Lignocellul. Ruminants Ind. Processes), 97-101. CODEN: CECED9 ISSN: 0303-755X. Abstract only.
Sasaki, et al. Cellulose hydrolysis in subcritical and supercritical water. J. of Supercritical Fluids. 1998; 13:261-268.
Sassner, et al. Techno-economic evaluation of bioethanol production from three different lignocellulosic materials. Biomass and bioenergy. 2008; 32:422-430.

(56) References Cited

OTHER PUBLICATIONS

Scaringelli, et al. Pre-hydrolysis of sweetgum wood—an integrated approach to the conversion of lignocellulose from wood into useful chemicals. Report (1979), (NSF/RA-790218; Order No. PB80-108640), 38 pp. From: Gov. Rep. Announce. Index (U. S.) 1980, 80(5), 810. Abstract only.

Schaefer. Bio-Based opportunities in chemicals & energy. Novozymes. London, UBS. Nov. 17, 2010.

Schlamadinger, et al. Effects of the Kyoto protocol on forestry and bioenergy products for mitigation of net carbon emissions. IEA Bioenergy, proceedings of the workshop. Apr. 1998. 202 pages.

Schlea, et al. Extraction of Iron, Cobalt, and Nickel Sulfates by Organic liquids. Industrial and engineering chemistry. Jun. 1957; 49(6):1056-1057.

Schoenemann. The New Rheinau Wood Saccharification Process. Institute of Chemical Technology. Jul. 27, 1953; 1-49.

Schutz. The hydrolysis of wood with hydrochloric acid or chlorides as catalysts in acetic acid solution. Zellwolle, Kunstseide, Seide (1942), 47:8-9. Abstract only.

Scurfield, et al. Amino-Acid Composition of Wood Proteins. J. Experimental Botany. 1970; 21(6):857-68.

Segatin, et al. Thermodynamics of the Solubility of Water in 1-Hexanol, 1-Octanol, 1-Decanol, and Cyclohexanol. Monatshefte fur Chemie. 2004; 135:241-248.

Sharkov, et al. Conversion of difficult-to-hydrolyze wood polysaccharides to an easy-to-hydrolyze condition with hydrogen chloride under pressure. USSR. Sb. Tr., Vses. Nauch.-Issled. Inst. Gidroliza Rast. Mater. (1971), No. 21 65-74, 205. Abstract only.

Sharkov. Production of Polyhydric Alcohols from Wood Polysaccharides. Angew. Chem. internat. Edit. 1963; 2(8):405-492.

Sheehan, et al. Energy and Environmental Aspects of Using Corn Stover for Fuel Ethanol. Journal of Industrial Ecology. 2004; 7(3-4):117-146.

Shen, et al. Product overview and market projection of emerging bio-based plastics, Utrecht University. PRO-BIP 2009.

Sherrard, et al. Review of wood saccharification processes in the United States Prior to World War II. Industrial and Engineering Chemistry. 1945. 37(1):1-10.

Shimizu, et al. Integrated process for total utilization of wood components by steam-explosion pretreatment. Biomass and bioenergy. 1998; 14(3):195-203.

Shorr, et al. Phase equilibria and the telomerization reaction. I & EC Fundamentals. 1963; 39(1):86-87.

Sidiras, et al. Simulation of acid-catalysed organosolv fractionation of wheat straw. Bioresource Technology. 2004; 94:91-98.

Sigma. Enzymatic Assay of α-Glucosidase. Sigma quality control test procedure. Sigma Product information, Revised: Aug. 9, 1996. Sigma. Enzymes and Reagents for Alternative Energy. Sigma-Aldrich. Biofiles. 2010; 5(5).

Sluiter, et al. Determination of Ash in Biomass, Laboratory Analytical Procedure (LAP), Issue Date: Jul. 17, 2005. Technical Report, NREL/TP-510-42622, Jan. 1, 2008.

Sluiter, et al. Determination of Sugars, Byproducts, and Degradation Products in Liquid Fraction Process Samples, Laboratory Analytical Procedure (LAP), Issue Date: Dec. 8, 2006. Technical Report, NREL/TP-510-42623, Jan. 1, 2008.

Sluiter, et al. Determination of Sugars, Byproducts, and Degradation Products in Liquid Fraction Process Samples. Laboratory Analytical Procedure (LAP), Contract No. DE-AC36-99-GO10337. Issue Date: Dec. 8, 2006.

Sluiter, et al. Determination of Total Solids in Biomass and Total Dissolved Solids in Liquid Process Samples, Laboratory Analytical Procedure (LAP), Issue Date: Mar. 31, 2008. Technical Report, NREL/TP-510-42621, Revised Mar. 2008.

So, et al. Economic Analysis of Selected Lignocellulose-to-Ethanol Conversion Technologies. Applied Biochemistry and Biotechnology. 1999; 77-79:633-640.

Soloman, et al. Grain and cellulosic ethanol: History, economics, and energy policy. Biomass and Bioenergy. 2007; 31:416-425.

Spaccini, et al. Molecular characteristics of humic acids extracted from compost at increasing maturity stages. Soil Biology & Biochemistry. 2009 41:1164-1172.

Srinorakutara, et al. Approach of Cassava Waste Pretreatments for Fuel Ethanol Production in Thailand. 2010.

Srinorakutara, et al. Utilization of Waste from Cassava Starch Plant for Ethanol Production. The Joint International Conference on "Sustainable Energy and Environment (SEE)" Dec. 1-3, 2004, Hua Hin, Thailand. 344-349.

Starr, et al. Water-enhanced solubility of carboxylic acids in organic solvents and its applications to extraction processes. Lawrence Berkeley Laboratory, University of California, Nov. 1991.

Steele. Recent breakthroughs in enzymes for biomass hydrolysis. Genecor. National Ethanol Conference, Feb. 23-25, 2009, San Antonio, Texas.

Steinbuchel. Polymeric and low molecular weight hydrophobic chemicals produced by microorganisms from renewables. Renewable Resources & Biorefineries Conference, Sep. 6-8, 2006, York, UK.

Stranges. Friedrich Bergius and the Rise of the German Synthetic Fuel Industry. Isis. Dec. 1984; 75(4):43-667.

Stranges. Synthetic fuel production in prewar and world war II Japan: A case study in technological failure. Annals of Science. 1993; 50:229-265.

Structure of Wood. US Department of Agriculture, Forest Service, Forest Products Laboratory, Research Note FPL-04. Mar. 1980.

Suess. Interaction of organic compounds with calcium carbonate-I. Association phenomena and geochemical implications. Geochimia et Cosmochimic Acata. 1970; 34:157-168.

Sun, et al. Hydrolysis of lignocellulosic materials for ethanol production: a review. Bioresource Technology. 2002; 83:1-11.

Taherzadeh, et al. Acid-Based hydrolysis Processes for Ethanol from Lignocellulosic materials: A Review. Bioethaol review, BioResources. 2007; 2(3):472-499.

Tanaka, et al. Effect of Pore Size in Substrate and Diffusion of Enzyme on Hydrolysis of Cellulosic Materials with Cellulases. Biotechnology and Bioengineering. 1998; 32:698-706.

Thomsen. How 'green' are algae farms for biofuel production? Biofuels. 2010; 1(4):515-517.

Timell, et al. The acid hydrolysis of glycosides II. Effect of substituents at C-5. Canadian Journal of Chemistry. 1965; 43:2296-2305.

Timell. The acid hydrolysis of glycosides I. General conditions and the effect of the nature of the aglycone. Canadian Journal of Chemistry. 1964; 42:1456-1471.

Troitskii. Colloid chemical mechanism of the separation of some elements by extraction. Russ. Chem. Rev. 163; 32:116-120.

Urban, et al. Characterization of polymer-based monolithic capillary columns by inverse size-exclusion chromatography and mercury-intrusion porosimetry. Journal of Chromatography A. 2008; 1182:161-16.

Usde. Advanced Technologies for the Control of Sulfur Dioxide Emissions from Coal-Fired Boilers, A report on three projects conducted under separate. Clean Coal Technology. Topical Report No. 12, Jun. 1999.

Van Bramer. An Introduction to Mass Spectrometry. Widener University, Department of Chemistry, One University Place, Chester, PA 19013. 1998.

Van Dyke. Enzymatic Hydrolysis of Cellulose—A Kinetic Study. For the degree of Doctor of Science at the Massachusetts Institute of Technology, Sep. 1972.

Van Sprongsen, et al. Separation and recovery of the constituents from lignocellulosic biomass by using ionic liquids and acetic acid as co-solvents for mild hydrolysis. Chemical Engineering and Processing. 2011; 50:196-199.

Von Sivers, et al. A techno-economical comparison of three processes for the production of ethanol from pine. Bioresource Technology. 1995; 51:43-52.

Vulfson, et al. Glycosidases in organic solvents: I. Alkyl-fl-glucoside synthesis in a water-organic two-phase system. Enzyme Microb. Technol. Dec. 1990; 12:950-954.

(56) References Cited

OTHER PUBLICATIONS

Wang, et al. Molecular Characteristics of Kraft-AQ Pulping Lignin Fractionated by Sequential Organic Solvent Extraction. Int. J. Mol. Sci. 2010; 11:2988-3001.

Wang, et al. Understanding the Conformation of Polysaccharides. Chapter 5. Copyright 2005 by Taylor & Francis Group, LLC.

Wang, et al. Understanding the Physical Properties of Food Polysaccharides. Chapter 4. Copyright 2005 by Taylor & Francis Group, LLC.

Weingarten, et al. Kinetics of furfural production by dehydration of xylose in a biphasic reactor with microwave heating. Green Chem. 2010; 12:1423-1429.

Williams. Ethanol production potential and costs from lignocellulosic resources in California. 15th European Biomass Conference & Exhibition, May 7-11, 2007, Berlin, Germany.

Wilson, et al. Detection of tannins in modern and fossil barks and in plant residues by high-resolution solid-state $^{13}C$ nuclear magnetic resonance. Org. Geochem. 1988; 12(6):539-546.

Winandy, et al. Wood-plastic composites using thermomechanical pulp made from oxalic acid-pretreated red pine chips. 7th Global WPC and Natural Fibre Composites Congress and Exhibition, Jun. 18-19, 2008 in Kassel / Germany.

Winston, et al. Characterization of the lignin residue from hydrolysis of sweetgum wood with superconcentrated hydrochloric acid. Holzforschung Bd.1986; 40:Suppl. 45-50.

Wood-Ethanol Report. Environment Canada. 1999.

Wyman, et al. Comparative sugar recovery data from laboratory scale application of leading pretreatment technologies to corn stover. Bioresource Technology. 2005; 96: 2026-2032.

Wyman. Biomass ethanol: Technical Progress, Opportunities, and Commercial Challenges. Annu. Rev. Energy Environ. 1999; 24:189-226.

Wyman. Potential Synergies and Challenges in Refining Cellulosic Biomass to Fuels, Chemicals, and Power. Biotechnol. Prog. 2003; 19:254-262.

Wyman. Twenty Years of Trials, Tribulations, and Research Progress in Bioethanol Technology. Applied Biochemistry and Biotechnology. 2001; 91-93:5-21.

Wyman. What is (and is not) vital to advancing cellulosic ethanol. TRENDS in Biotechnology. 2007; 25(4):153-157.

Xiang, et al. Heterogeneous Aspects of Acid Hydrolysis of α-Cellulose. Applied Biochemistry and Biotechnology. 2003; 105-108:505-514.

Yusmawati, et al. Optical Properties and Sugar Content Determination of Commercial Carbonated Drinks using Surface Plasmon Resonance. American Journal of Applied Sciences. 2007; 4(1):01-04.

Zahalka, et al. Esterification of 1,4-dichlorobutane with sodium formate under solid-liquid phase transfer catalysis. A kinetic study. Can. J. Chem. 1989; 67:245-249.

Zahalka, et al. One-Pot Conversion of Primary Alkyl Chlorides and Dichlorides into Alcohols, Diols and Ethers via Formic Ester Intermediated under Phase-Transfer Conditions. Communications, Sep. 1986; 763-765.

Zahedifar. Novel uses of lignin and hemicellulosic sugars from acidhyrolysed lignocellulosic materials. for the degree of Doctor of Philosophy, in the University of Aberdeen, Sep. 1996.

Zhang, et al. Vapor Pressure Measurements for the H2SO4/HNO3/H2O and H2SO4/HCl/H2O Systems: Incorporation of Stratospheric Acids into Background Sulfate Aerosols. J. Phys. Chem. 1993; 97:8541-8548.

Zhang, et al. Vapor-Liquid Equilibria for Water+Hydrochloric Acid+Magnesium Chloride and Water+Hydrochloric Acid+Calcium Chloride Systems at Atmospheric Pressure. Chinese J. Chem. Eng. 2006; 14(2):276-280.

Zhang. Reviving the carbohydrate economy via multi-product lignocellulose biorefineries. J Ind Microbiol Biotechnol. 2008; 35:367-375.

Zhao, et al. Small-scale mashing procedure for predicting ethanol yield of sorghum grain. Journal of Cereal Science. 2009; 49:230-238.

Zhao, et al. Supercritical hydrolysis of cellulose for oligosaccharide production in combined technology. Chem. Eng. J. 2009; 150:411-417.

Zheng, et al. Phenolation of walnut shell using sulfuric acid as a catalyst and application to PF resin adhesives. Abstracts / Journal of Biotechnology 136S (2008) S402-S459, doi:10.1016/j.jbiotec.2008.07.950.

Zinoviev, et al. Background Paper on biofuels Production Technologies. International Centere for Science and Hight Technology and UNIDO. Nov. 2007; 1-106.

Zolotov. Hydration and solvation of acids and salts undergoing extraction. Russ. Chem. Rev. 1963; 32:107-116.

Zorina, et al. Study of acid heterogeneous hydrolysis of pulp. USSR. Editor(s): Kiprianov, A. I. Khim. Pererab. Drev. (1982), 35-8. Publisher: Leningr. Lesotekh. Akad., Leningrad, USSR CODEN: 49HIA6. Abstract only.

Zou, et al. Preparation of Activated Carbons from Chinese Coal and Hydrolysis Lignin. Adsorption Science & Technology. 2001; 19(1): 59-72.

\* cited by examiner

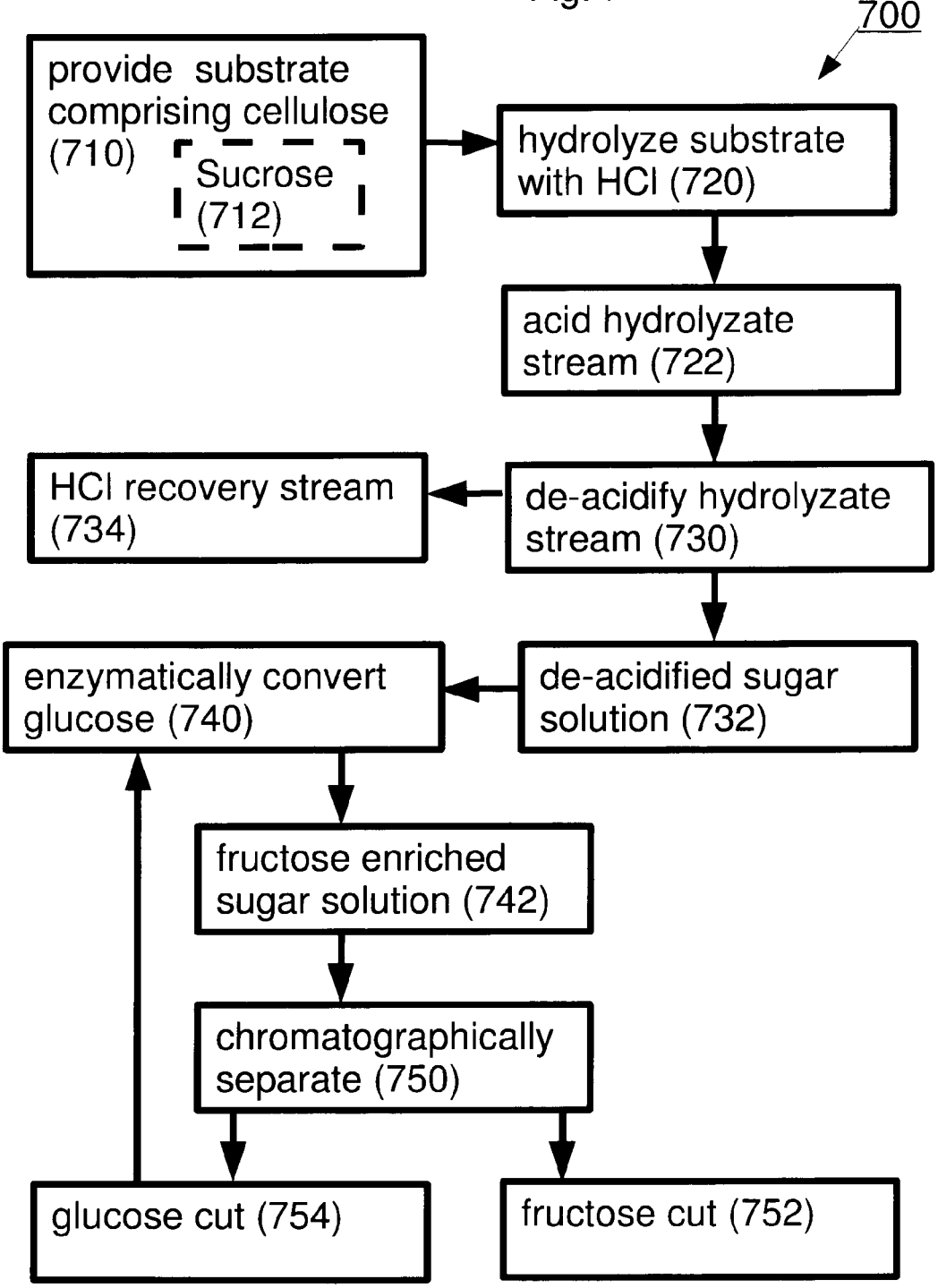

METHODS AND SYSTEMS FOR PROCESSING A SUCROSE CROP AND SUGAR MIXTURES

RELATED APPLICATIONS

This application claims the benefit of 35 U.S.C. §119(e) and/or §365(a) from:

U.S. provisional application 61/501,276 filed on Jun. 27, 2011 by Aharon EYAL and entitled "Methods of Processing s Sucrose Crop"; and In accord with the provisions of 35 U.S.C. §119(a) and/or §365(b), this application claims priority from:

prior Israeli application IL206678 filed on 28 Jun. 2010 by Aharon EYAL and entitled "A Method for the Production of Fermentable Sugars"; and prior PCT application IL2011/000130 filed on 6 Feb. 2011 by Aharon EYAL et al. and entitled "Methods for the Separation of HCl from a Carbohydrate and Compositions Produced thereby".

Each of these priority documents is fully incorporated by reference.

This application is also related to the following co-pending applications, each of which is fully incorporated herein by reference:

prior Israeli application IL 209912 filed on 9 Dec. 2010 by Aharon EYAL et al. and entitled "A Method for Treating a Lignocellulosic Feed Containing Ash and Fatty Acid"; and prior Israeli application IL 211093 filed on 6 Feb. 2011 by Aharon EYAL and entitled "A Method for Processing a Lignocellulosic Material and for the Production of a Carbohydrate Composition"; and U.S. 61/473,134 filed 7 Apr. 2011 by Aharon EYAL and entitled "Lignocellulose Conversion Processes and Products"; and U.S. 61/483,663 filed 7 May 2011 by Aharon EYAL and entitled "Lignocellulose Conversion Processes and Products"

U.S. 61/483,777 filed 9 May 2011 Robert JANSEN et al. and entitled "Hydrolysis Systems and Methods"; and U.S. 61/487,319 filed 18 May 2011 by Robert JANSEN et al. and entitled "Hydrolysis Systems and Methods"; and U.S. 61/491,243 filed 30 May 2011 by Robert JANSEN et al. and entitled "Lignin Compositions, Systems and Methods for Processing Lignin and/or HCl"; and U.S. 61/500,169 filed 23 Jun. 2011 by Aharon EYAL et al. and entitled "Sugar Mixtures and Methods for Production and Use thereof"

FIELD OF THE INVENTION

This invention relates to production of sugars from sucrose crops such as sugar cane and sugar beets.

BACKGROUND OF THE INVENTION

Sugarcane is a major source of sucrose, which is mostly used in food (after refinement) or as a fermentable carbohydrate to produce ethanol. Sucrose is a hetero-disaccharide of glucose and fructose.

Sucrose is typically manufactured from sugarcane in a process that comprises chopping, shredding, and milling by crushing and macerating in roller mills and in some cases comprises extracting the sucrose by diffusion. Milling is typically performed at temperatures of up to 60° C. and extraction by diffusion is typically performed at temperatures of up to about 80° C. The combined operations for the recovery of sucrose from sugarcane are referred to in the following as sucrose extraction.

Sucrose extraction efficiency depends on many factors, including, inter alia, the amount of fiber in the sugarcane. Typically more than 90% of the sucrose content of the sugarcane is extracted out of the biomass material. More typically more than 95% of the sucrose content is extracted.

Sugarcane juice comprises mainly sucrose, however as a result of the conditions of the process some of the sucrose is inverted into fructose and glucose.

The remaining biomass, after processing, is referred to as sugarcane bagasse or bagasse. Typically, bagasse comprises (on a washed and dried basis); 45%-55% wt cellulose, 20%-25% wt hemicellulose and 18%-24% wt lignin. Additional components such as ash and waxes are less than 5% wt.

Bagasse is mainly used for providing energy (more than sufficient for the sugar mill), to generate electricity by burning, as cattle feed and for intermediate and low quality paper. Bagasse could theoretically be used for the production of fermentable carbohydrates, e.g. for the production of ethanol. Yet, existing methods for producing fermentable carbohydrates from bagasse are not considered industrially feasible.

In the sugar industry, cane delivered to the processing plant is called burned and cut (b&c), and represents 77% of the mass of the raw cane. The remaining 23% includes the leaves (which are burned and whose ashes are left in the field as fertilizer), and the roots that remain in the ground to sprout for the next crop. Each ton of b&c cane yields 740 kg of juice (about 135 kg of sucrose and about 605 kg of water) and 260 kg of moist bagasse (130 kg of dry bagasse).

Sugar beets are another important source of sucrose. Sugar beets account for roughly 30% of the world's sugar production. The European Union, the United States, and Russia are the world's three largest sugar beet producers. The European Union and Ukraine are significant exporters of sugar from beets.

In this specification some solvents are defined in terms of a Hoy's cohesion parameter. By way of review, Delta-P is the polarity related component of Hoy's cohesion parameter and delta-H is the hydrogen bonding related component of Hoy's cohesion parameter.

The cohesion parameter, as referred to above or, solubility parameter, was defined by Hildebrand as the square root of the cohesive energy density:

$$\delta = \sqrt{\frac{\Delta E_{vap}}{V}}$$

where $\Delta E_{vap}$ and $V$ are the energy or heat of vaporization and molar volume of the liquid, respectively. Hansen extended the original Hildebrand parameter to a three-dimensional cohesion parameter. According to this concept, the total solubility parameter, delta, is composed of three different components, or, partial solubility parameters relating to the specific intermolecular interactions:

$$\delta^2 = \delta_d^2 + \delta_p^2 + \delta_h^2$$

in which delta-D, delta-P and delta-H are the dispersion, polarity, and Hydrogen bonding components, respectively. Hoy proposed a system to estimate total and partial solubility parameters. The unit used for those parameters is $MPa^{1/2}$. A detailed explanation of that parameter and its components can be found in "CRC Handbook of Solubility Parameters and Other Cohesion Parameters", second edition, pages 122-138. That and other references provide tables with the parameters for many compounds. In addition, methods for calculating those parameters are provided.

SUMMARY OF THE INVENTION

A broad aspect of some embodiments of the invention relates to potential interactions between the table sugar (i.e. crystalline sucrose) industry and the sugar conversion industry. "Sugar conversion" as used in this specification and the accompanying claims indicates chemical or enzymatic conversion of saccharides to other molecules, including, but not limited to, alcohols, fatty acids, amino acids, carboxylic acids, proteins and monomeric feedstocks for the polymer industry and precursors for such monomeric feedstocks. In some exemplary embodiments of the invention, enzymatic conversion is accomplished by fermentation.

As used in this specification and the accompanying claims, the term "sugar" indicates a water soluble carbohydrate and includes monosaccharides, disaccharides, and higher oligosaccharides of up to about 10, optionally 11, optionally 12 saccharide units. Many exemplary embodiments of the invention relate specifically to the disaccharide sucrose and its component monosaccharides glucose and fructose.

One aspect of some embodiments of the invention relates to partially processing a sucrose crop such as sugar cane or sugar beets so that a predetermined amount of sucrose is retained in a partially processed crop product.

Another aspect of some embodiments of the invention relates to hydrolyzing a sucrose crop with all of its sucrose content.

The phase "processing a sucrose crop" indicates separation of at least a portion of the sucrose into a "sugar juice" and a residual product. In the case of sugar cane, the residual product is conventionally referred to as bagasse. In the case of sugar beets, the residual product is referred to as spent cossettes. "Bagasse" and "Cossettes" produced according to various exemplary embodiments of the invention will have a significantly higher sucrose content than corresponding "normal" products.

As used in this specification and the accompanying claims, the terms "partially processed" and "partial processing" indicate that a portion of the sucrose present in the crop which would normally appear in the sugar juice (according to conventional industrial methods) is purposely left in the residual product.

In some exemplary embodiments of the invention, sugar cane is processed so that at least 2%, optionally at least 5% of its sucrose content is retained in the crushed cane. In some exemplary embodiments of the invention, the partial processing is conducted on b&c cane. In other embodiments, the sugar cane is cut without burning so that cellulose in the leaves is not lost.

Since b&c cane is typically about 13% sucrose, this partially processed cane contains at least about 6.5 kilograms of sucrose per ton if b&c cane is used as a starting material. If the leaves are not burned away, the sugar values will be lower by about 20 to 25% because the leafy portion of the cane contains little or no sucrose. There is a tradeoff between the potential value of sugars available from hydrolysis of cellulose in the leaves and complications caused by the leaves in the processing of cane to extract sugar juice.

In other exemplary embodiments of the invention, sugar beets are processed so that at least 2%, optionally at least 5% of their sucrose content is retained in the cossettes after diffusion. In some exemplary embodiments of the invention, the partial processing is conducted on beets with leaves attached so that cellulose in the leaves is not lost.

Assuming that sugar beets contain about 11.5% extractable sucrose, this partially processed crop product contains about 5.75 kilograms of sucrose per ton. If the leaves are not removed, the sugar values will be proportionally lower because the leafy portion of the beet plant contains little or no sucrose. There is a tradeoff between the potential value of sugars available from hydrolysis of cellulose in the leaves and complications caused by the leaves in the processing of beets to extract sugar juice.

In some exemplary embodiments of the invention 13, optionally 15, optionally 20, optionally 25, optionally 30, optionally 35, optionally 40 kilograms/ton of sucrose are left in the partially processed crop product. Optionally, this measurement is on a dry matter basis.

Optionally, the partially processed cane is provided as part of an aqueous slurry. Such a slurry will have a lower sugar concentration, but the values given above "per ton of partially processed cane" still apply to that portion of the slurry made up of cane. In some exemplary embodiments of the invention, an increase in amount of sucrose left in the partially processed cane contributes to an increase in economic value of the partially processed cane. Alternatively or additionally, an increase in amount of sucrose left in the partially processed cane contributes to a decrease in price per unit of sucrose produced from the cane by conventional sugar refining methods.

Another aspect of some embodiments of the invention relates to hydrolyzing the partially processed cane. In some exemplary embodiments of the invention, this hydrolysis is an acid hydrolysis. Optionally, HCl is employed as the acid.

Acid hydrolysis produces an acid hydrolyzate containing a mixture of sugars. Some of these sugars originate from hydrolysis of hemicellulose and/or cellulose. Some of these sugars result from inversion of the sucrose originally present in the partially processed cane.

Another aspect of some embodiments of the invention relates to de-acidification of the acid hydrolyzate. In some exemplary embodiments of the invention, de-acidification is by selective extraction of HCl with an extractant including a suitable solvent or combination of solvents. Optionally, de-acidification is with an extractant including an S1 solvent. For purposes of this specification and the accompanying claims an "S1 solvent" or "S1" indicates a solvent characterized by a water solubility of less than 10% and by at least one of (i) having a delta-P between 5 and 10 $MPa^{1/2}$ and (ii) having a delta-H between 5 and 20 $MPa^{1/2}$. In some exemplary embodiments of the invention, HCl selectively transfers to the extractant containing S1 upon contact therewith.

In some exemplary embodiments of the invention, the de-acidification process includes an additional extraction. Optionally, the extractant in this additional extraction includes an S2 solvent. For purposes of this specification and the accompanying claims an "S2 solvent" or "S2" indicates a solvent characterized by a water solubility of at least 30% and by at least one of (i) having a delta-P greater than 8 $MPa^{1/2}$ and (ii) having a delta-H greater than 12 $MPa^{1/2}$. In some exemplary embodiments of the invention, HCl selectively transfers to the extractant containing S2 upon contact therewith.

Another aspect of some exemplary embodiments of the invention relates to recovery of energy from sugar cane as heat. Optionally, heat energy can be recovered by combustion of leaves and/or tops and/or residual lignin. According to various exemplary embodiments of the invention this heat energy is used in one or more industrial processes associated with refining of sucrose from sugar juice and/or hydrolytic processing of partially processed sugar cane.

Optionally, a portion of the heat energy can be used to generate electricity. This electricity can be used either within a processing plant, or routed to a regional power grid. In some exemplary embodiments of the invention, this electricity is used for ancillary functions within a plant such as lighting and climate control.

Another aspect of some exemplary embodiments of the invention relates to a system which produces crystalline sucrose, a saccharide rich hydrolyzate and combustible lignin from received sugar cane. In some exemplary embodiments of the invention, an initial acid hydrolyzate is de-acidified by extraction with a solvent, optionally provided as part of an extractant with one or more additional components. Optionally, the solvent and/or recovered acid and/or additional components is recycled. In some exemplary embodiments of the invention, the de-acidification procedure increases a total saccharide concentration and/or reduces a concentration of an impurity in the hydrolyzate.

It will be appreciated that the various aspects described above relate to solution of technical problems related to the role of sucrose in preparation of downstream conversion products from sugar cane. Prior to this application, it was widely believed that sucrose should be extracted as efficiently as possible and refined prior to conversion.

Alternatively or additionally, it will be appreciated that the various aspects described above relate to solution of technical problems related to conversion of hemicellulose and cellulose in sugar cane to desired conversion products.

Alternatively or additionally, various exemplary embodiments of the invention solve the technical problem of reducing overall greenhouse gas emissions. In some exemplary embodiments of the invention, this reduction occurs during combustion of fuel (e.g. ethanol). Alternatively or additionally, this reduction occurs during production. Reductions of greenhouse gas emissions can be achieved, for example, by burning sugar cane leave in a processing plant and harvesting released heat energy and/or by processing lignin to create a clean burning product while transforming cellulose to fermentable sugars which are a pre-cursor of combustible fuels such as alcohols. Alternatively or additionally, reducing overall greenhouse gas emissions may occur as a result of using acid hydrolysis as a partial substitute for refining of gasoline or diesel fuel.

In some exemplary embodiments of the invention, there is provided a method including:

(a) providing a harvested crop containing an amount of sucrose;

(b) processing the harvested crop to produce sugar juice containing sucrose and partially processed crop product, the product including at least 2%, optionally at least 5% of the amount of sucrose.

Optionally, the harvested crop includes burned and cut (b&c) sugar cane.

Optionally, the harvested crop includes sugar cane with leaves.

Optionally, the harvested crop includes sugar beets.

Optionally, the method includes burning a leafy portion of the harvested crop
to release heat energy and produce ashes; and using the heat energy for at least one process selected from the group consisting of the processing, refining of sucrose from the sugar juice produced and distillation.

Optionally, the method includes fertilizing a field using at least a portion of the ashes.

In some exemplary embodiments of the invention, there is provided a method including:

(a) providing a partially processed crop product containing at least 2%, optionally at least 5% of the sucrose content of the crop at harvest on a dry solids basis, cellulose and lignin;

(b) hydrolyzing the partially processed crop product with HCl to produce an acid hydrolyzate stream and a lignin stream; and (c) de-acidifying the hydrolyzate stream to produce a de-acidified sugar solution and an HCl recovery stream.

Optionally, the partially processed sucrose crop product comprises sugar cane leaves and/or tops.

Optionally, the partially processed sucrose crop product comprises sugar beet leaves.

Optionally, the de-acidified sugar solution includes at least 90% of a theoretical yield of sugars from said at least 2%, optionally at least 5% of the sucrose content.

Optionally, the de-acidified sugar solution includes 90% of a theoretical yield of sugars from the cellulose.

Optionally, a weight/weight ratio between hydroxymethylfurfural and sugars in the hydrolyzate is less than 0.01

Optionally, a weight/weight ratio between hydroxymethylfurfural and sugars in the de-acidified sugar solution is less than 0.002.

Optionally, a weight/weight ratio between furfural and sugars in the hydrolyzate is less than 0.01.

Optionally, a weight/weight ratio between furfural and sugars in the de-acidified sugar solution is less than 0.002.

Optionally, the HCl recovery stream includes at least 95% of the HCl in the hydrolyzate.

Optionally, the method includes concentrating HCl from the HCl recovery stream to a concentration of at least 35% wt.

Optionally, the hydrolyzing includes contacting the partially processed crop product with the HCl in a counter-current mode of operation.

Optionally, the method includes collecting gaseous HCl from the HCl recovery stream; and contacting the gaseous HCl with the partially processed crop product or with water.

Optionally, the hydrolysis is conducted at a temperature lower than 20° C.

Optionally, the hydrolysis is conducted at a temperature lower than 15° C.

Optionally, the acid hydrolyzate is characterized by:

(i) a ratio of sugars to water in the range of 0.2 to 2.0 by weight; and (ii) a ratio of HCl to water of at least 0.17, optionally at least 0.33

Optionally, the ratio of HCl to water is at least 0.5, optionally at least 0.6.

Optionally, the ratio of HCl to water is not more than 0.85.

Optionally, the de-acidifying of the hydrolyzate includes:

(a) extracting the hydrolyzate, with a first extractant including a first solvent (S1) to produce to an HCl-carrying first extract and an HCl-depleted sugar solution;

(b) recovering HCl from the HCl-carrying first extract;

Optionally, the method includes extracting the HCl-depleted sugar solution with a second extractant including S1 and a second solvent S2.

Optionally, the HCl-carrying first extract includes sugars, and including:

contacting the HCl-carrying first extract with a recycled aqueous HCl solution, prior to the recovering.

Optionally, S1 is selected from the group consisting of alcohols, ketones and aldehydes having at least 5 carbon atoms and combinations thereof.

Optionally, the second extractant is characterized by at least one of:

(i) a polarity related component of Hoy's cohesion parameter (delta-P) greater than the delta-P of the first extractant by at least 0.2 $MPa^{1/2}$' and (ii) a hydrogen-bond related component of Hoy's cohesion parameter (delta-H) greater than the delta-H of the first extractant by at least 0.2 $MPa^{1/2}$.

Optionally, the first extractant includes S2 and wherein a ratio of S2:S1 in the second extractant is greater than a same ratio in the first extractant by at least 10%.

Optionally, the method includes generating at least a fraction of the first extractant from an organic phase composition by removing S2 therefrom.

Optionally, the de-acidifying the hydrolyzate reduces a concentration of at least one non-saccharide impurity in the hydrolyzate by at least 30% on a weight basis relative to the sugars.

Optionally, the method includes de-acidifying the lignin stream to form recovered HCl and de-acidified lignin.

Optionally, the method includes burning the de-acidified lignin to provide heat energy.

Optionally, the method includes using the heat energy for at least one process selected from the group consisting of processing a harvested crop, refining of sucrose from a sugar juice produced during the processing and distillation.

Optionally, the partially processed crop product is produced from unburned sugar cane.

Optionally, the partially processed crop product is produced from sugar beets without removal of leaves.

In some exemplary embodiments of the invention, there is provided a system including:

(a) a sucrose extraction module adapted to separate sucrose from a received crop to produce a partially processed crop product containing residual sucrose and a raw juice including sucrose;

(b) a hydrolysis module which receives the partially processed crop and brings it into contact with a concentrated acid to produce an acid hydrolyzate and residual lignin; and (c) an acid recovery module which receives the acid hydrolyzate and separates it to produce an acid recovery stream and a de-acidified hydrolyzate.

Optionally, the system includes a pre-extraction module adapted to extract at least a portion of ash from the received crop prior to introduction into the sucrose extraction module.

Optionally, the system includes a pre-combustion module adapted to burn a portion of the received crop to release heat energy prior to introduction into the sucrose extraction module.

Optionally, the system includes a sucrose refinery adapted to produce crystallized sucrose from the raw juice.

Optionally, the system includes a lignin de-acidification module adapted to separate acid from the residual lignin to produce combustible lignin and recovered acid.

Optionally, the system includes a lignin-combustion module adapted to receive and burn the combustible lignin to release heat energy.

In some exemplary embodiments of the invention, there is provided a mixture of sugars characterized by a ratio of fructose to mannose of at least 0.4. Optionally, the ratio of fructose to mannose does not exceed 4.8.

In some exemplary embodiments of the invention, there is provided a mixture of sugars characterized by a ratio of fructose to xylose of at least 0.4. Optionally, the ratio of fructose to mannose does not exceed 4.6.

In some exemplary embodiments of the invention, there is provided a mixture of sugars characterized by a ratio of fructose to galactose of at least 0.3. Optionally, the ratio of fructose to galactaose does not exceed 3.2.

In some exemplary embodiments of the invention, there is provided a mixture of sugars characterized by a ratio of fructose to arabinose of at least 1.0. Optionally, the ratio of fructose to arabinose does not exceed 11.

Optionally, a ratio of fructose to total dimeric sugars is at least 0.05.

Optionally, the ratio of fructose to total dimeric sugars does not exceed 0.6.

Optionally, a ratio of fructose to total monomeric sugars is at least 0.023. Optionally, the ratio of fructose to total monomeric sugars does not exceed 0.2.

Optionally, the mixture includes hydroxymethylfurfural (HMF).

In some exemplary embodiments of the invention, there is provided a method including:

(a) providing a culture medium including a mixture as described above; and (b) growing an organism in the medium to produce a fermentation product.

Optionally, the fermentation product includes at least one member selected from the group consisting of alcohols, carboxylic acids, amino acids, monomers for the polymer industry and proteins.

Optionally, the method includes processing the fermentation product to produce a product selected from the group consisting of detergent, polyethylene-based products, polypropylene-based products, polyolefin-based products, polylactic acid (polylactide)-based products, polyhydroxyalkanoate-based products and polyacrylic-based products.

Optionally, the detergent includes a sugar-based surfactant, a fatty acid-based surfactant, a fatty alcohol-based surfactant, or a cell-culture derived enzyme.

Optionally, the polyacrylic-based product is selected from plastics, floor polishes, carpets, paints, coatings, adhesives, dispersions, flocculants, elastomers, acrylic glass, absorbent articles, incontinence pads, sanitary napkins, feminine hygene products, and diapers.

Optionally, the polyolefin-based products are selected from milk jugs, detergent bottles, margarine tubs, garbage containers, water pipes, absorbent articles, diapers, non wovens, HDPE toys and HDPE detergent packagings.

Optionally, the polypropylene based products are selected from absorbent articles, diapers and non wovens.

Optionally, the polylactic acid based products are selected from packaging of agriculture products and of dairy products, plastic bottles, biodegradable products and disposables.

Optionally, the polyhydroxyalkanoate based products are selected from packaging of agriculture products, plastic bottles, coated papers, molded or extruded articles, feminine hygene products, tampon applicators, absorbent articles, disposable nonwovens and wipes, medical surgical garments, adhesives, elastomers, films, coatings, aqueous dispersants, fibers, intermediates of pharmaceuticals and binders.

Optionally, the fermentation product includes at least one member of the group consisting of ethanol, butanol, isobutanol, a fatty acid, a fatty acid ester, a fatty alcohol and biodiesel.

Optionally, the method includes processing of the fermentation product to produce at least one product selected from the group consisting of an isobutene condensation product, jet fuel, gasoline, gasohol, diesel fuel, drop-in fuel, diesel fuel additive, and a precursor thereof.

Optionally, the gasohol is ethanol-enriched gasoline or butanol-enriched gasoline.

Optionally, the product is selected from the group consisting of diesel fuel, gasoline, jet fuel and drop-in fuels.

In some exemplary embodiments of the invention, there is provided a product, a precursor of a product, or an ingredient of a product produced from a fermentation product produced by a method as described above.

In some exemplary embodiments of the invention, there is provided a product, a precursor of a product, or an ingredient of a product including at least one fermentation product produced by a as described above, wherein the at least one fermentation product is selected from the group consisting of carboxylic and fatty acids, dicarboxylic acids, hydroxyl-carboxylic acids, hydroxyl di-carboxylic acids, hydroxyl-fatty acids, methylglyoxal, mono-, di-, or poly-alcohols, alkanes, alkenes, aromatics, aldehydes, ketones, esters, biopolymers, proteins, peptides, amino acids, vitamins, antibiotics, and pharmaceuticals.

Optionally, the product is ethanol-enriched gasoline, jet fuel, or biodiesel.

Optionally, the product has a ratio of carbon-14 to carbon-12 of about $2.0 \times 10^{-13}$ or greater.

Optionally, the product includes an ingredient as described above and an additional ingredient produced from a raw material other than lignocellulosic material.

Optionally, the ingredient and the additional ingredient produced from a raw material other than lignocellulosic material are essentially of the same chemical composition.

Optionally, the product includes a marker molecule at a concentration of at least 100 ppb.

Optionally, the marker molecule is selected from the group consisting of furfural, hydroxy-methyl furfural, products of furfural or hydroxy-mathylfurfural condensation, color compounds derived from sugar caramelization, levulinic acid, acetic acid, methanol, galcturonic acid, and glycerol.

In some exemplary embodiments of the invention, there is provided a method including
(a) providing a harvested sucrose crop containing sucrose, cellulose and lignin;
(b) hydrolyzing the harvested sucrose crop with HCl to produce an acid hydrolyzate stream and a lignin stream; and
(c) de-acidifying the hydrolyzate stream to produce a de-acidified sugar solution and an HCl recovery stream.

Optionally, the harvested sucrose crop includes sugar cane leaves and optionally tops.

Optionally, the harvested sucrose crop includes sugar beet leaves.

Optionally, the de-acidified sugar solution includes at least 90% of a theoretical yield of sugars from the sucrose.

Optionally, a weight/weight ratio between hydroxymethylfurfural and sugars in the hydrolyzate is less than 0.01.

Optionally, a weight/weight ratio between hydroxymethylfurfural and sugars in the de-acidified sugar solution is less than 0.002.

Optionally, a weight/weight ratio between furfural and sugars in the hydrolyzate is less than 0.01.

Optionally, a weight/weight ratio between furfural and sugars in the de-acidified sugar solution is less than 0.002.

Optionally, the HCl recovery stream includes at least 95% of the HCl in the hydrolyzate.

Optionally, the hydrolyzing includes contacting the harvested sucrose crop with the HCl in a counter-current mode of operation.

Optionally, the hydrolyzing is conducted at a temperature lower than 20° C.

Optionally, the hydrolyzing is conducted at a temperature lower than 15° C.

Optionally, the de-acidifying the hydrolyzate reduces a concentration of at least one non-saccharide impurity in the hydrolyzate by at least 30% on a weight basis relative to the sugars.

In some exemplary embodiments of the invention, there is provided a method including
(a) providing a substrate including cellulose;
(b) hydrolyzing the substrate with HCl to produce an acid hydrolyzate stream;
(c) de-acidifying the hydrolyzate stream to produce a de-acidified sugar solution and an HCl recovery stream; and
(d) enzymatically converting at least a portion of glucose in the de-acidified sugar solution to produce a fructose enriched sugar solution.

Optionally, the substrate includes sucrose.

Optionally, the method includes chromatographically separating the fructose enriched sugar solution to produce a fructose cut and a glucose cut.

Optionally, the method includes enzymatically converting at least a portion of glucose in said glucose cut to produce additional fructose enriched sugar solution.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Percentages (%) of chemicals typically supplied as powders or crystals (e.g. sugars) are W/W (weight per weight) unless otherwise indicated. Percentages (%) of chemicals typically supplied as liquids (e.g. HCl) are also W/W (weight per weight) unless otherwise indicated.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 7 is a simplified flow diagram of a method according to some exemplary embodiments of the invention.

DETAILED DESCRIPTION OF EMBODIMENTS

Embodiments of the invention relate to systems and methods which coordinate production of crystalline sucrose (table sugar) with production of a hydrolysate rich in saccharides from a harvested sucrose crop. Sucrose crops include, but are not limited to sugar cane and sugar beets.

Specifically, some embodiments of the invention can be used to a total value of a crop of sugar cane. Other embodiments of the invention can be used to a total value of a crop of sugar beets.

The principles and operation of a system and/or methods according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary System

Figure 1:
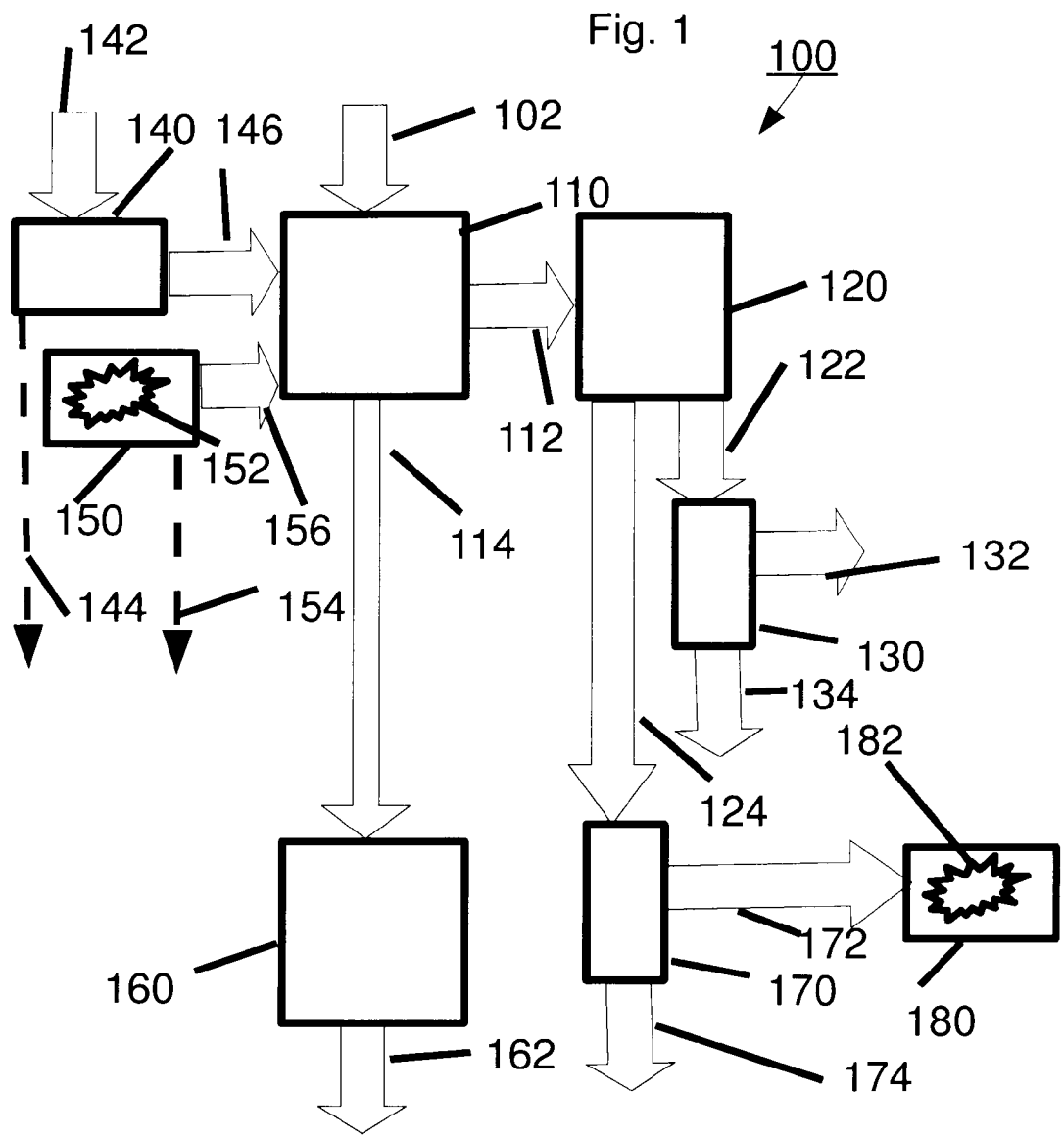
FIG. 1 is schematic overview of a system according to some exemplary embodiments of the invention.

FIG. 1 depicts an exemplary system for processing a harvested sucrose crop indicated generally as system 100. According to various exemplary embodiments of the invention the sucrose crop can be sugar cane or sugar beets.

Depicted exemplary system 100 includes a sucrose extraction module 110 adapted to separate sucrose from a received crop 102 to produce a partially processed crop product 112 containing residual sucrose and a raw juice 114 comprising sucrose. According to various exemplary embodiments of the invention the residual sucrose can be 5, 10, 15, 20, 25 or 30% or intermediate or greater percentages of an amount of sucrose present in received crop 102.

In exemplary embodiments of the invention in which the received crop is sugar cane, adaptation involves adjustment of breaking and/or milling parameters.

In exemplary embodiments of the invention in which the received crop is sugar beet, adaptation involves adjustment of diffusion parameters.

These adaptations are described in more detail below.

Depicted exemplary system 100 also includes a hydrolysis module 120 which receives partially processed crop product 112 and brings it into contact with a concentrated acid to produce an acid hydrolyzate 122 and residual lignin 124. In some exemplary embodiments of the invention, the concentrated acid is HCl. Optionally, the HCl concentration is 37%, 40%, 42% or 45% or intermediate or greater percentages as measured on an HCl to [HCl+water] W/W basis.

Acid hydrolyzate will include a mixture of soluble sugars including those released from hemicellulose and cellulose in received crop 102 as well as those originating from the residual sucrose. Owing to the high concentration of acid in hydrolysis module 120, it seems likely that most of the residual sucrose in partially processed crop product 112 will be inverted to release glucose and fructose. In some exemplary embodiments of the invention, glucose and fructose resulting from sucrose inversion are present in acid hydrolyzate 122. In other exemplary embodiments of the invention, at least a portion of the glucose and fructose resulting from sucrose inversion is present as part of a dimer or longer oligosaccharide.

Depicted exemplary system 100 also includes an acid recovery module 130 which receives acid hydrolyzate 122 and separates it to produce an acid recovery stream 132 and a de-acidified hydrolyzate 134.

The term "raw juice" is used here because it is an art accepted term in the sugar cane and sugar beet processing industry. However, it will be appreciated that "raw juice" according to various exemplary embodiments of the invention will be different than a comparable raw juice resulting from a process in which a partially processed crop product 112 containing residual sucrose is not produced.

In some exemplary embodiments of the invention, system 100 includes an optional pre-extraction module 140 adapted to extract at least a portion of ash 144 from received crop 102 prior to introduction into said sucrose extraction module. In these embodiments, received crop 102 optionally enters module 140 directly (not depicted). In some exemplary embodiments of the invention, this pre-extraction is with an extractant 142 including a water soluble organic solvent. "Water soluble organic solvent" as used in this specification and the accompanying claims indicates a solvent with a solubility in water of at least 50% at 25° C., wherein water has a solubility in the solvent of at least 50% at 25° C. Exemplary water-soluble organic solvents include but are not limited to ketones and alcohols with up to four carbon atoms. In some exemplary embodiments of the invention, the solvent includes acetone. Optionally, acetone is the only water soluble organic solvent. Optionally, the extractant is weakly acidic, for example due to presence of sulfurous acid.

In some exemplary embodiments of the invention, the water soluble organic solvent is recycled. Optionally recycling is by distillation (not depicted).

Ash 144 is separated from the received crop as part of an extract. The pre-extracted crop 146 is then transferred to sucrose extraction module 110 as indicated.

Alternatively or additionally, system 100 includes a pre-combustion module 150 adapted to burn a portion of received crop 102 to release heat energy 152 prior to introduction into sucrose extraction module 110. In these embodiments, received crop 102 optionally enters module 140 instead of module 110 (not depicted).

Optionally, the crop is sugar cane and the burned portion is sugar cane leaves.

Optionally, the crop is sugar beet and the burned portion is beet leaves.

Various ways that heat energy 152 may be used are described hereinbelow. In some exemplary embodiments of the invention, pre-combustion module 150 is provided as a flow through furnace. The pre-burned crop 156 produced by pre-combustion module 150 is transferred to sucrose extraction module 110. The combustion residue 154 is removed and optionally used to fertilize fields, for example fields producing received crop 102.

In those exemplary embodiments of the invention employing sugar cane, pre-burned crop 156 is analogous to "b&c" cane. In some exemplary embodiments of the invention, implementation of a "prescribed burn" is easier in pre-combustion module 150 than according to the previously known practice of burning cane in fields. Alternatively or additionally, use of pre-combustion module 150 permits harvest of heat energy 152 which is lost using previously known practice of burning cane in fields.

Depicted exemplary system 100 includes a sucrose refinery 160 adapted to produce crystallized sucrose 162 from raw juice 114. Refinery 160 is a conventional sugar refinery adapted to handle the specific type of raw juice 114 resulting from delivered crop 102. However, refinery 160 will produce a lower yield per ton of received crop 102 due to the "residual sucrose" in partially processed crop 112.

In some exemplary embodiments of the invention, system 100 includes a lignin de-acidification module 170 adapted to separate acid from residual lignin 124 to produce combustible (de-acidified) lignin 172 and recovered acid 174. In some exemplary embodiments of the invention, recovered acid 174 contains sugars. According to various exemplary embodiments of the invention recovered acid 174 can be routed to hydrolysis module 120 and/or acid recovery stream 132.

In some exemplary embodiments of the invention, system 100 includes a lignin-combustion module 180 adapted to receive and burn combustible lignin 172 to release heat energy 182. Various ways to use heat energy 182 are described below.

Exemplary Crop Processing Method

Figure 2:
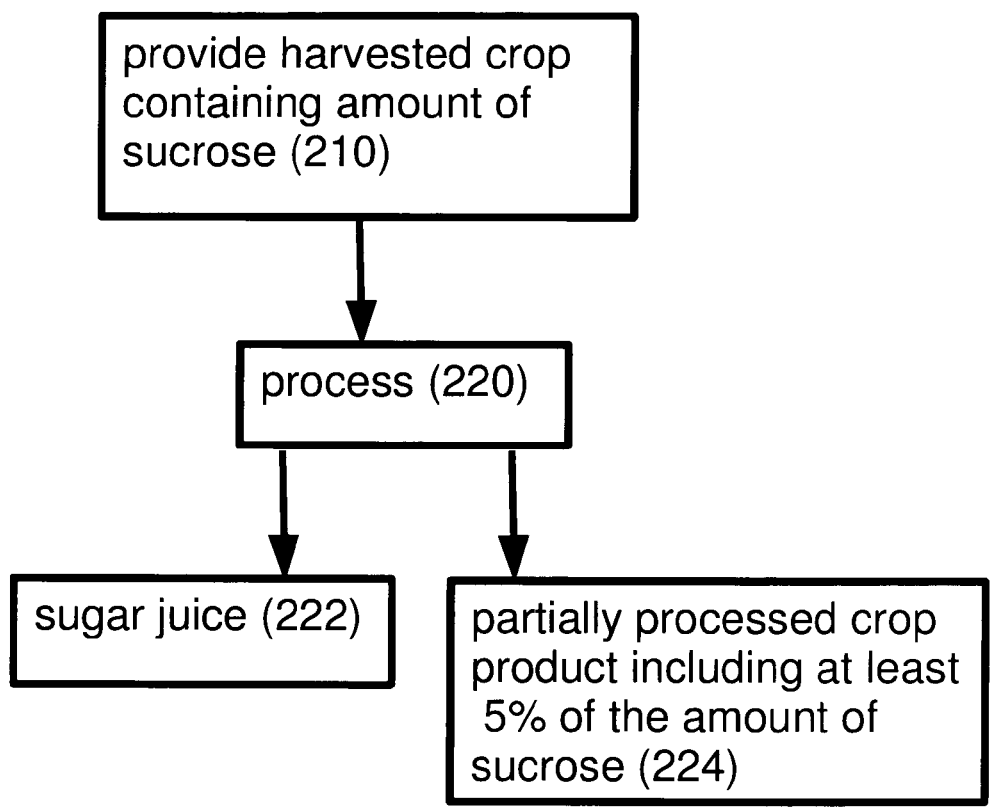
FIG. 2 is a simplified flow diagram of a method according to some exemplary embodiments of the invention.

FIG. 2 depicts a crop processing method according to some exemplary embodiments of the invention indicated generally as 200. Depicted method 200 includes providing 210 a harvested crop containing an amount of sucrose and processing 220 the harvested crop to produce sugar juice 222 containing sucrose and partially processed crop product 224 including at least 2%, optionally at least 5% of the amount of sucrose originally provided 210 in the harvested crop. According to various exemplary embodiments of the invention sugar juice 222 is processed to produce raw crystalline sucrose or table sugar (crystalline sucrose) according to known industrial methods. The industrial methods may vary to a certain degree depending upon the nature of juice 222. The nature of juice 222 may be influenced by the harvested crop and/or by the percentage of sucrose remaining in partially processed crop product 224. According to various exemplary embodiments of the invention this percentage may be 2, 5, 10, 15, 20, 25, 30, 35, 40% or intermediate or higher percentages. In some exemplary embodiments of the invention, increasing the percentage of sucrose in partially processed crop product 224 contributes to an ease of preparation and/or a reduced cost per unit of the table sugar.

According to various exemplary embodiments of the invention the harvested crop includes burned and cut (b&c) sugar cane and/or sugar cane with leaves and/or sugar beets. Optionally, the beets can be with or without leaves.

Exemplary Sugar Production Method

Figure 3:
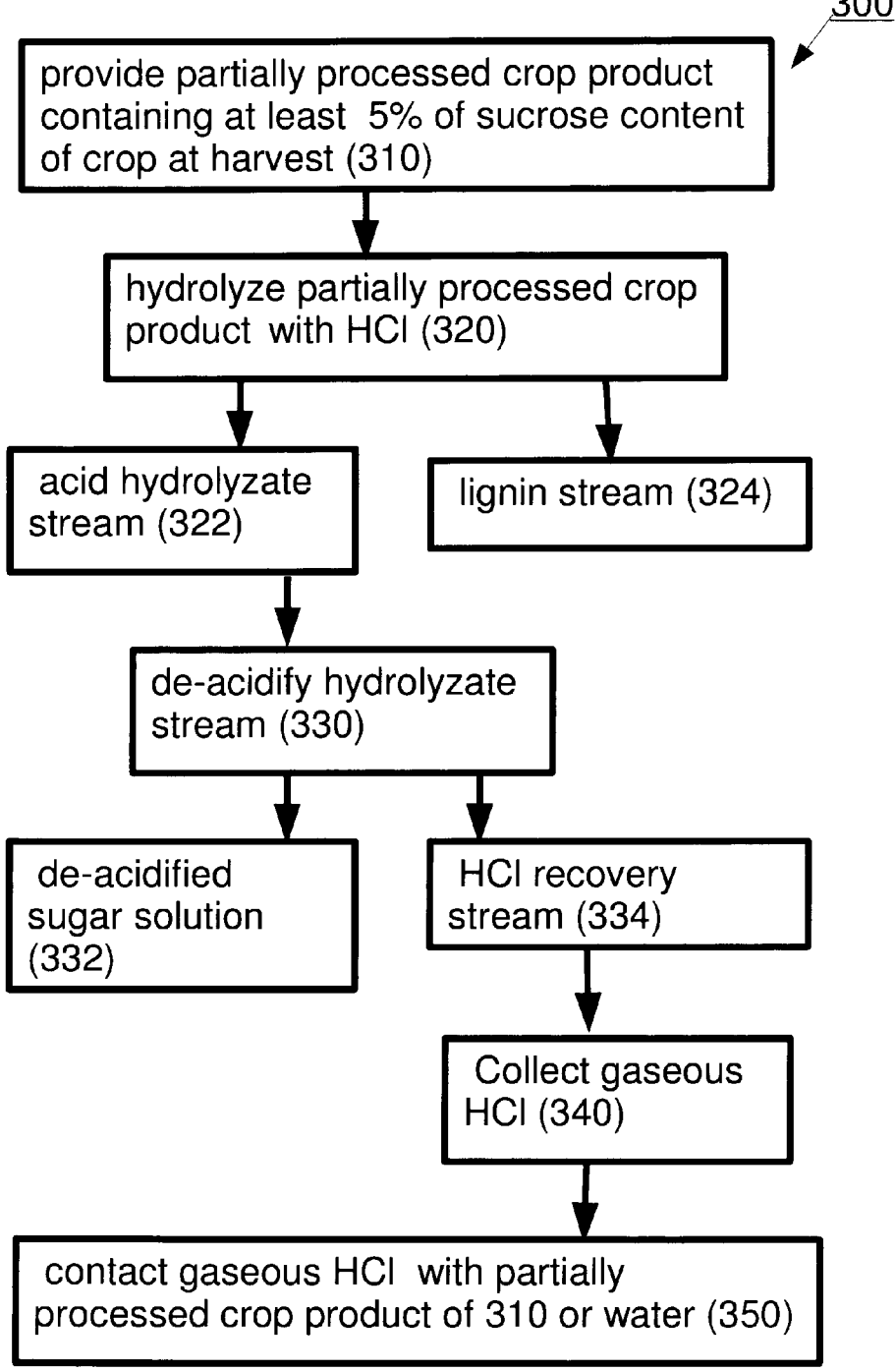
FIG. 3 is a simplified flow diagram of a method according to some exemplary embodiments of the invention.

FIG. 3 depicts a sugar production method according to some exemplary embodiments of the invention indicated generally as 300. Depicted method 300 includes providing 310 a partially processed crop product containing at least 2%, optionally at least 5% of the sucrose content of the crop at harvest on a dry solids basis, cellulose and lignin. According to various exemplary embodiments of the invention the crop product may be derived from sugar cane or sugar beets. In those embodiments where sugar cane is employed, "% of the sucrose content" is optionally relative to the amount in b&c cane.

In some exemplary embodiments of the invention, the partially processed crop product is provided as a slurry including added water. In other exemplary embodiments of the invention, the partially processed crop product is provided without added water.

Depicted method 300 includes hydrolyzing 320 the partially processed crop product with HCl to produce an acid hydrolyzate stream 322 and a lignin stream 324.

Optionally, lignin stream 324 is further processed to produce recovered HCl (174; FIG. 1) and de-acidified lignin (172; FIG. 1). Optionally, a ratio of HCl to lignin in de-acidified lignin 172 is less than 0.03 by weight. Details of exemplary processes for this further processing are disclosed in co-pending U.S. provisional application 61/491,243 which is fully incorporated herein by reference.

Additional relevant processes for the hydrolysis of lignocellulose utilizing concentrated HCl, de-acidification of the products and recycling of the acid are described in greater detail in PCT application IL2010/001042 and/or IL2011/000130 and/or U.S. 61/491,243 and/or U.S. 61/483,777 and/or U.S. 61/487,319. Each of these applications is fully incorporated herein by reference.

In some exemplary embodiments of the invention, hydrolyzing 320 includes contacting the partially processed crop product provided at 310 with the HCl in a counter-current mode of operation. Suitable exemplary hydrolysis systems and methods are disclosed in co-pending U.S. provisional applications 61/483,777 and 61/487,319 which are each fully incorporated herein by reference.

In some exemplary embodiments of the invention, the counter-current mode of operation contributes to an ability to remove sugars resulting from sucrose inversion prior to their degradation. Optionally, the sugar which is spared from degradation is fructose.

In some exemplary embodiments of the invention, hydrolysis 320 is conducted at a temperature lower than 30, optionally 25, optionally 20, optionally 15, optionally 12 degrees C. or intermediate or lower temperatures. Optionally, a reduction in hydrolysis temperature contributes to a reduction in degradation of monosaccharides.

Optionally, lignin stream 324 contains HCl and/or sugars. In some exemplary embodiments of the invention, lignin stream 324 is subject to further processing to recover acid and/or sugars. Optionally, recovered sugars are united with stream 322 or returned to hydrolysis 320 or added to de-acidified sugar solution 332. Alternatively or additionally, recovered acid is optionally returned to hydrolysis 320.

Depicted method 300 also includes de-acidifying 330 hydrolyzate stream 322 to produce a de-acidified sugar solution 332 and an HCl recovery stream 334. In some exemplary embodiments of the invention, de-acidified sugar solution 332 includes at least 90% of a theoretical yield of sugars from the sucrose content of the partially processed crop product provided at 310. In some exemplary embodiments of the invention, de-acidified sugar solution 332 includes at least 90% of a theoretical yield of sugars from the cellulose content of the partially processed crop product provided at 310. Sugar solution 332 includes sugars produced by hydrolysis of cellulose as well as monosaccharides produced by inversion of sucrose. Fructose can be employed as marker for sucrose. Fructose is sensitive to degradation by strong acids such as concentrated HCl. Examples presented hereinbelow demonstrate that fructose is not significantly degraded by HCL under appropriate conditions.

Degradation of hexoses by acid produces hydroxymethylfurfural. In some exemplary embodiments of the invention, a weight/weight ratio between hydroxymethylfurfural and sugars in acid hydrolyzate stream 322 is less than 0.01. Optionally, a weight/weight ratio between hydroxymethylfurfural and sugars in said de-acidified sugar solution is less than 0.002. In some exemplary embodiments of the invention, de-acidification 330 has the surprising effect of removing unwanted hydroxymethylfurfural.

Degradation of pentoses by acid produces furfural. In some exemplary embodiments of the invention, a weight/weight ratio between furfural and sugars in acid hydrolyzate stream 322 is less than 0.01. Optionally, a weight/weight ratio between furfural and sugars in said de-acidified sugar solution 332 is less than 0.002. In some exemplary embodiments of the invention, de-acidification 330 has the surprising effect of removing unwanted furfural.

These ratios indicate that if hydrolysis 320 is conducted properly, degradation of sugars occurs at a low level. Alternatively or additionally, these ratios indicate that an amount of undesirable sugar degradation products is not increased by de-acidification 330. Instead, it appears that de-acidification 330 separates unwanted degradation products from sugars. In some exemplary embodiments of the invention, de-acidifying 330 hydrolyzate 322 reduces a concentration of at least one non-saccharide impurity (e.g., furfural) in the hydrolyzate by at least 30% on a weight basis relative to the sugars.

In some exemplary embodiments of the invention, HCl recovery stream 334 includes at least 95% of the HCl in acid hydrolyzate stream 322. In some exemplary embodiments of the invention, acid hydrolyzate stream 322 is characterized by a ratio of sugars to water in the range of 0.2 to 2.0 by weight and a ratio of HCl to water of at least 0.17 by weight. Optionally, the ratio of HCl to water may be as high as 0.5, 0.55, 0.6, 0.7, 0.75, 0.8 or 0.85 or an intermediate value by weight. According to various exemplary embodiments of the invention this ratio may vary depending upon how HCl recycling is conducted and/or where acid hydrolyzate stream 322 is removed from hydrolysis module 120 (FIG. 1).

Optionally, method 300 includes concentrating HCl from HCl recovery stream 334 to a concentration of at least 35% wt (not depicted). In some exemplary embodiments of the invention, this concentration is achieved by heating recovery stream 334 to produce gaseous HCl and absorbing the gaseous HCl in water or an aqueous solution.

Depicted exemplary method 300 includes collecting 340 gaseous HCl from HCl recovery stream 334. Optionally, this collection involves distillation. Again, relevant details can be found in co-pending U.S. provisional applications 61/483,777 and 61/487,319 which are each fully incorporated herein by reference.

In some exemplary embodiments of the invention, this gaseous HCl is contacted 350 with the partially processed crop product (310) or with water. Optionally, the crop product is provided as an aqueous slurry and water from the slurry absorbs the gaseous HCl. In other words, HCl is recycled and re-used in the process while the partially processed crop product flows through process.

Exemplary Sugar De-Acidification Method

Figure 4:
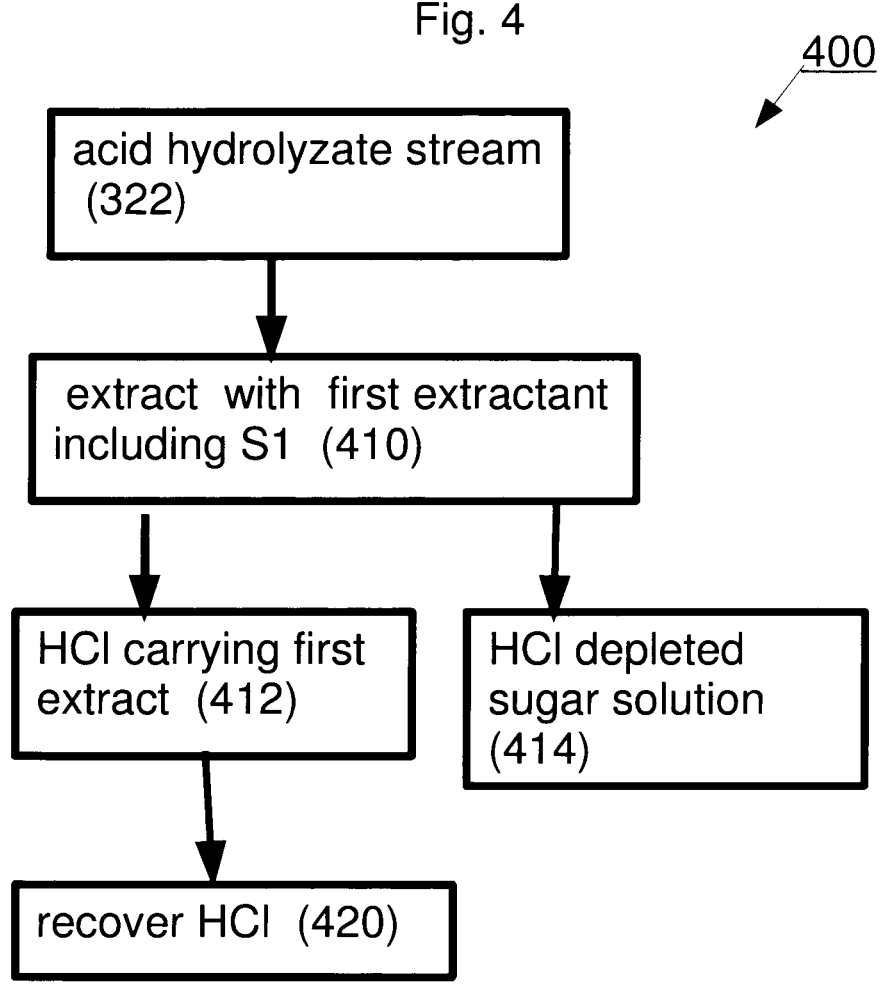
FIG. 4 is a simplified flow diagram of a method according to some exemplary embodiments of the invention.

FIG. 4 is a simplified flow diagram of a sugar de-acidification method according to some exemplary embodiments of the invention indicated generally as 400. The method relates to acid hydrolyzate stream 322 of FIG. 3.

Depicted method 400 includes extracting 410 acid hydrolyzate stream 322 with a first extractant including a first solvent (S1) to produce to an HCl-carrying first extract 412 and an HCl-depleted sugar solution 414. Depicted method 400 also includes recovering 420 HCl from HCl-carrying first extract 412. In some exemplary embodiments of the invention, recovery is via distillation. Optionally, recovered HCl is recycled (e.g. to hydrolyzing 320; FIG. 3). In some exemplary embodiments of the invention, HCl-carrying first extract 412 is contacted with or mixed with a recycled aqueous HCl solution, prior to recovering 420.

Exemplary Additional Sugar De-Acidification Methods

Figure 5:
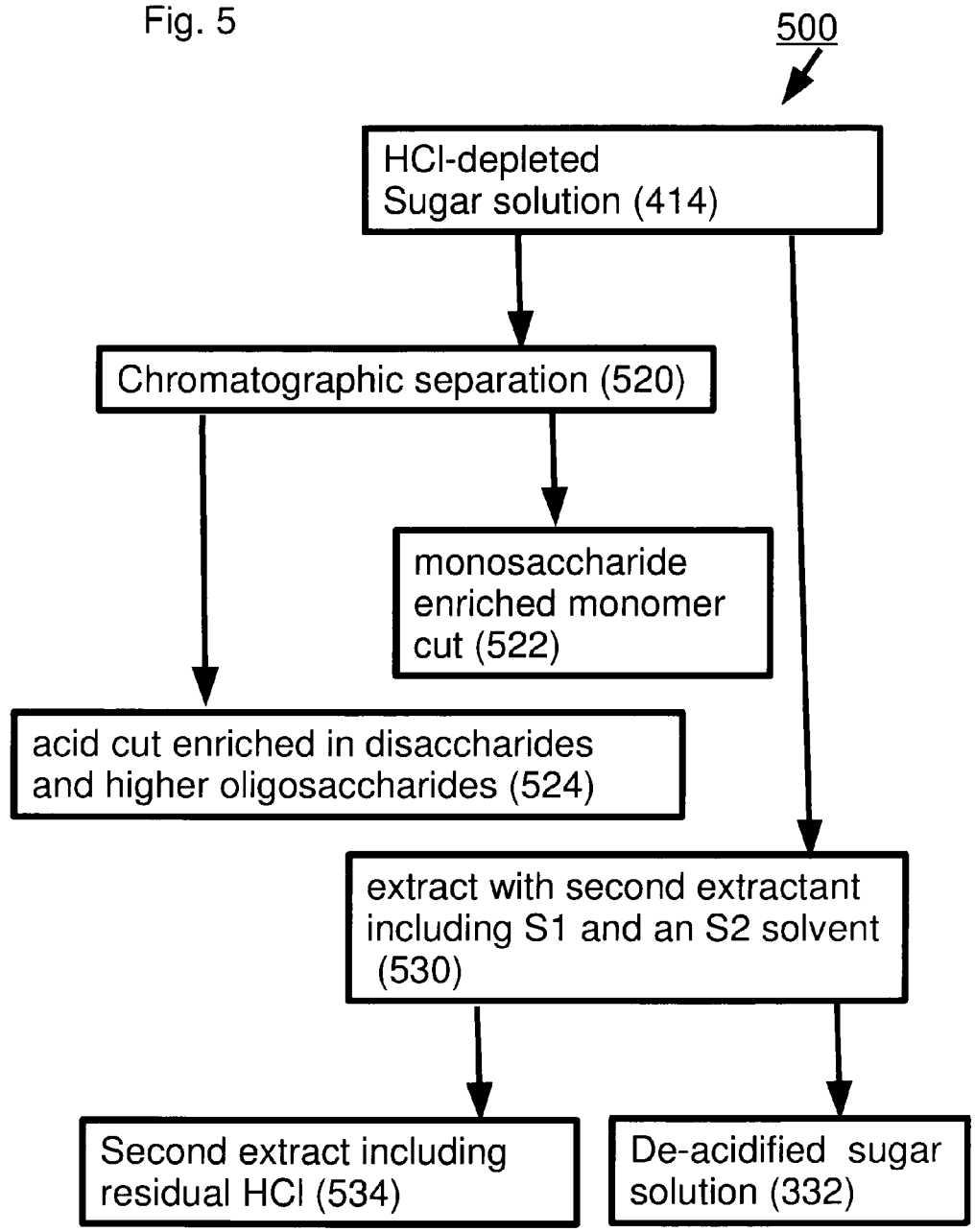
FIG. 5 is a simplified flow diagram of exemplary methods for further processing of the product produced by the method depicted in FIG. 4 according to some exemplary embodiments of the invention.

FIG. 5 is a simplified flow diagram of a supplementary sugar de-acidification method according to some exemplary embodiments of the invention indicated generally as 500. The method relates to HCl-depleted sugar solution 414 of FIG. 4.

Depicted method 500 includes two alternatives. Each of these alternatives can be employed to remove unacceptable levels of HCl present in sugar solution 414.

In the first alternative a chromatographic separation 520 is applied to HCl-depleted sugar solution 414. In those exemplary embodiments of the invention which employ chromatographic separation 520, sugar solution 414 is separated into an HCl-containing "acid cut" 524 which is enriched in disaccharides and higher oligosaccharides relative to total saccharides and a "monomer cut" 522 enriched in monosaccharides relative to total saccharides. Monomer cut 522 is analogous to de-acidified sugar solution 332 (FIG. 3) in that it contains only acceptably low levels of residual HCl. However, monomer cut 522 may contain a lower concentration and/or a lower total amount of sugars than de-acidified sugar solution 332. In some exemplary embodiments of the invention, monomer cut 522 has an HCl/sugar ratio less than 0.03 by weight. Exemplary chromatographic separation techniques are disclosed in co-pending application IL 211093 which is fully incorporated herein by reference.

In some exemplary embodiments of the invention, chromatographic separation 520 employs a purolite resin. Optionally, Purolite Resin PCR 642H+(The Purolite Company, Bala Cynwood, Pa., USA)

In some exemplary embodiments of the invention, acid cut 524 is subject to further treatment to separate saccharides from HCl and/or to adjust a ratio of monosaccharides to total saccharides.

The second alternative employs an additional extraction 530 with a second extractant including S1 and a second solvent (S2).

In those exemplary embodiments of the invention which employ a subsequent extraction 530, there is a selective transfer of HCl to the second extractant to form a second extract 534 and de-acidified sugar solution 332 that has an HCl/sugar ratio less than 0.03 by weight. Exemplary subsequent extraction techniques are disclosed in co-pending application PCT IL2011/000130 which is fully incorporated herein by reference.

Optionally, the extractant employed in extractions 410 (FIG. 4) and 530 (FIG. 5) include a same S1 solvent and/or a different solvent. S1 solvents employed in exemplary embodiments of the invention include, but are not limited to alcohols (e.g. hexanol and 2-ethyl hexanol), ketones and aldehydes having at least 5 carbon atoms and combinations thereof.

In some exemplary embodiments of the invention, the second extractant is characterized by a delta-P greater than the delta-P of the first extractant by at least $0.2$ $MPa^{1/2}$ and/or a delta-H greater than the delta-H of the first extractant by at least $0.2$ $MPa^{1/2}$.

According to various exemplary embodiments of the invention, S2 includes at least one member selected from the group consisting of $C_1$-$C_4$ mono- or poly-alcohols, aldehydes and ketones. Optionally, S2 includes acetone.

In some exemplary embodiments of the invention, S1 and S2 are each recycled and reused. Optionally, this recycling involves separate recovery of S1 and S2 from a common distillation unit. This means that at least a fraction of the first extractant is generated from an organic phase composition by removing S2 therefrom. If this occurs, it produces a removed S2-comprising stream and an S2-depleted extract. The S2-depleted extract splits at 25° C. into an S2-depleted heavy phase and an S2-depleted light phase. This makes it possible to separate the S2-depleted heavy phase from the S2-depleted light phase.

As a result, the first extractant of extraction 410 may include some residual S2. However, a ratio of S2:S1 in the second extractant of extraction 530 is typically greater than a same ratio in the first extractant of extraction 410 by at least 10%.

Additional Exemplary Sugar Production Method

Figure 6:
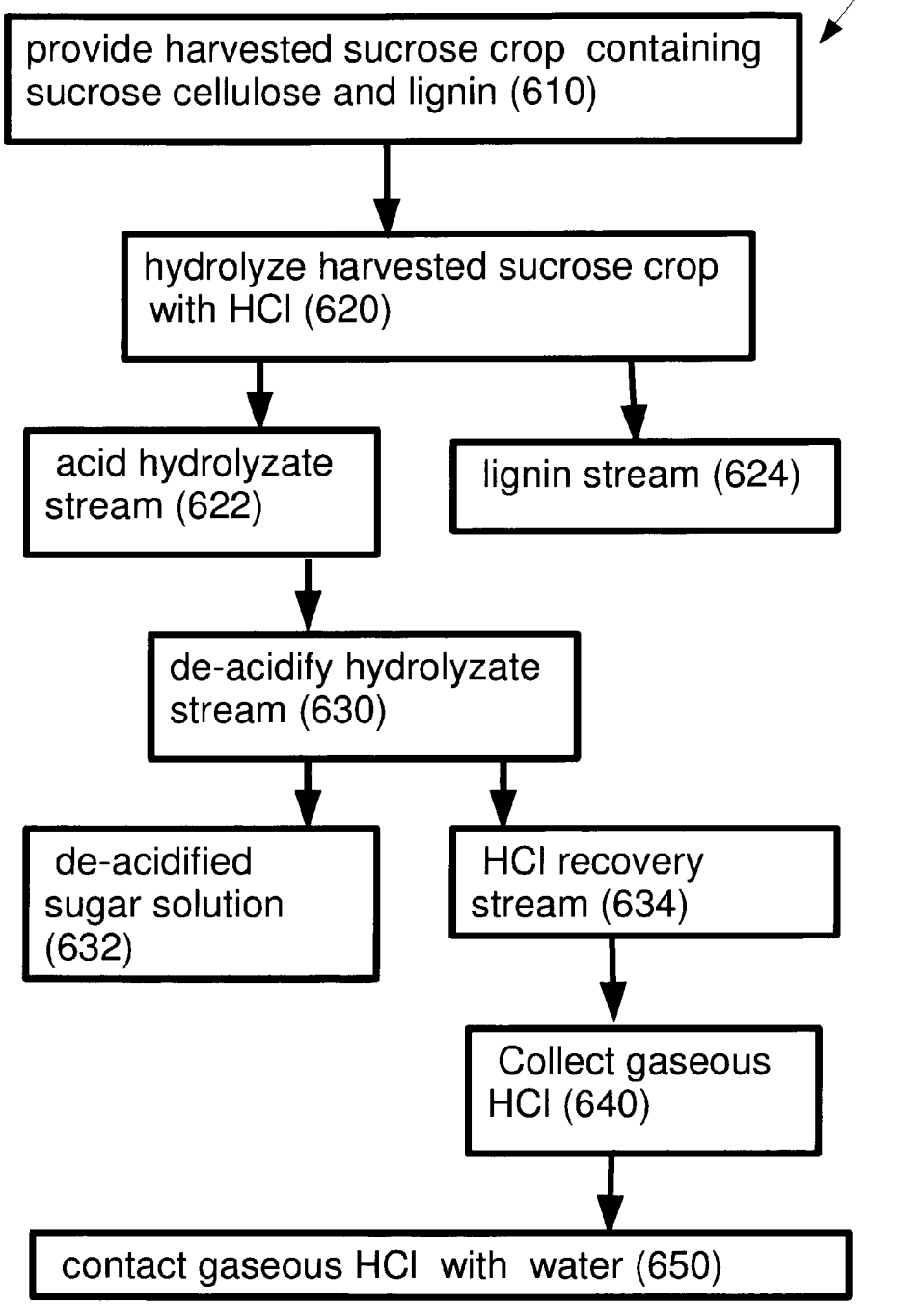
FIG. 6 is a simplified flow diagram of a method according to some exemplary embodiments of the invention.

FIG. 6 depicts an additional exemplary sugar production method according to some exemplary embodiments of the invention indicated generally as 600. Depicted method 600 is similar to method 300 in many respects. Method 600 differs from method 300 primarily in that method 300 does not include any extraction of raw sugar juice (see 114 in FIG. 1) from the crop prior to acid hydrolysis.

Depicted method 600 includes providing 610 a harvested sucrose crop containing sucrose, cellulose and lignin. According to various exemplary embodiments of the invention the crop product may be derived from, for example, sugar cane or sugar beets. In those embodiments where sugar cane is employed b&c cane can be employed although it may be advantageous to use cane with leaves and/or tops.

Optionally, the harvested sucrose crop can be provided as a slurry including added water or an aqueous solution of HCl. In other exemplary embodiments of the invention, the partially processed crop product is provided without added liquid.

Depicted method 600 includes hydrolyzing 620 the harvested sucrose crop with HCl to produce an acid hydrolyzate stream 322 and a lignin stream 324.

Optionally, lignin stream 324 is further processed to produce recovered HCl (174; FIG. 1) and de-acidified lignin (172; FIG. 1). Optionally, a ratio of HCl to lignin in de-acidified lignin 172 is less than 0.03 by weight.

Details of exemplary processes for hydrolysis of lignocellulose utilizing concentrated HCl, de-acidification of the products and recycling of the acid are presented in a series of co-pending applications which are listed, and incorporated by reference, in the context of the text describing FIG. 3 hereinabove.

In some exemplary embodiments of the invention, hydrolyzing 620 includes contacting the harvested sucrose crop provided at 610 with the HCl in a counter-current mode of operation. Details of exemplary counter current processes for hydrolysis are presented in co-pending applications which are listed, and incorporated by reference, in the context of the text describing FIG. 3 hereinabove.

In some exemplary embodiments of the invention, the counter-current mode of operation contributes to an ability to remove sugars resulting from sucrose inversion prior to their degradation. Optionally, the sugar which is spared from degradation is fructose.

In some exemplary embodiments of the invention, hydrolysis 620 is conducted at a temperature lower than 30, optionally 25, optionally 20, optionally 15, optionally 12 degrees C. or intermediate or lower temperatures. Optionally, a reduction in hydrolysis temperature contributes to a reduction in degradation of monosaccharides.

Optionally, lignin stream 624 contains HCl and/or sugars. In some exemplary embodiments of the invention, lignin stream 624 is subject to further processing to recover acid and/or sugars. Optionally, recovered sugars are united with stream 622 or returned to hydrolysis 620 or added to de-acidified sugar solution 632. Alternatively or additionally, recovered acid is optionally returned to hydrolysis 620.

Depicted method 600 also includes de-acidifying 630 hydrolyzate stream 622 to produce a de-acidified sugar solution 632 and an HCl recovery stream 634. De-acidifying 630 corresponds to de-acidifying 330 of method 300 (FIG. 3). Exemplary details of de-acidifying 330 provided in the textual description of FIGS. 4 and 5 hereinabove can also be applied to de-acidifying 630.

In some exemplary embodiments of the invention, de-acidified sugar solution 632 includes at least 90% of a theoretical yield of sugars from the sucrose content of the harvested sucrose crop provided at 610. Alternatively or additionally, de-acidified sugar solution 632 includes at least 90% of a theoretical yield of sugars from the cellulose content of the harvested sucrose crop provided at 610.

Sugar solution 632 includes sugars produced by hydrolysis of cellulose as well as monosaccharides produced by inversion of sucrose. Fructose can be employed as marker for sucrose. Fructose is sensitive to degradation by strong acids such as concentrated HCl. Examples presented hereinbelow demonstrate that under appropriate hydrolysis conditions, sucrose undergoes inversion to glucose and fructose, but the degree of degradation of these monomers is acceptably low.

Degradation of hexoses by acid produces hydroxymethylfurfural. In some exemplary embodiments of the invention, a weight/weight ratio between hydroxymethylfurfural and sugars in acid hydrolyzate stream 622 is less than 0.01. Optionally, a weight/weight ratio between hydroxymethylfurfural and sugars in de-acidified sugar solution 632 is less than 0.002. In some exemplary embodiments of the invention, de-acidification 630 has the surprising effect of removing unwanted hydroxymethylfurfural.

Degradation of pentoses by acid produces furfural. In some exemplary embodiments of the invention, a weight/weight ratio between furfural and sugars in acid hydrolyzate stream 622 is less than 0.01. Optionally, a weight/weight ratio between furfural and sugars in de-acidified sugar solution 632 is less than 0.002. In some exemplary embodiments of the invention, de-acidification 630 has the surprising effect of removing unwanted furfural.

These ratios indicate that if hydrolysis 620 is conducted properly, degradation of sugars occurs at a low level. Alternatively or additionally, these ratios indicate that an amount of undesirable sugar degradation products is not increased by de-acidification 630. Instead, it appears that de-acidification 630 separates unwanted degradation products from sugars. In some exemplary embodiments of the invention, de-acidifying 630 hydrolyzate 622 reduces a concentration of at least one non-saccharide impurity (e.g., furfural) in the hydrolyzate by at least 30% on a weight basis relative to the sugars.

In some exemplary embodiments of the invention, HCl recovery stream 634 includes at least 95% of the HCl in acid hydrolyzate stream 622. In some exemplary embodiments of the invention, acid hydrolyzate stream 622 is characterized by a ratio of sugars to water in the range of 0.2 to 2.0 by weight and a ratio of HCl to water of at least 0.17 by weight. Optionally, the ratio of HCl to water may be as high as 0.5, 0.55, 0.6, 0.7, 0.75, 0.8 or 0.85 or an intermediate value by weight. According to various exemplary embodiments of the invention this ratio may vary depending upon how HCl recycling is conducted and/or where acid hydrolyzate stream 622 is removed from hydrolysis module 120 (FIG. 1).

Optionally, method 600 includes concentrating HCl from HCl recovery stream 634 to a concentration of at least 35% wt (not depicted). In some exemplary embodiments of the invention, this concentration is achieved by heating recovery stream 634 to produce gaseous HCl and absorbing the gaseous HCl in water or an aqueous solution.

Depicted exemplary method 600 includes collecting 640 gaseous HCl from HCl recovery stream 634. Optionally, this collection involves distillation. Again, relevant details can be found in co-pending US provisional applications cited and incorporated by reference in the text describing FIG. 3 hereinabove.

In some exemplary embodiments of the invention, this gaseous HCl is contacted 650 with water. In other words, HCl is recycled and re-used in the process while the harvested sucrose crop flows through process.

Referring now to FIG. 1, according to method 600, harvested sucrose crop (received crop 102) would be introduced directly into hydrolysis module 120. There would be no attempt to produce juice 114. Instead, all of the sucrose in crop 102 is inverted to produce monosaccharides.

Exemplary Crop Specific Considerations; Sugar Cane

In some exemplary embodiments of the invention, a partially processed crop product including at least 2%, optionally at least 5% of an amount of sucrose present in the harvested crop is provided.

In those exemplary embodiments of the invention where the crop is sugar cane, an amount of sucrose retained in the partially processed crop can be regulated by controlling cane breaking and/or cane milling and/or an amount of imbibition water added during cane milling.

Optionally, reducing a degree of breaking and/or milling of the cane contributes to an increase in the amount of sucrose present in the partially processed sugar cane product.

Conversely, increasing an amount of imbibition water added during cane milling contributes to a decrease in the amount of sucrose present in the partially processed sugar cane product.

Some exemplary embodiments of the invention relate to controlling cane breaking and/or milling parameters to retain at least 2, optionally at least 5% of sucrose available in the cane in what is generally referred to as "bagasse".

Some exemplary embodiments of the invention relate to controlling an amount of imbibitions water to retain at least 2, optionally at least 5% of sucrose available in the cane in what is generally referred to as "bagasse".

Exemplary Crop Specific Considerations: Sugar Beet

In some exemplary embodiments of the invention, a partially processed crop product including at least 2, optionally at least 5% of an amount of sucrose present in the harvested crop is provided.

In those exemplary embodiments of the invention where the crop is sugar beet, an amount of sucrose retained in the partially processed crop product can be regulated by controlling one or more diffusion parameters. Exemplary diffusion parameters include, but are not limited to cossettes thickness, cossettes surface area: mass ratio, cossettes retention time, water retention time, water volume per mass of cossettes and water temperature.

Optionally, decreasing cossettes retention time contributes to an increase in the amount of sucrose present in the partially processed sugar beet product.

Alternatively or additionally, reducing a temperature of water employed in diffusion contributes to an increase in the amount of sucrose present in the partially processed sugar beet product.

Alternatively or additionally, increasing cossettes thickness and/or decreasing a cossettes surface area: mass ratio contributes to an increase in the amount of sucrose present in the partially processed sugar beet product.

Alternatively or additionally, decreasing water volume per mass of cossettes in the diffuser contributes to an increase in the amount of sucrose present in the partially processed sugar beet product.

Some exemplary embodiments of the invention relate to controlling one or more cossette parameters to retain at least 2, optionally at least 5% of sucrose available in the sugar beet in the cossettes after diffusion.

Some exemplary embodiments of the invention relate to controlling one or more diffusion parameters to retain at least 2, optionally at least 5% of sucrose available in the sugar beet in the cossettes after diffusion.

Exemplary Sugar Juice Considerations

According to various exemplary embodiments of the invention raw juice 114 (FIG. 1) will contain 5, 10, 15, 20, 25 or 30% or intermediate or greater percentages less of the sucrose present in received crop 102 than is typically accepted in the table sugar industry. In some exemplary embodiments of the invention, preparation of juice 114 with less sucrose than is typically accepted in the table sugar industry contributes to a reduction in breaking and/or milling costs. In other exemplary embodiments of the invention, preparation of juice 114 with less sucrose than is typically accepted in the table sugar industry contributes to a reduction in diffusion costs and/or cost of cossette preparation.

In some exemplary embodiments of the invention, juice 114 is more concentrated than analogous juice prepared in a conventional industrial process in which all of the sucrose is extracted from the crop. Optionally, a higher concentration of sucrose in juice 114 contributes to an increased yield during sugar crystallization at a plant producing raw sugar. Optionally, the increase is realized primarily in massecuite A and/or B.

Alternatively or additionally, in some exemplary embodiments of the invention, juice 114 is provided in a smaller total volume per ton of crop than is typically accepted in the table sugar industry. Optionally, a reduction in total volume of juice 114 contributes to decreased costs in production of raw sugar. According to various exemplary embodiments of the invention this decreased cost can be related to decreased material inputs (e.g. lime and/or soluble phosphate) and/or decreased energy inputs. Decreased energy inputs may be realized, for example, in clarifiers and/or vacuum pans and/or centrifuges.

Alternatively or additionally, in some exemplary embodiments of the invention, juice 114 may contain a smaller total amount and/or a lower concentration of one or more contaminants. Optionally, a smaller total amount and/or a lower concentration of contaminants contribute to an improvement in efficiency of clarification and/or mud filtration. Exemplary contaminants include, but are not limited to, salts, carboxylic acids, amino acids, proteins, gums, waxes, fat and phosphatides. Sugar juice produced according to conventional practices may contain soluble solids which are 75-92% soluble sugars, with the remainder of the soluble solids being made up of various contaminants.

Exemplary Fructose Mixtures

Various exemplary embodiments of the invention demonstrate the feasibility of producing commercially and/or industrially significant amounts of fructose by acid hydrolysis of sucrose. The resultant fructose is typically present as part of a mixture which includes glucose resulting from sucrose inversion as well as other monosaccharides and/or disaccharides and/or higher oligosaccharides resulting from hydrolysis of hemicelluloses and/or cellulose.

In some exemplary embodiments of the invention, such a mixture is characterized by a ratio of fructose to mannose of at least 0.4. Optionally, the ratio of fructose to mannose is less than about 4.8.

In some exemplary embodiments of the invention, such a mixture is characterized by a ratio of fructose to xylose of at least 0.4. Optionally, the ratio of fructose to mannose is less than about 4.6.

In some exemplary embodiments of the invention, such a mixture is characterized by a ratio of fructose to galactose of at least 0.3. Optionally, the ratio of fructose to galactaose is less than about 3.2.

In some exemplary embodiments of the invention, such a mixture is characterized by a ratio of fructose to arabinose of at least 1.0. Optionally, the ratio of fructose to arabinose is less than about 11.

In some exemplary embodiments of the invention, such a mixture is characterized by a ratio of fructose to total dimeric sugars of at least 0.05. Optionally, a ratio of fructose to total dimeric sugars is less than about 0.6.

In some exemplary embodiments of the invention, such a mixture is characterized by a ratio of fructose to total monomeric sugars of at least 0.023. Optionally, the ratio of fructose to total monomeric sugars is less than about 0.2.

Optionally, such a mixture includes hydroxymethylfurfural (HMF).

In some exemplary embodiments of the invention, such a mixture is provided as part of a culture medium. The mixture can serve as an energy source and/or a trigger for an inducible promoter. In some exemplary embodiments of the invention, an organism is grown in the media containing the mixture to produce a fermentation production.

Exemplary Crop Development Considerations

Development of new strains of sucrose crops has traditionally concentrated on sucrose yield per unit of cultivated land. In light of the instant specification, it may be attractive to develop crops which have a maximum yield of total biomass (sucrose plus cellulose plus lignin) per unit of cultivated land.

Optionally, an integrated approach to production of sucrose crystals together with hydrolysis of cellulose to produce an additional sugar mixture (as described in the context of system 100 and/or method 300) may make it feasible to grow "low sucrose" crops profitably.

Alternatively or additionally, an "all hydrolysis" approach as described in the context of method 600 may provide an alternative to the sucrose industry which would favor "low sucrose" crops.

A shift from high sucrose to low sucrose strains of relevant crops can be accomplished using conventional crop husbandry techniques and/or genetic engineering/molecular biology techniques.

Exemplary Flow Control Considerations

In some exemplary embodiments of the invention flow control mechanisms are used to transport solids, slurries or liquids. Exemplary flow control mechanisms include, but are not limited to pumps and mechanical transport mechanisms. Because they are not central to the primary objectives of the described exemplary embodiments, these flow control mechanisms are not depicted in the drawings.

Optionally, pumps are used to transport liquids or slurries. For example, partially processed crop product 112 (FIG. 1) can be provided as a sugar cane bagasse or wet cossettes of sugar beet after diffusion. Such a partially processed crop product 112 may be transported by a pump to hydrolysis module 120. Alternatively or additionally, raw juice 114 may be pumped to sucrose refinery 160. Alternatively or additionally, extractant 142 may be pumped to module 140. Alternatively or additionally, acid hydrolyzate 122 may be pumped to acid recovery module 130. Alternatively or additionally, acid recovery stream 132 and/or recovered HCl 174 may be pumped to hydrolysis module 120. Alternatively or additionally, de-acidified hydrolyzate 134 may be pumped to a downstream processing facility and/or storage tank (not depicted). Alternatively or additionally, residual lignin 124 may be pumped to lignin de-acidification module 170. Alternatively or additionally, ash 144 may be provided in a pumpable liquid extract.

Alternatively or additionally, mechanical transport mechanisms (e.g. conveyors such as belts or augers) are optionally used to transport solids or slurries containing a high solids concentration. For example, received crop 102 may be transported by a conveyor belt to sucrose extraction module 110. Alternatively or additionally, partially processed crop product 112 is provided as a slurry which is transferred to hydrolysis module 120 using a conveyor belt and/or auger.

Alternatively or additionally, lignin may be handled by augers and/or conveyors (e.g. belts) and/or centrifuges within lignin de-acidification module 170 and/or de-acidified lignin 172 may be transported to combustion module 180 using augers and/or conveyors.

Alternatively or additionally, pre-burned crop and/or pre-extracted crop 146 may be handled by augers and/or conveyors.

Exemplary Uses for Heat Energy

FIG. 1 depicts heat energy 182 released from de-acidified lignin 172 in lignin combustion module 180. It is significant that even after substantially all of the hemicellulose and cellulose from the harvested crop has been hydrolyzed, de-acidified lignin 172 still contains enough heat energy 182 to be industrially useful. Some exemplary embodiments of the invention relate to utilization of energy 182.

According to various exemplary embodiments of the invention heat energy 182 can be used for processing 220 (FIG. 2) the harvested crop and/or refining of sucrose from a sugar juice produced during processing 220 and/or distillation.

According to various exemplary embodiments of the invention the distillation can be in the context of de-acidification 330 (FIG. 3) of hydrolyzate and/or de-acidification of lignin to recover HCl and/or solvent (e.g. S1 and/or S2) and/or water.

FIG. 1 also depicts heat energy 152 released from leaves in pre-combustion module 150.

In some exemplary embodiments of the invention, the partially processed crop product is produced from unburned sugar cane. Conventional cane harvesting practice typically includes burning of leaves and tops in the field either before or after cutting the cane.

In other exemplary embodiments of the invention, the partially processed crop product is produced from sugar beets without removal of leaves.

In some exemplary embodiments of the invention, the partially processed crop product 112 is brought to the plant with leaves which are burned to release heat energy 152 and ashes 154 as well as pre-burned crop 156. Since the combustion is incomplete by design, ashes 154 are different from "ash" produced by complete combustion in that ashes 154 will contain residual organic matter.

In some exemplary embodiments of the invention, heat energy 152 is used for similar purposes as those described above for heat energy 182.

Alternatively or additionally, heat energy 152 and/or 182 can be used to generate electric power.

Alternatively or additionally, at least a portion of ashes 154 are used to fertilize a field.

Optionally, the field is one in which received crop 102 has been grown or will be grown.

Exemplary Departure from Accepted Industrial Process

In the cane sugar industry it is widely believed that field burning of leaves is an important part of the sugar production process. Specifically, it is believed that there is an actual reduction in sucrose yield of three pounds per gross ton of sugar cane for every 1% of leaves and tops processed (Louisiana cooperative extension service; publication 2820 (2M) 9/00).

However, cane or beet leaves and cane tops are rich in cellulose and can produce additional sugars when hydrolyzed. In some exemplary embodiments of the invention, sugar production efficiency is increased by bringing cellulose rich leaves and/or tops to the plant. Since the leaves represent a significant portion of the available biomass, they have the potential to make a significant contribution to total sugar yield in acid hydrolyzate 322 (FIG. 3) if they are hydrolyzed 320.

In contrast to many other potential substrates for acid hydrolysis, leaves from sugar cane and sugar beet have no "high value" alternative use.

Exemplary Modifications

In some exemplary embodiments of the invention, a stream, fraction or extract is described as being extracted. According to various exemplary embodiments of the invention this extraction may be on the stream, fraction or extract per se or on a modified stream, fraction or extract. Optional modifications include, but are not limited to, dilution, concentration, mixing with another stream, fraction or extract, temperature adjustment, and filtration. Optionally, two or more modifications may be performed prior to extraction.

Exemplary Fructose Production Method

FIG. 7 is a simplified flow diagram of a method for fructose production according to some exemplary embodiments of the invention indicated generally as method 700. Depicted exemplary method 700 includes providing 710 a substrate including cellulose. Optionally, the substrate includes sucrose 712. According to various exemplary embodiments of the invention the substrate may be, for example, sugar cane or sugar beets and/or wood. Optionally, the cane or beets can be partially processed to remove a portion of their sucrose as described above.

Depicted method 700 includes hydrolyzing 720 the substrate with HCl to produce an acid hydrolyzate stream 722. This hydrolyzing is similar to that described hereinabove, for example in the context of FIG. 3.

Depicted method 700 includes de-acidifying 730 hydrolyzate stream 722 to produce a de-acidified sugar solution 732 and an HCl recovery stream 734. de-acidifying 730 is similar to the de-acidification procedures described hereinabove in the context of FIGS. 3, 4 and 5.

Depicted method 700 includes enzymatically converting 740 at least a portion of glucose in de-acidified sugar solution 732 to produce a fructose enriched sugar solution 742. Since available enzymes are currently limited to an efficiency of about 42%, fructose enriched sugar solution 742 still contains unconverted glucose.

In some exemplary embodiments of the invention, method 700 includes chromatographically separating 750 fructose enriched sugar solution 742 to produce a fructose cut 752 and a glucose cut 754. Optionally, glucose cut 754 is recycled to another round of enzymatic concersion 740 as indicated by the upward pointing arrow. Optionally, this recycling can be repeated until substantially all of the glucose has been converted to fructose.

According to various exemplary embodiments of the invention fructose cut 752 can optionally be subjected to further purification steps and/or concentrated and/or crystallized.

The total yield of fructose per unit of substrate will vary according to the amount of sucrose 712 and/or a degree of completion of hydrolysis 720 and/or an efficiency of enzymatic conversion 740 and/or a number of time that glucose cut 754 is recycled to enzymatic conversion 740.

Underlying Rationale

Various exemplary embodiments of the invention described above are based upon the understanding that in the table sugar industry, processing to recover a first fraction of refined sucrose is easy and therefore of low cost while each subsequent fraction carries an increased cost per unit. Increasing the refined sucrose yield requires extra costs, for example costs related to increased energy input. The increased energy input is typically related to increased dilution and subsequent sugar recovery. Alternatively or additionally, increasing the refined sucrose yield is limited by product losses in crystallization and/or attempts to separate impurities from the sucrose.

This specification demonstrates that it is industrially feasible to purposely recover only a fraction of the sucrose in the crop as crystalline sucrose. The justification for this comes from increased total saccharide yields in hydrolysis of the residual crop product (e.g. bagasse or cossettes) containing the "discarded" sucrose.

Although acid hydrolysis of lignocellulosic material was previously described, it was previously presumed that acid hydrolysis would lead to rapid degradation of sucrose. Data presented in the Examples section below demonstrates that this presumption is not necessarily correct.

It is expected that during the life of this patent many sucrose refining processes will be developed and the scope of the invention is intended to include all such new technologies a priori.

It is expected that during the life of this patent many enzymatic processes for conversion of glucose to fructose and/or chromatographic separation methods to separate glucose from fructose will be developed and the scope of the invention is intended to include all such new technologies a priori.

As used herein the term "about" refers to ±10% and includes, ±1% as well as ±0.1%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims. Specifically, the invention has been described in the context of acid hydrolysis using HCl but might also be used with other strong acids (e.g. sulfuric acid and/or nitric acid).

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present application.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions; illustrate the invention in a non limiting fashion.

Example 1

Saccharide Composition of Hydrolyzate Prepared from Conventional Sugar Cane Bagasse In order to establish a baseline composition for hydrolyzate composition in terms of specific sugars, a de-acidified hydrolyzate prepared from conventional sugar cane bagasse was analyzed.

The bagasse hydrolyzate was produced by processing the bagasse in a six stage hydrolysis reactor series in a counter-current operation as described in co-pending U.S. provisional application 61/48377 filed May 9, 2011 and entitled "Hydrolysis systems and methods which is fully incorporated herein by reference.

Briefly, an aqueous solution of 42% HCl was introduced continually at a temperature of 10-15° C. for 24 hours. The hydrolyzate was collected, HCl was removed by extraction and the de-acidified hydrolyzate was concentrated to give a sugar composition.

The composition was analyzed by HPLC (Varian Prostar® and a Rezex RSO-Oligosaccharide Ag+, 10×200 mm column and pre-column) at 80° C., Mobile Phase: Water (HPLC grade), Flow Rate: 0.3 mL/min, Injection: 5-10$f$L (depending on sugars conc.), Detector: RI, Detector Temp.: 40° C. The DP groups HPLC results are given in area %, the x-axis in the graphs represents time (hrs.) and the y-axis area %.

Total monosaccharide content in the bagasse hydrolyzate was 70.2% of total saccharides present. Analysis results of monosaccharides are summarized in Table 1. The results are calculated as % from sample's refractive total saccharides (%/RTS).

TABLE 1

| results of monosaccharides in hydrolyzate of sugar cane bagasse |||||||
| --- | --- | --- | --- | --- | --- | --- |
| Arabinose | Galactose | Xylose | Mannose | Glucose | Fructose | Sum |
| 2.2 | 7.2 | 4.9 | 4.8 | 48.7 | 2.4 | 70.2 |

Results presented in Table 1 demonstrate that little, if any, sucrose is present in conventional sugar cane bagasse as indicated by the small amount of fructose. Essentially all of the glucose in the hydrolyzate is produced by hydrolysis of cellulose.

Example 2

Inversion of Sucrose in the Presence of HCL

In order to examine the effect of concentrated HCL on sucrose, an aqueous solution containing 1% Sucrose and 35% HCl was prepared under refrigeration.

Sucrose was dissolved in water and placed in a beaker containing ice which was stored at −20 degrees C. for approximately 5-10 min to produce a sucrose solution.

An HCl solution (42.7% HCl was used) was weighed into a 50 ml round bottom flask inside a beaker containing ice and was also stored at −20 degrees C. for approximately 2-3 min.

The HCl solution was added to the sucrose solution while still cold and the resultant acidified sucrose mixture was shaken 3 times and put back into a beaker containing ice. Samples from this solution were taken into 4 ml vial (also kept on ice) and transferred to a "mock hydrolysis" at 11° C. for 6 hr. These conditions were selected to mimic those which sucrose would be likely to encounter in a hydrolysis reactor as described in Example 1.

At the end of the mock hydrolysis the vial was transferred into a beaker containing ice and then to −20 degrees C. Analyses of monosaccharides was as in Example 1. Analysis of hydroxymethylfurfural was by UV Spectrophotometry.

Results presented in Table 2 indicate that substantially all of the sucrose dimers were inverted to produce glucose and fructose monomers. Hydroxymethylfurfural (HMF) results from degradation of hexoses, especially fructose.

If no degradation occurred, a 52.6% yield of glucose and a corresponding 52.6% yield of fructose would be expected (water is incorporated into the sugar during inversion). The presence of HMF indicates that some degradation occurred and the shift in monomeric hexose ratios in favor of glucose suggests that primarily fructose was degraded. Approximately 1% of the total fructose appears to have been degraded.

The overall amount of degraded hexose was low, as indicated by the HMF concentration. The apparent stability of hexoses in highly concentrated HCl after 6 hours is surprising.

TABLE 2

Analysis of sucrose and its products after mock hydrolysis with 42.7% HCl at 11 degrees C.

| % Sucrose decomposition | % Glucose formation | % Fructose formation | % HMF formation |
|---|---|---|---|
| 100% | 51.8% | 48.2% | 0.038% |

These results confirm that is feasible to incorporate sucrose into a hydrolysis reaction and receive an increased yield of monomeric sugars in the resultant hydrolyzate.

Example 3

Saccharide Composition of Hydrolyzate Prepared from Sucrose Enriched Sugar Cane Bagasse This hypothetical example projects the results of hydrolysis conducted as in Example 1 using sucrose rich bagasse prepared according to various exemplary embodiments of the invention. Hypothetical results are summarized in Table 3. Each of hypothetical sample numbers 1 through 5 presumes a 100 kg input of "bagasse" based upon combination of results from example 1 and 2 above.

Sample 1 is a standard bagasse of the type described in example 1, containing substantially no sucrose. Samples 2 through 5 presume bagasse containing added sucrose from 5% to 30% as indicated. According to various exemplary embodiments of the invention this sucrose would be added by modifying initial processing of the cane to cause a corresponding amount of sucrose to remain in the "bagasse" portion. This material is referred to throughout the specification as "partially processed" crop product.

The hypothetical results presume that the relative yields of glucose and fructose are as presented in Table 2 and that substantially all of the HMF results from fructose degradation. Results are presented as both kilograms of yield and as % from sample's refractive total saccharides (in parentheses).

Hypothetical results summarized in Table 3 suggest that using the teachings of the instant specification it is possible to achieve higher yields of monosaccharides than previously possible from hydrolysis of sugar cane bagasse. Total monosaccharide yield is increased by slightly more than 1 kilogram for each kilogram of sucrose provided in the bagasse. The observed "excess" yield results from water incorporated during inversion.

TABLE 3

Hypothetical results of monosaccharides in hydrolyzate of sugar cane bagasse enriched with various levels of sucrose

| No. | Amount added sucrose % | Arabinose Kg (% of total) | Galactose Kg (% of total) | Xylose Kg (% of total) | Mannose Kg (% of total) | Glucose Kg (% of total) | Fructose Kg (% of total) | Total monomers Kg | Total dimers Kg |
|---|---|---|---|---|---|---|---|---|---|
| 1 | 0 | 1.7 (2.2) | 5.5 (7.2) | 3.8 (4.9) | 3.7 (4.8) | 37.5 (49) | 1.8 (2.4) | 77 | 35 |
| 2 | 5 | 1.7 (2.1) | 5.5 (6.7) | 3.8 (4.6) | 3.7 (4.5) | 40 (49) | 4.4 (5.4) | 82 | 35 |
| 3 | 10 | 1.7 (1.9) | 5.5 (6.3) | 3.8 (4.5) | 3.7 (4.3) | 43 (49) | 7 (8) | 87.5 | 35 |
| 4 | 20 | 1.7 (1.7) | 5.5 (5.6) | 3.8 (3.9) | 3.7 (3.8) | 48 (49) | 12.3 (12.6) | 98 | 35 |
| 5 | 30 | 1.7 (1.6) | 5.5 (5.0) | 3.8 (3.5) | 3.7 (3.4) | 53 (49) | 17.5 (16.1) | 109 | 35 |

The possibility for specific enrichment of glucose and fructose is of commercial interest. Each of these sugars is potentially valuable in downstream fermentation reactions to convert to other products.

Glucose yield increases in absolute terms, but remains essentially constant in relative terms.

Fructose yield increases in both absolute terms and in relative terms.

These results indicate for the first time a way to increase fructose concentrations in acid hydrolyzates of lignocellulosic substrates.

Similar results would be expected using sugar beets instead of sugar cane.

Alternatively or additionally, it is expected that additional inputs (beyond 30%) of sucrose would provide proportionately greater yields of glucose and fructose.

Example 4

Increasing Fructose Yield from Hydrolyzate Prepared from Sucrose Enriched Sugar Cane Bagasse This hypothetical example demonstrates how to increase fructose yields from mixtures as set forth in Table 3 of Example 3 above Fructose has a higher value than glucose because it is more reactive. In the Exemplary mixtures set forth hereinbelow in Table 3, the amount of fructose relative to total monosaccharides is low (5.4 to 16.1% for samples 2 through 5 respectively).

However, the amount of glucose relative to total monosaccharides is high (49% for samples 2 through 5). Despite this fixed ratio, the amount of glucose in samples 2 through 5 increases progessively from samples 2 through 5.

Conversion of glucose to fructose via enzymatic processes is routinely practiced in the corn wet milling industry to produce high fructose corn syrup. One of ordinary skill in the art will be familiar with the relevant enzymatic processes. Typically, a single round of enzymatic conversion, if conducted efficiently, converts about 42% of the glucose to fructose. It is well accepted in the industry to separate glucose from fructose and subject the residual glucose to one or more additional rounds of enzymatic conversion, so that the final yield of fructose from glucose can approach 100%. Again, one of ordinary skill in the art will be familiar with the relevant chromatographic processes.

If these processes were to be applied to the sugar mixture resulting from sample 2 in Table 3 the percentage of fructose relative to total monosacharides would increase significantly. If the conversion of glucose to fructose were 25% efficient, fructose would account for about 17.5% of the total monosaccharides. If the conversion of glucose to fructose were 50%, 75% or 100% efficient, fructose would account for about 29.7, 42% or 54% of the total monosaccharides respectively.

If these processes were to be applied to the sugar mixture resulting from sample 5 in Table 3 the percentage of fructose relative to total monosacharides would increase more significantly. If the conversion of glucose to fructose were 25% efficient, fructose would account for about 28.2% of the total monosaccharides. If the conversion of glucose to fructose were 50%, 75% or 100% efficient, fructose would account for about 40.4%, 52.5% or 64.7% of the total monosaccharides respectively.

In terms of absolute sucrose yield, 100% conversion of the glucose in sample 2 would increase the total fructose yield from 4.4 to 44.4 kilograms.

Similarly 100% conversion of the glucose in sample 5 would increase the total fructose yield from 17.54 to 70.5 kilograms.

These hypothetical results suggest that the various exemplary embodiments of the invention described hereinabove offer an important new source of fructose.

The invention claimed is:

1. A hydrolysate mixture of sugars characterized by a ratio of fructose to mannose of at least 0.4, wherein said hydrolysate mixture further comprises hydroxymethylfurfural.

2. The hydrolysate mixture of sugars according to claim 1, characterized in that said ratio of fructose to mannose does not exceed 4.8.

3. The hydrolysate mixture of sugars according to claim 1, further characterized by a ratio of fructose to total dimeric sugars of at least 0.05.

4. The hydrolysate mixture of sugars according to claim 3, characterized in that said ratio of fructose to total dimeric sugars does not exceed 0.6.

5. A hydrolysate mixture of sugars characterized by a ratio of fructose to xylose of at least 0.4, wherein said hydrolysate mixture further comprises hydroxymethylfurfural.

6. The hydrolysate mixture of sugars according to claim 5, characterized in that said ratio of fructose to xylose does not exceed 4.6.

7. The hydrolysate mixture of sugars according to claim 6, further characterized by a ratio of fructose to galactose of between 0.3 and 3.2.

8. The hydrolysate mixture of sugars according to claim 7, further characterized by a ratio of fructose to total monomeric sugars of between 0.023 and 0.2.

9. The hydrolysate mixture of sugars according to claim 6, further characterized by a ratio of fructose to total monomeric sugars of between 0.023 and 0.2.

10. A hydrolysate mixture of sugars characterized by a ratio of fructose to galactose of at least 0.3, wherein said hydrolysate mixture further comprises hydroxymethylfurfural.

11. The hydrolysate mixture of sugars according to claim 10, characterized in that said ratio of fructose to galactose does not exceed 3.2.

12. A hydrolysate mixture of sugars characterized by a ratio of fructose to arabinose of at least 1.0, wherein said hydrolysate mixture further comprises hydroxymethylfurfural.

13. The hydrolysate mixture of sugars according to claim 12, characterized in that said ratio of fructose to arabinose does not exceed 11.

14. A hydrolysate mixture of sugars characterized by a ratio of fructose to total monomeric sugars of at least 0.023, wherein said hydrolysate mixture further comprises hydroxymethylfurfural.

15. The hydrolysate mixture of sugars according to claim 14, characterized in that said ratio of fructose to total monomeric sugars does not exceed 0.2.

16. The hydrolysate mixture of sugars according to claim 14, characterized by a ratio of fructose to mannose of at least 0.4.

17. The hydrolysate mixture of sugars according to claim 14, characterized by a ratio of fructose to xylose of at least 0.4.

18. The hydrolysate mixture of sugars according to claim 14, characterized by a ratio of fructose to galactose of at least 0.3.

19. A method comprising:
(a) providing a fermentor; and
(b) fermenting a medium comprising the hydrolysate mixture of sugars according to any one of claim 1, 5, 10, 12, or 14 in the fermentor to produce a fermentation product.

20. An acid hydrolysate mixture of sugars characterized by a ratio of fructose to mannose of at least 0.4, wherein the acid hydrolysate mixture of sugars was produced by contacting a partially processed crop with an acid.

* * * * *